US011954256B2

(12) United States Patent
Tauziet et al.

(10) Patent No.: US 11,954,256 B2
(45) Date of Patent: Apr. 9, 2024

(54) HAPTIC INTERFACE FOR COMPUTING DEVICES

(71) Applicant: GOOGLE LLC, Mountain View, CA (US)

(72) Inventors: Claire Tauziet, Redwood City, CA (US); Kejia Shao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/990,893

(22) Filed: Nov. 21, 2022

(65) Prior Publication Data
US 2023/0195230 A1 Jun. 22, 2023

Related U.S. Application Data

(60) Provisional application No. 63/290,702, filed on Dec. 17, 2021.

(51) Int. Cl.
*G06F 3/04847* (2022.01)
*G06F 3/01* (2006.01)
(Continued)

(52) U.S. Cl.
CPC .......... *G06F 3/016* (2013.01); *G06F 3/03547* (2013.01); *G06F 3/0488* (2013.01);
(Continued)

(58) Field of Classification Search
CPC .. G06F 3/03547; G06F 3/0488; G06F 3/0483; G06F 3/04842; G06F 3/04845;
(Continued)

(56) References Cited

U.S. PATENT DOCUMENTS 10,564,721 B2 * 2/2020 Cruz-Hernandez ......................... G06F 3/0488
11,610,371 B2 * 3/2023 Powderly ............ G06F 3/04815
(Continued)

FOREIGN PATENT DOCUMENTS

KR 20170053290 A 5/2017

OTHER PUBLICATIONS

"Kaaresoja, Snap-Crackle-Pop: Tactile Feedback for Mobile Touch Screens, 2006, pp. 1-2" (Year: 2006).*
(Continued)

*Primary Examiner* — Ryan F Pitaro
(74) *Attorney, Agent, or Firm* — Botos Churchill IP Law

(57) ABSTRACT

The technology involves providing haptic feedback to a user of a computing device. For instance, user input associated with a program of the computing device is received by a user interface module of the computing device. One or more processors of the computing device determine a kind of interaction corresponding to the user input. The one or more processors identify whether the kind of interaction is associated with one or more haptic feedback effects of a curated suite of haptic effects. Upon identifying that the kind of interaction is associated with one or more haptic feedback effect, the one or more processors select a particular haptic feedback effect from the curated suite of haptic effects. And the one or more processors are able to cause a haptic feedback module of the computing device to provide the particular haptic feedback effect for sensation by the user.

24 Claims, 53 Drawing Sheets

(51) Int. Cl.
*G06F 3/0354* (2013.01)
*G06F 3/0488* (2022.01)
*G06F 3/0483* (2013.01)
*G06F 3/04842* (2022.01)
*G06F 3/04845* (2022.01)
*G06F 3/0485* (2022.01)

(52) U.S. Cl.
CPC ........ *G06F 3/0483* (2013.01); *G06F 3/04842* (2013.01); *G06F 3/04845* (2013.01); *G06F 3/04847* (2013.01); *G06F 3/0485* (2013.01); *G06F 2203/04803* (2013.01); *G06F 2203/04808* (2013.01)

(58) Field of Classification Search
CPC ............ G06F 3/04847; G06F 3/0485; G06F 2203/04803; G06F 2203/04808; G06F 3/016
See application file for complete search history.

(56) References Cited

U.S. PATENT DOCUMENTS

| | | | |
|---|---|---|---|
| 2011/0193813 A1 | 8/2011 | Gralewski et al. | |
| 2011/0289402 A1* | 11/2011 | Hiitola | G06F 3/016 715/234 |
| 2013/0318437 A1* | 11/2013 | Jung | G06F 3/0485 715/251 |
| 2014/0058733 A1* | 2/2014 | Voorhees | G09B 21/006 704/260 |
| 2014/0092143 A1* | 4/2014 | VanBlon | G09G 5/34 345/684 |
| 2014/0160050 A1 | 6/2014 | Olien et al. | |
| 2014/0168124 A1* | 6/2014 | Park | G06F 3/016 345/173 |
| 2014/0198068 A1* | 7/2014 | Lee | G06F 3/04886 345/173 |
| 2014/0198069 A1* | 7/2014 | Park | G06F 3/03545 345/173 |
| 2014/0210756 A1* | 7/2014 | Lee | G06F 3/03545 345/173 |
| 2015/0241970 A1* | 8/2015 | Park | G06F 3/03545 345/173 |
| 2015/0293592 A1* | 10/2015 | Cheong | G06F 1/163 345/173 |
| 2016/0269671 A1* | 9/2016 | Choi | G06F 3/0489 |
| 2017/0212591 A1* | 7/2017 | Churikov | G06F 3/0416 |
| 2018/0082552 A1 | 3/2018 | Moussette et al. | |
| 2018/0224941 A1 | 8/2018 | Modarres et al. | |
| 2018/0350150 A1* | 12/2018 | Powderly | G06T 19/006 |
| 2019/0339804 A1* | 11/2019 | Gleeson | G06F 3/0488 |
| 2019/0391659 A1 | 12/2019 | Woolley et al. | |
| 2019/0392394 A1 | 12/2019 | Druck | |
| 2021/0240805 A1 | 8/2021 | Knoppert et al. | |
| 2021/0303116 A1* | 9/2021 | Barlow | G06F 40/169 |
| 2022/0413613 A1* | 12/2022 | Zhao | G06F 3/016 |
| 2023/0015526 A1* | 1/2023 | Lehmann | G06F 3/016 |
| 2023/0049900 A1* | 2/2023 | Yasuda | G06F 3/04847 |

OTHER PUBLICATIONS

Core Haptics—Apple Developer Documentation, retrieved from the Internet Dec. 9, 2021, pp. 1-3.
HapticFeedbackConstants, Android Developers, retrieved from the Internet Dec. 9, 2021, pp. 1-9.
Haptics UX Design, Android Open Source Project, retrieved from the Internet Dec. 9, 2021, pp. 1-6.
How to use the Force Touch trackpad—Apple Support—retrieved from the Internet Dec. 9, 2021, pp. 1-4.
Vibration API—Web APIs—MDN, retrieved from the Internet Dec. 9, 2021, pp. 1-4.
International Search Report and Written Opinion for International Application No. PCT/US2022/051315 dated Apr. 7, 2023 (7 pages).

* cited by examiner

100

200

Fig. 3  Example Click Waveform

Fig. 4  Example Deep Click Waveform

Example Tick Waveform

Fig. 6 Example Knock Waveform

800

820

900

920

2500

HAPTIC INTERFACE FOR COMPUTING DEVICES

CROSS-REFERENCE TO RELATED APPLICATIONS

This application claims the benefit of the filing date of U.S. Provisional Application No. 63/290,702 filed Dec. 17, 2021, the entire disclosure of which is incorporated by reference herein.

BACKGROUND

Computing devices such as desktop and laptop computers have various user interfaces that allow users to interact with the computing devices. For example, such interfaces may include a keyboard, a mouse or a mousepad, a trackpad, a touch screen, buttons, stylus etc. A user may control various functions of the computing devices and user applications installed on the computing devices through these interfaces.

A point-and-click paradigm started with the mouse as a physical representation of the two-dimensional, one-point cursor on the display screen. Over time, the mouse has been overloaded with functions to accomplish more things faster (e.g., a trackball mouse that provides a middle click, double click, right click, etc.). With those added features come complexity and inflexibility. The trackpad (also known as a touchpad, mousepad or force pad depending on size and device type) was introduced to emulate the physical mouse on laptops. Recently, trackpads having a large surface area have been increasingly leveraged for more innovative use cases that take advantage of multiple fingers, such as gestures.

A technical problem with the interaction model in this point-and-click paradigm is that the interaction is asymmetrical. The user provides haptic input by "pressing to click" but may need to confirm the correctness of output visually. For instance, regardless of what the user clicks on, they may receive the same diving-board recoil feedback. Haptic feedback seeks to close the loop on user/device interaction and provides the operating system a way to physically interact with the user. This can include providing confirmation of a transaction in a payment app, enhanced realism for games when using a game controller, feedback via a stylus, or even as a fidget stress release. However, in many instances the user is still reliant on visually observing what is displayed on a screen or a sound played by the device to confirm an action or operation when using the computing device. This can limit interactivity, degrade app or other program performance and, ultimately, adversely affect the quality of the human-machine interface.

BRIEF SUMMARY

Aspects of the technology employ one or more trackpads that are configured to apply a technical solution to the asymmetry issue, providing haptic feedback across a wide variety of apps, interactive scenarios and device types. The trackpad can be configured to respond to clicking and gestures across its whole area (in other words, corner-to-corner). This may facilitate provisioning of improved user interface feedback, which may result in an improved human-machine interface. In some implementations, the haptic response offered by the trackpad can be customized to suit different users' needs. The technology provides a technical solution with a new dimension of force input to build various user interface (UI) features upon. As a result, haptic input and feedback features can be used to provide improved trackpad-based human-computer interfaces on computing devices such as laptops, netbooks, tablets and other portable computers.

For instance, haptics may provide device interaction in a responsive manner. By way of example, haptic feedback can be provided when the user is actively engaging with the device (e.g., maneuvering their hand on a haptic surface), as opposed to being intended to draw the user's attention such as audible and visual alerts. In some examples, haptics may provide one of multiple mechanisms for completing a particular task for a given app or other program. As such, when the app or program is run on devices on which haptics may not be available, it may still be possible to perform the particular task. Thus, in most instances wherever possible, haptic feedback can be employed as supplemental or otherwise complementary feedback to the visual cues that the display presents to the user. The haptic feedback may also be complementary to sound information that is provided. Furthermore, in certain situations such as when running a word-processing or spreadsheet application or interacting with a file management interface, it may be desirable that haptic (e.g., force- or duration-sensitive) input does not lead to a destructive action or actions that are hard to recover from, e.g., permanently emptying the device's trash can or clearing all text from a document. When a browser application is running, the haptic feedback can be associated with different ways the user can interact with the browser UI or the content in the browser, such as scrolling or dragging.

According to one aspect, a method of providing haptic feedback to a user of a computing device is provided. The method comprises receiving, by a user interface module of the computing device, user input associated with a program of the computing device; determining, by one or more processors of the computing device, a type or category (e.g., a kind) of interaction corresponding to the user input; identifying, by the one or more processors, whether the type or category of interaction is associated with one or more haptic feedback effects of a suite of haptic effects which may be curated; upon identifying that the type or category of interaction is associated with one or more haptic feedback effect, selecting, by the one or more processors, a particular haptic feedback effect from the suite of haptic effects; and causing, by the one or more processors, a haptic feedback module of the computing device to provide the particular haptic feedback effect for sensation by the user. The suite of haptic effects may include a snap sensation, a limit sensation, a tick sensation, toggle on/off feedback, and/or and a click sensation. The suite of haptic effects may further include a deep click sensation, the deep click sensation being configured to provide a tactile confirmation that the user pressed firmly enough to reveal certain information about a selection.

In one example, when the kind of interaction involves splitting a screen in a user interface, the particular haptic feedback effect is a snap sensation. In another example, when the kind of interaction involves maximizing a window in a user interface, the particular haptic feedback effect is a snap sensation. In yet another example, when the kind of interaction involves moving between two or more virtual objects, the particular haptic feedback effect is a tick sensation. In a further example, when the kind of interaction involves moving between two or more virtual objects, the particular haptic feedback effect is a knock sensation.

In an example, when the kind of interaction is associated with moving a virtual object, the particular haptic feedback effect is a tick sensation indicating that the virtual object is now moveable. In another example, when the kind of interaction involves scrolling through a set of displayed content, the particular haptic feedback effect is a knock sensation to indicate no more scrolling in a given direction is possible. In yet another example, when the kind of interaction involves tearing off a tab from a virtual window, the particular haptic feedback effect is a tick sensation. In a further example, when the kind of interaction involves adjusting a control feature, the particular haptic feedback effect is a tick sensation.

In another example, when the kind of interaction involves turning a selectable option on or off, the particular haptic feedback effect is a toggle sensation. Here, there may be two distinct sets of feedback: one for toggling on and the other for toggling off. And in yet another example, when the kind of interaction involves the user input either exceeding a force threshold or a temporal threshold, the particular haptic feedback effect is a deep click sensation.

Alternatively or additionally to any of the above configurations, one or more settings associated with the curated suite of haptic effects may be adjustable by the user.

According to another aspect, a computing device is provided. The computing device comprises memory configured to store a curated suite of haptic effects; a display module configured to display a user interface to a user; a user interface module configured to receive user input from a user of the computing device, the user input being associated with a program of the computing device; a haptic feedback module configured to provide haptic effects to the user; and one or more processors operatively coupled to the memory, the display module, the user interface module and the haptic feedback module. The one or more processors are configured to: determine a kind of interaction corresponding to the user input; identify whether the kind of interaction is associated with one or more haptic feedback effects of the curated suite of haptic effects; upon identifying that the kind of interaction is associated with one or more haptic feedback effect, select a particular haptic feedback effect from the curated suite of haptic effects; and cause the haptic feedback module to provide the particular haptic feedback effect for sensation by the user. Each haptic effect of the curated suite of haptic effects may be configured to provide supplemental or otherwise complementary feedback to a visual cue (and/or audible cue) presented to the user during interaction with the program.

In one example, the computing device includes a trackpad, and the haptic feedback module is part of the trackpad. Alternatively or additionally, the curated suite of haptic effects includes a snap sensation, a limit sensation, a tick sensation and a click sensation. The curated suite of haptic effects may further include a deep click sensation, the deep click sensation being configured to provide a tactile confirmation that the user pressed firmly enough to reveal certain information about a selection.

Alternatively or additionally to the above, one or more settings associated with the (curated) suite of haptic effects may be adjustable by the user. The suite of haptic effects may be curated according to the type or category of user interaction and/or according to a type of application to be run on the computing device. Each haptic effect of the suite of haptic effects may be configured to provide supplemental feedback to a visual cue presented to the user during interaction with the program. Each haptic effect may alternatively or additionally be configured to provide supplemental feedback to an audible cue presented to the user during interaction with the program.

DETAILED DESCRIPTION

Overview

Figure 1:
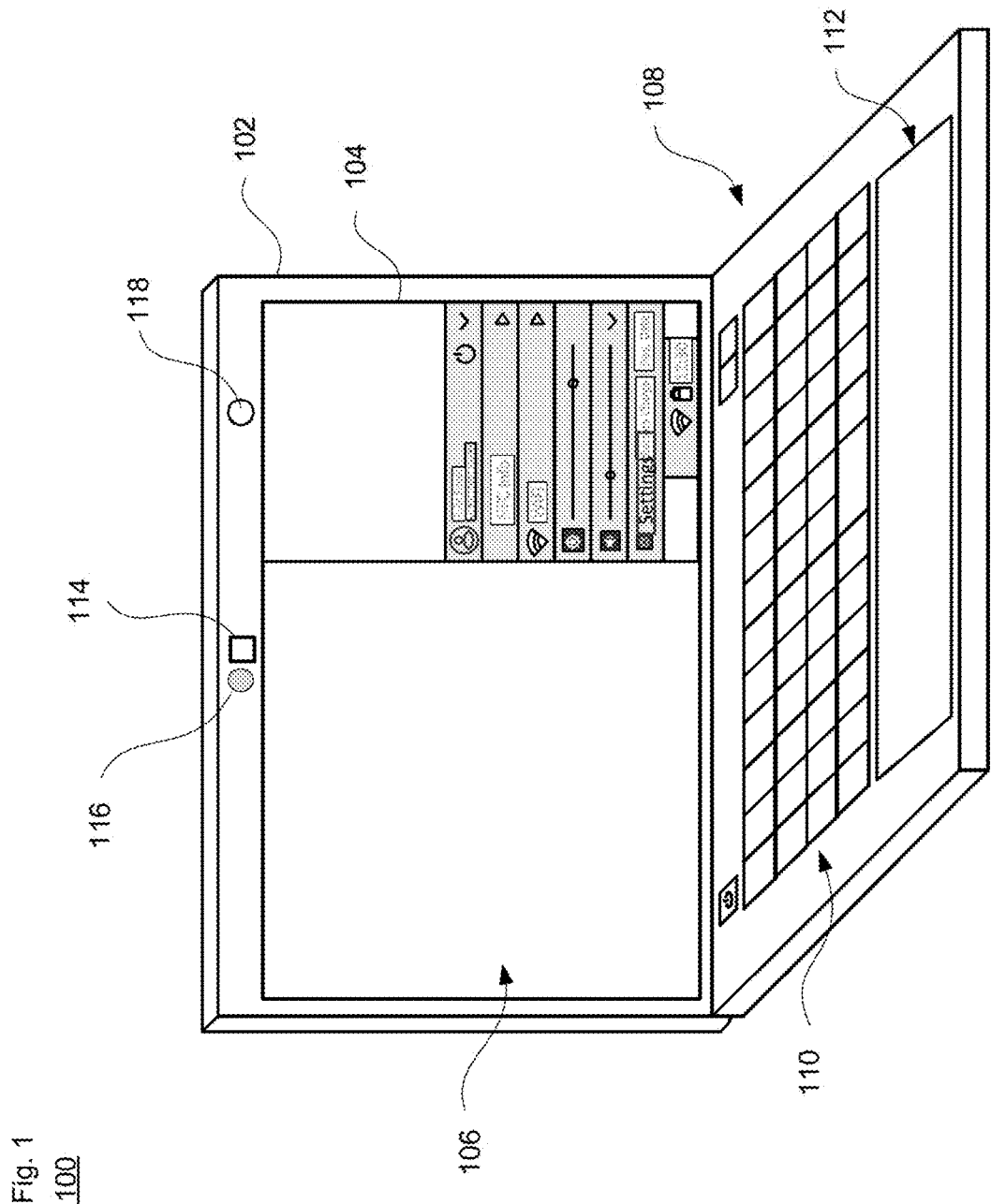
FIG. 1 illustrates a client computing device in accordance with aspects of the technology.

Aspects of the technology relate to providing enriched haptic feedback to users of computing devices to address technical problems involving asymmetric feedback. A technical solution to issues involving asymmetric feedback involves using a curated suite of haptic feedback effects which may be associated with different types of user interactions, types of programs or other factors. The effects are provided to the user via a trackpad or similar device. The feedback can be configured to include a snap such as to indicate that a window or other object in the UI has been moved to a particular side of the display, a limit such as to indicate that a defined boundary of the UI has been reached, a state change such as to indicate that the state of an object or app has been changed, and/or a toggle on or off, such as to provide a quick confirmation that a feature has been activated or deactivated. Each haptic feedback effect is associated with a different waveform or set of waveforms that provides the technical benefit of readily inform the user about some aspect of their interaction with the computing device.

Example Computing Device

FIG. 1A illustrates an example 100 showing a client device 102, such as a laptop computer. In this example, there is a display 104 for visually presenting content and a user input section 108 having a keyboard 110 and a trackpad 112 as different user inputs. A microphone (not shown) may be provided for audible input. The display 104 may be configured as a touch screen. The keyboard 110 may be a virtual keyboard, for instance as part of another display. While one trackpad 112 is shown, the device may have two or more trackpads arranged thereon.

An integrated webcam 114 can be used for videoconferences, interactive gaming, etc. Indicator 116, such as an LED, may be illuminated to alert a user whenever the integrated webcam is in use. The client device may also include one or more other sensors 118, which may be used to supplement visual information obtained by the webcam 114. By way of example, the one or more other sensors may include an additional imaging device, an RF- or ultrasonic-based motion sensor, such as to help identify gestures by the use or act as a human presence detector.

Figure 2:
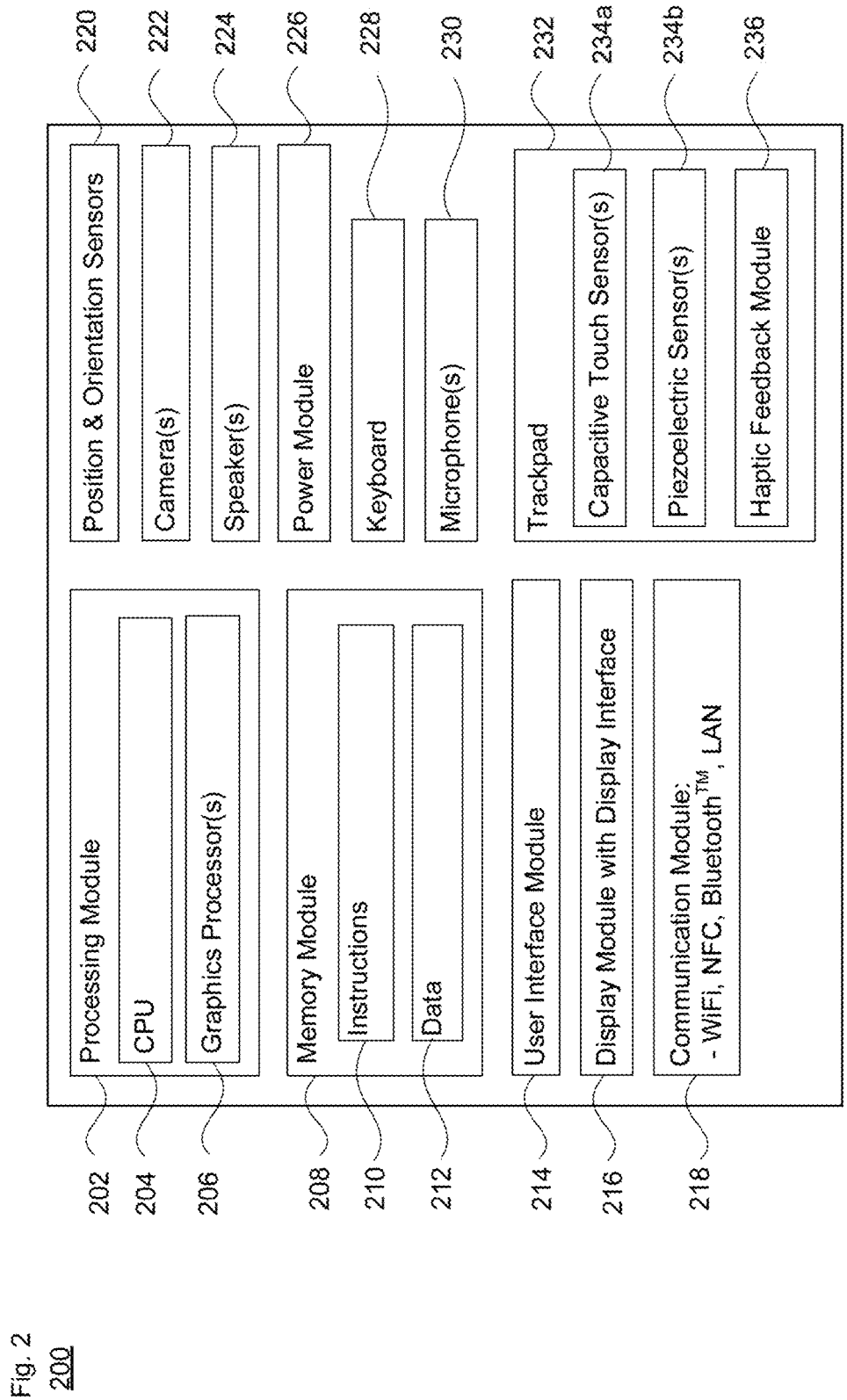
FIG. 2 is a block diagram of a client computing device in accordance with aspects of the technology.

FIG. 2 illustrates a block diagram of an example client computing device 200, such as the laptop shown in FIG. 1, or a tablet PC, netbook, an in-home device such as a smart display, or the like. As shown, the client computing device includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on one or more display devices of the display module 216 having a display interface.

User interface module 214 may receive commands or other input information from a user via user inputs and convert them for submission to a given processor. The user interface module may link to a web browser and other apps executed by the device's processing module (not shown). The user inputs may include one or more of a touchscreen, keypad, trackpad, stylus, microphone, or other types of input devices. The display module 216 may comprise appropriate circuitry for driving the display device to present graphical and other information to the user. By way of example, the graphical information may be generated by the graphics processor(s) 206, while CPU 204 manages overall operation of the client device 200. The graphical information may display responses to user queries on the display module 216. For instance, the processing module may run a browser application or other service using instructions and data stored in memory module 208, and present information associated with the browser application or other service to the user via the display module 216. The memory module may include a database or other storage for app-related information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include removable media (e.g., DVD, CD-ROM or USB thumb drive). One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of client device 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 may be retrieved, stored or modified by the processors in accordance with the instructions 210. For instance, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in FIG. 2, the client device 200 includes a communication module 218 for communicating with other devices and systems, including other client devices, servers and databases. The communication module 218 includes a wireless transceiver; alternatively, the module may alternatively or additionally include a wired transceiver. The client device 200 may communicate with other remote devices via the communication module 218 using various configurations and protocols, including short range communication protocols such as near-field communication (NFC), Bluetooth™, Bluetooth™ Low Energy (BLE) or other ad-hoc networks, the Internet, intranets, virtual private networks, wide area networks, local networks, private networks using communication protocols proprietary to one or more companies, Ethernet, WiFi and HTTP, and combinations of the foregoing.

The example client device 200 as shown also includes one or more position and orientation sensors 220. The position and orientation sensors 220 are configured to determine the position and orientation of one or more parts of the client computing device 200. For example, these components may include a GPS receiver to determine the device's latitude, longitude and/or altitude as well as an accelerometer, gyroscope or another direction/speed detection device such as an inertial measurement unit (IMUS). The client device 200 may also include one or more camera(s) 222 for capturing still images and recording video streams such as the integrated webcam as discussed above, speaker(s) 224. Power module 226 provides power to the various system components.

In addition, user inputs include a keyboard 228 and a microphone 230, which may comprise a microphone array having one or more transducers or other microphone elements distributed at various points along the housing of the computing device. Trackpad 232 may include either a capacitive touch sensor unit 234a or a piezoelectric sensor unit 234b (or both), as well as a haptic feedback module 236. The haptic feedback module may include a controller and one or more feedback elements, e.g., piezoelectric elements configured to provide tactile (haptic) feedback to the user based on one or more electrical signals (waveforms) issued by the controller. In some configurations, a touch sensitive display may also incorporate a haptic feedback module.

Haptic Feedback Effects

As noted above, haptic feedback effects may be associated with different types of user interactions, types of programs or other factors. For instance, when dragging a window, the user may receive a "snap" feedback sensation when the dragged window reaches a snap target (e.g., a split screen or maximize target) in the display area. When dragging a tab out of a browser window, a "tick" feedback sensation when the tear happens. When reaching a limit when zooming in or out of a window, a "limit" feedback sensation may be provided, for instance to indicate that a maximum or minimum zoom or volume level has been reached. And when changing a preset level for a UI feature, such as mouse speed (or otherwise modifying a UI element), a "click" feedback sensation may be provided. The following are additional examples of haptic effects that may be employed. None of the examples presented herein is intended to be limiting on how the technology may be employed.

Snap feedback provides a tactile confirmation that the user has entered the snapping area in the UI, for instance to move a window to the right/left edges of the screen to split the screen, or to move a window to the top of the screen to maximize it.

Limit feedback can provide a tactile response to an action that has become unresponsive after trying to activate it outside of its boundaries. For example, the UI may support different virtual desks each having a different suite of apps or supporting particular features. Here, the user may use 4 fingers (or more or fewer fingers) try to swipe to an unavailable virtual desk or other desktop feature. Or, in another scenario, the user may try to continue scrolling when the end of the page has been reached.

Tick feedback provides a discrete sensation of state change. For instance, this feedback can be provided when there is long pressing on elements to initiate drag, or 3 or 4 fingers are used to swipe between tabs or virtual desks.

Click feedback provides a tactile confirmation that the user clicked on the trackpad. Deep click feedback can provide a tactile confirmation that the user pressed firmly enough to reveal more information about their selection in the UI.

And toggle (on/off) feedback can provide a short tactile confirmation of activating/deactivating a feature.

Different waveforms are designated for each type of feedback sensation (effect). These sensations can be selected to impart information to the user (e.g., cannot zoom out any further) without the user having to look at the display for confirmation, although they are configured to reinforce the feedback the user perceives from the display. The waveforms may be configured such that the feedback sensation is noticeable without being distracting. In addition or alternatively, the waveforms may be configured such that the feedback sensations are readily distinguishable from one another. Each waveform has a particular signature, including wave type, amplitude and duration.

Figure 3:
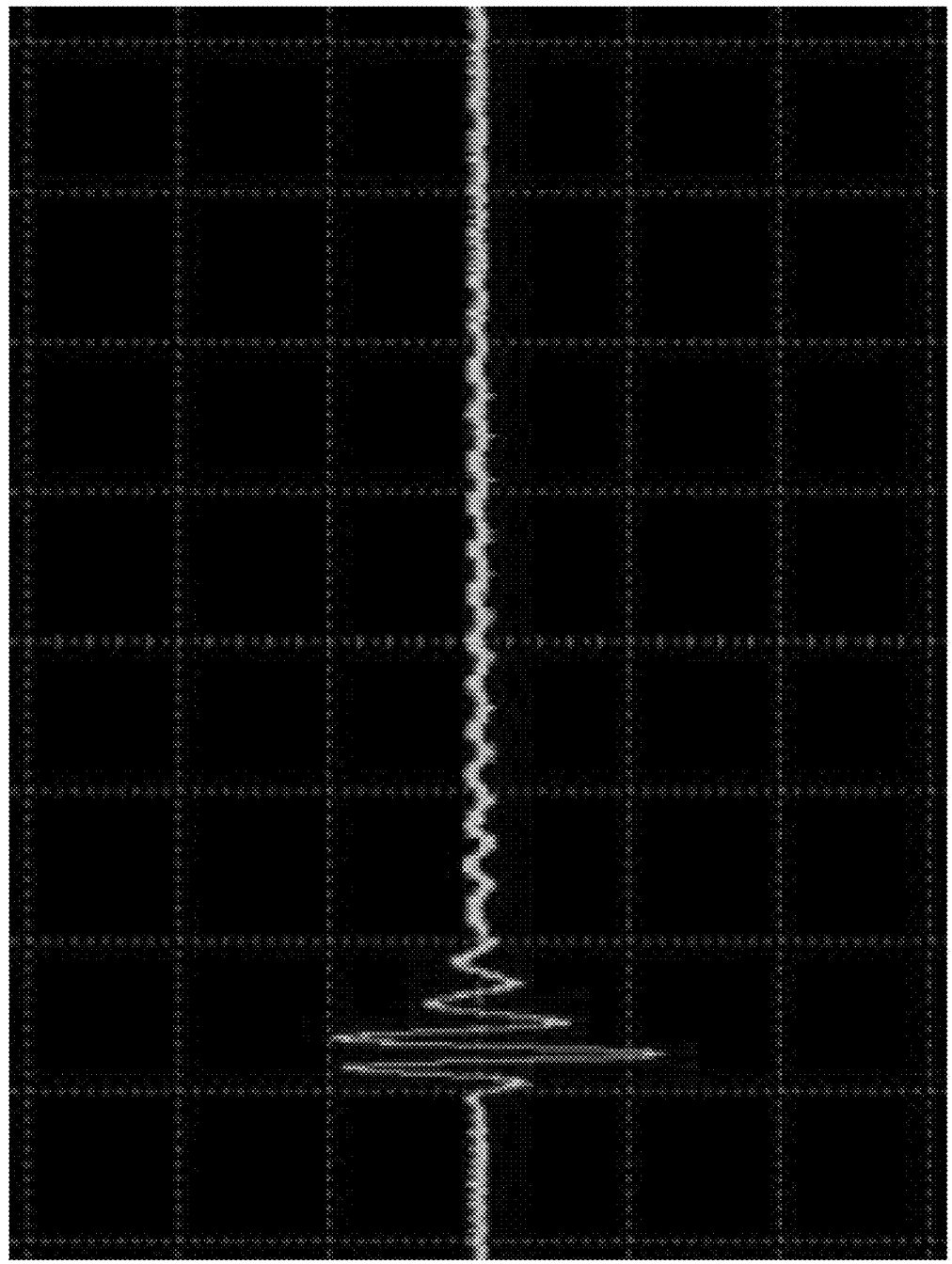
FIG. 3 illustrates an example click waveform in accordance with aspects of the technology.
Figure 4:
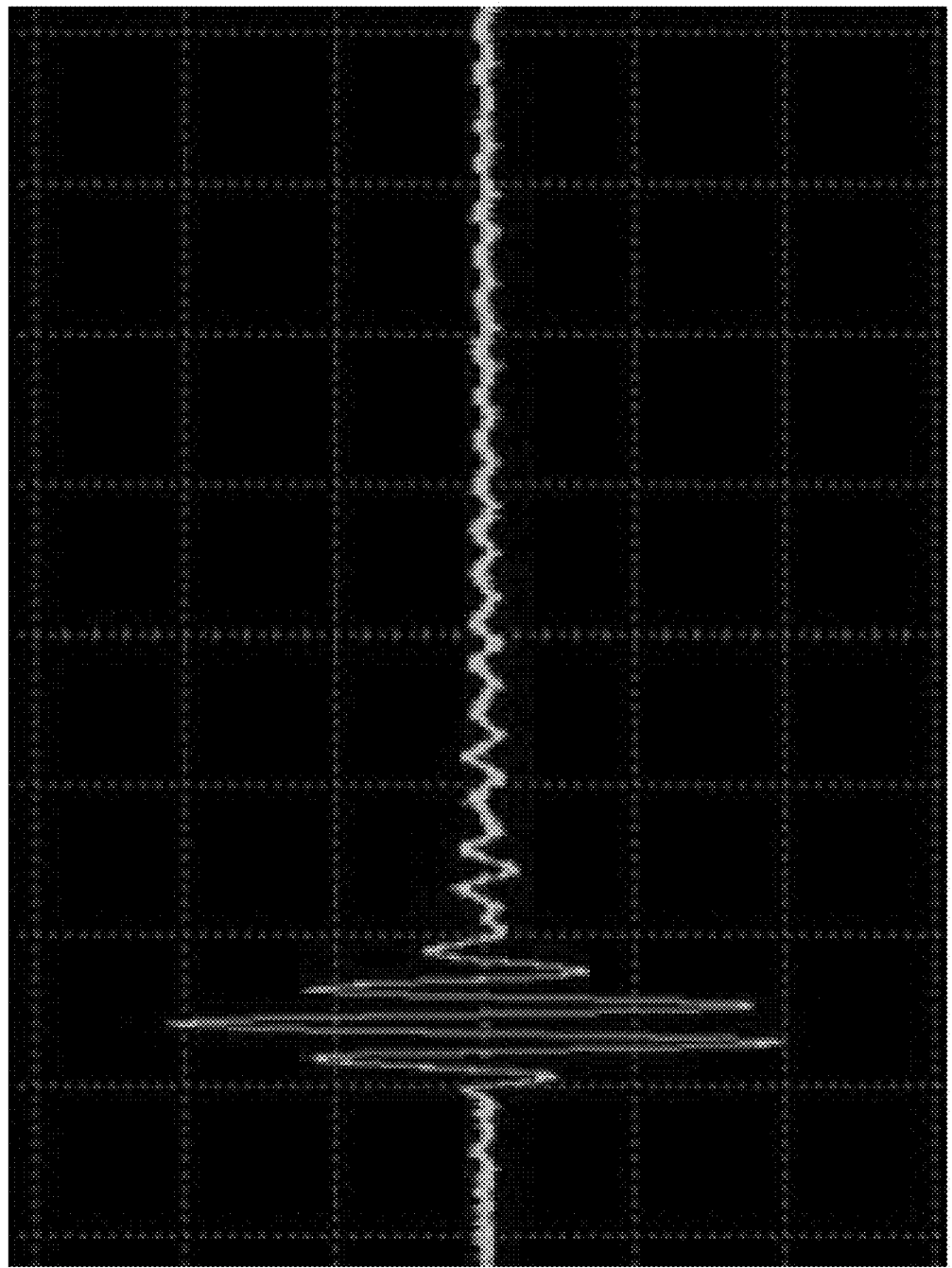
FIG. 4 illustrates an example deep click waveform in accordance with aspects of the technology.

One example is the "click" waveform, such as shown in FIG. 3. The click may comprise a square wave having a voltage amplitude on the order of 350 mV-750 mV (or more or less), with a period on the order of 15 ns-30 ms. In an alternative, a sine wave may be used in place of a square wave. The click waveform parameters may be adjusted, so long as the tactile sensation is perceived as being sharp and quick. FIG. 4 illustrates a different click, called a "deep click". Here, this is a sine wave having a voltage amplitude on the order of 400 mv-600 mV (or more or less), with a period on the order of 20 ms-40 ms. Similar to the click waveform, the deep click waveform parameters may be adjusted. By way of example, the amplitude and/or period can be increased or decreased, e.g., by 10%-30%.

Figure 5:
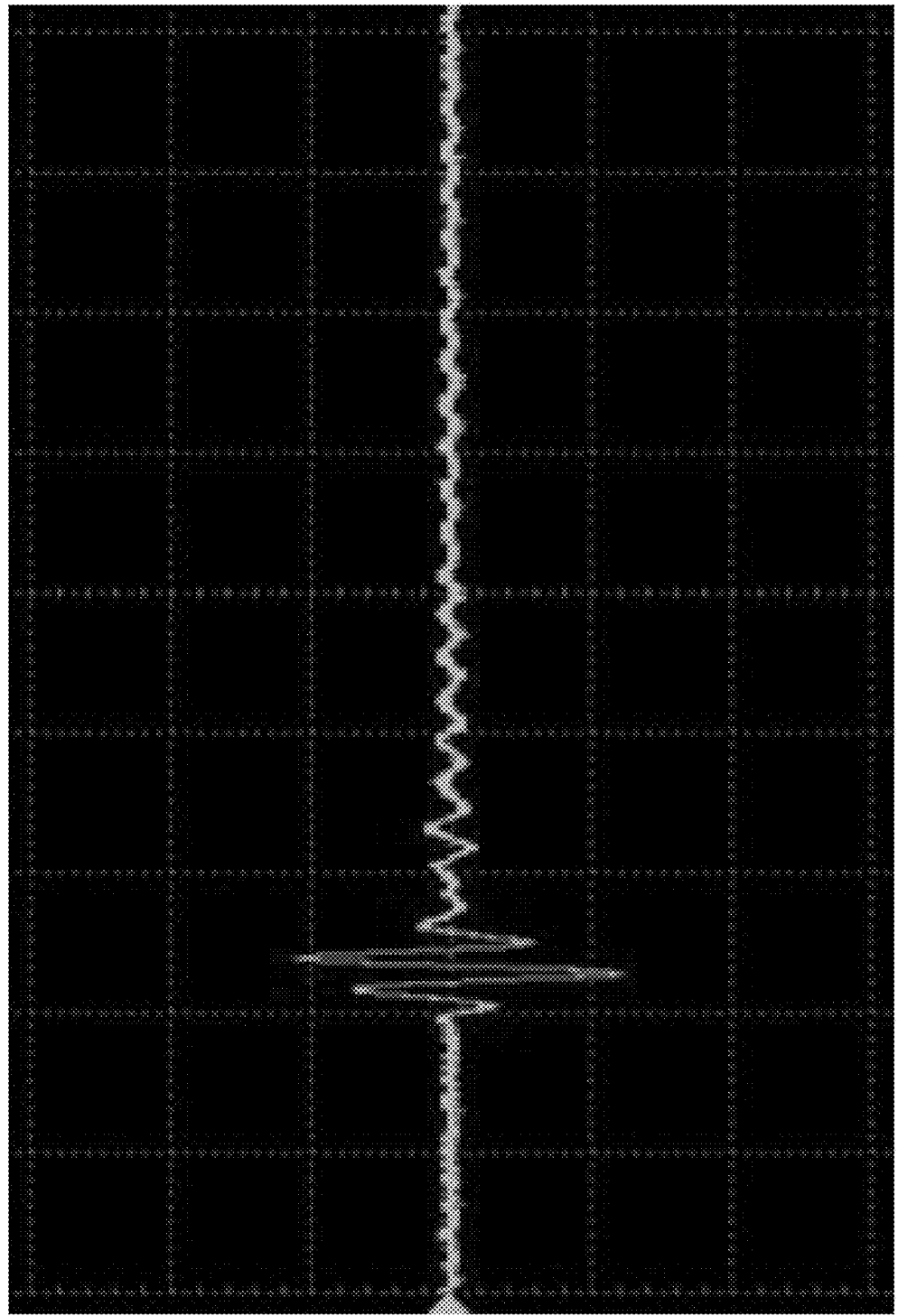
FIG. 5 illustrates an example tick waveform in accordance with aspects of the technology.
Figure 6:
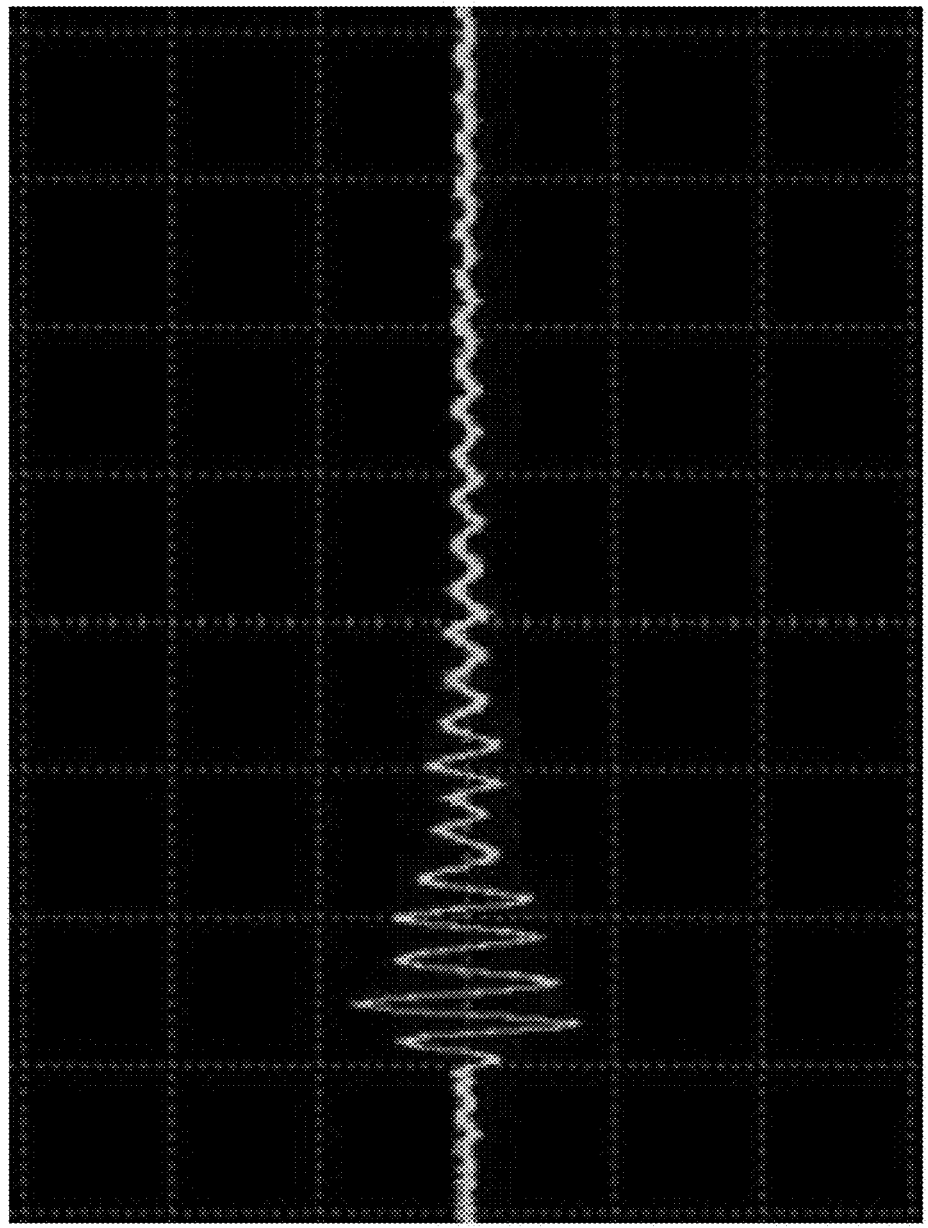
FIG. 6 illustrates an example knock waveform in accordance with aspects of the technology.
Figure 7:
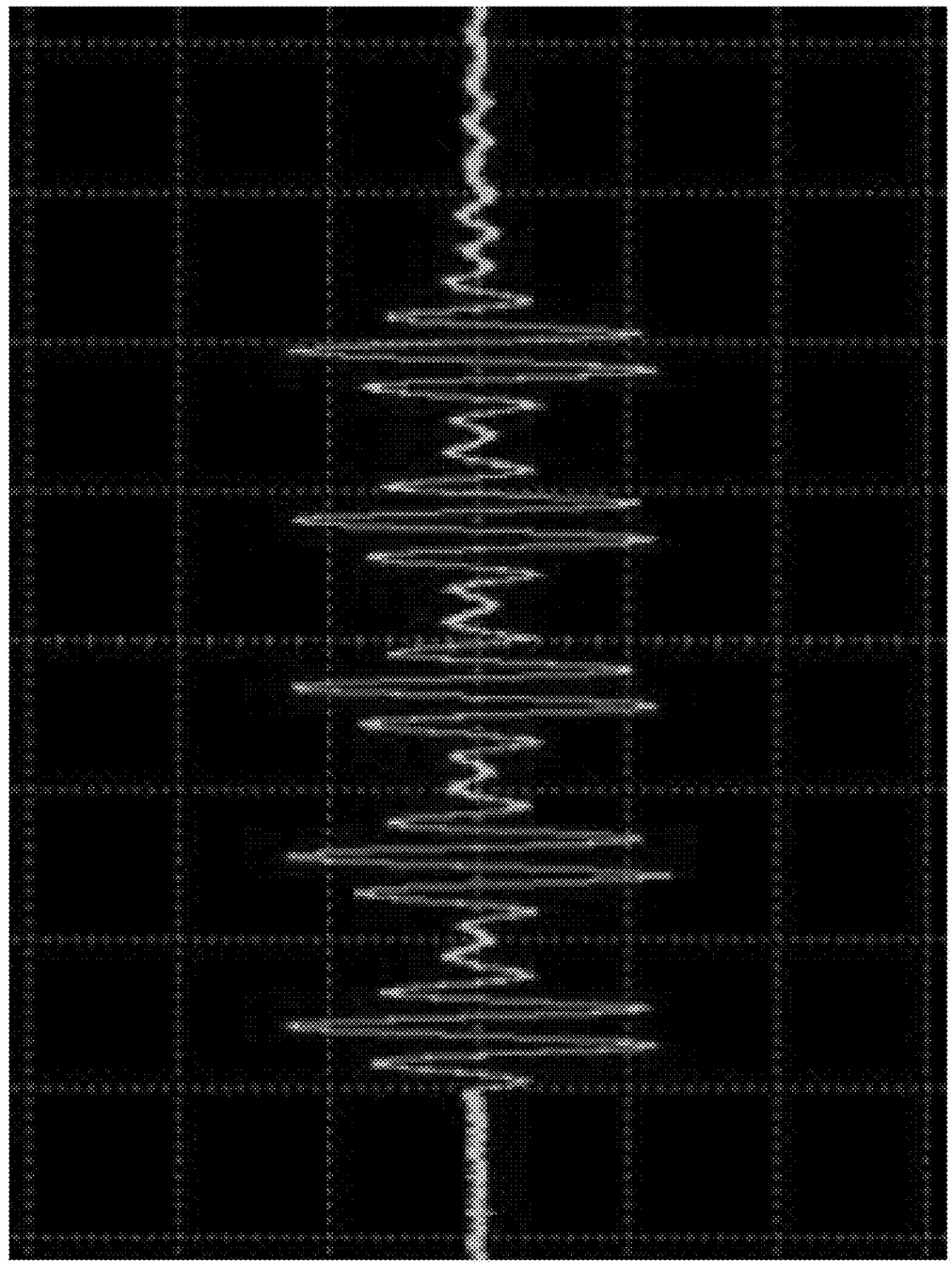
FIG. 7 illustrates an example alert waveform in accordance with aspects of the technology.

FIG. 5 illustrates a tick waveform, which can be generated as a sine wave having a relatively short period on the order of 10 ms-25 ms and an amplitude on the order of 350 mV-750 mV. FIG. 6 illustrates an example of a knock waveform, which can be seen to have a longer attenuated "bump". Here, the knock may have a peak amplitude on the order of 250 mV-500 mV, and a duration on the order of 40 ms-80 ms, or more or less. Finally, an example alert waveform is illustrated in FIG. 7. While the alert can take different forms to produce, e.g., a buzz-type sensation or a repeated sensation, a roll waveform is shown that has a generally repeating pattern with a periodicity on the order of 10 ms-25 ms and a peak amplitude on the order of 350 mV-600 mV.

The above discussion of waveforms is merely exemplary, and as noted the amplitude and/or duration of each may be adjusted.

Figure 8A:
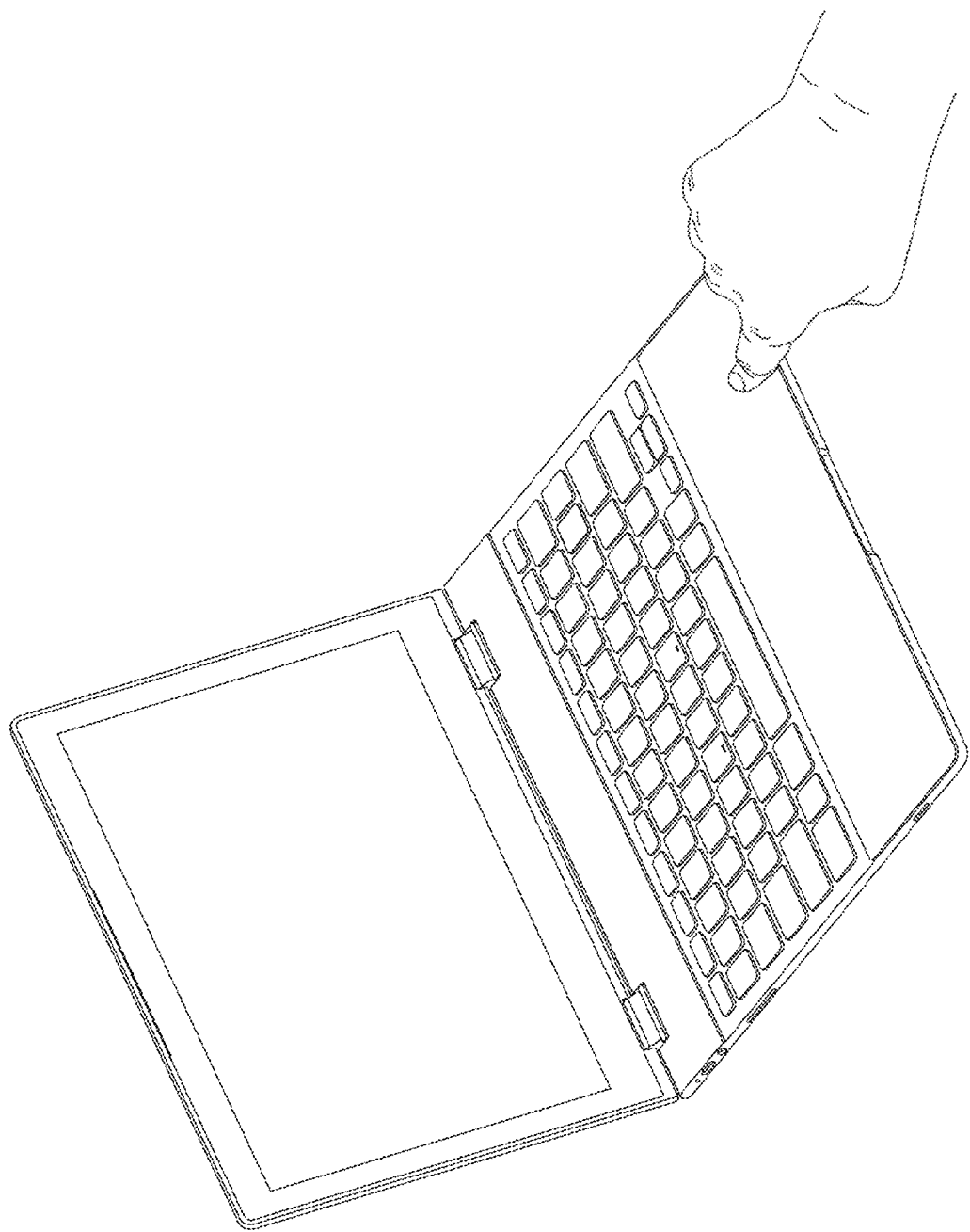
FIGS. 8A-B illustrates an example user input on a trackpad in accordance with aspects of the technology.
Figure 8B:
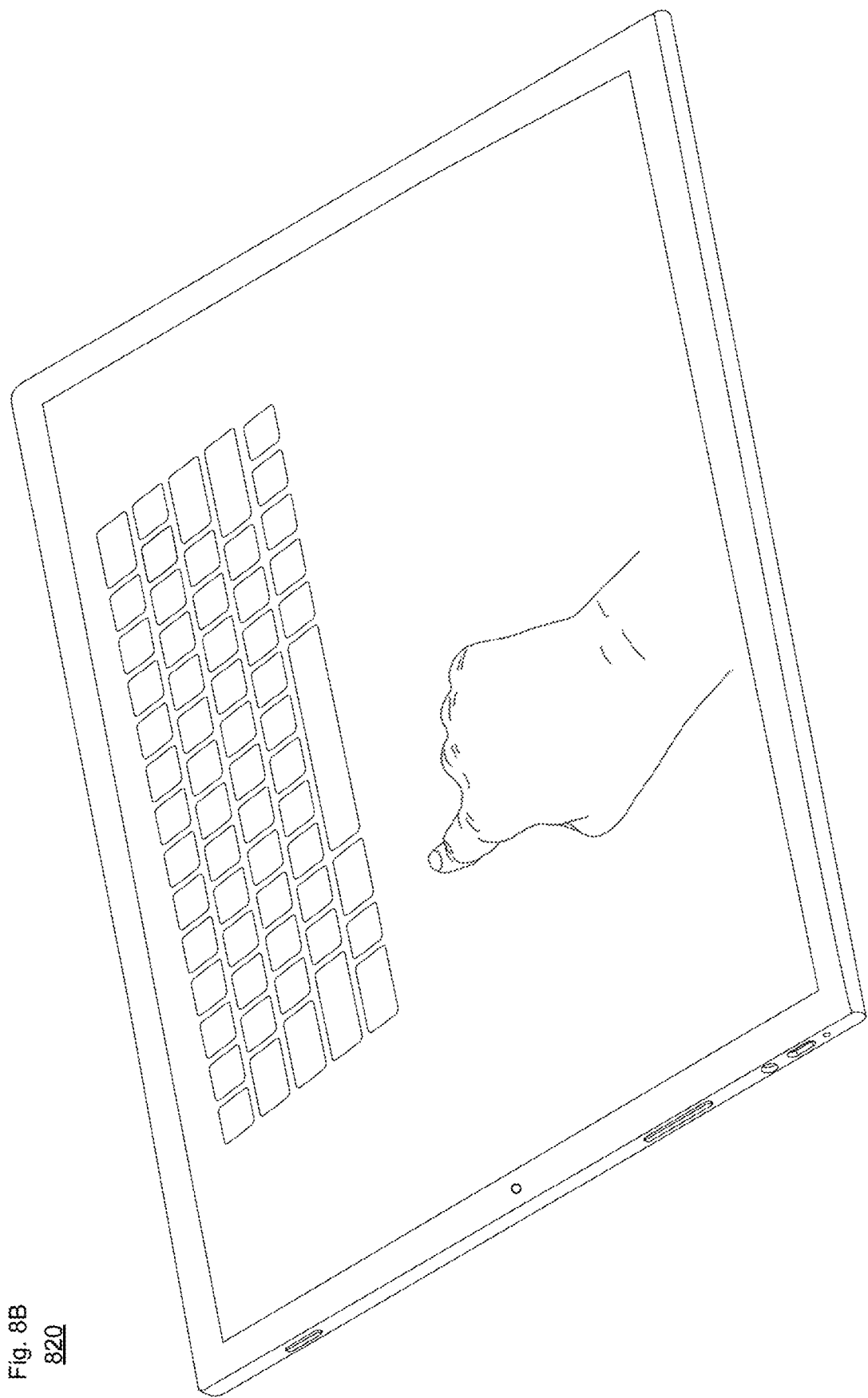
Figure 9A:
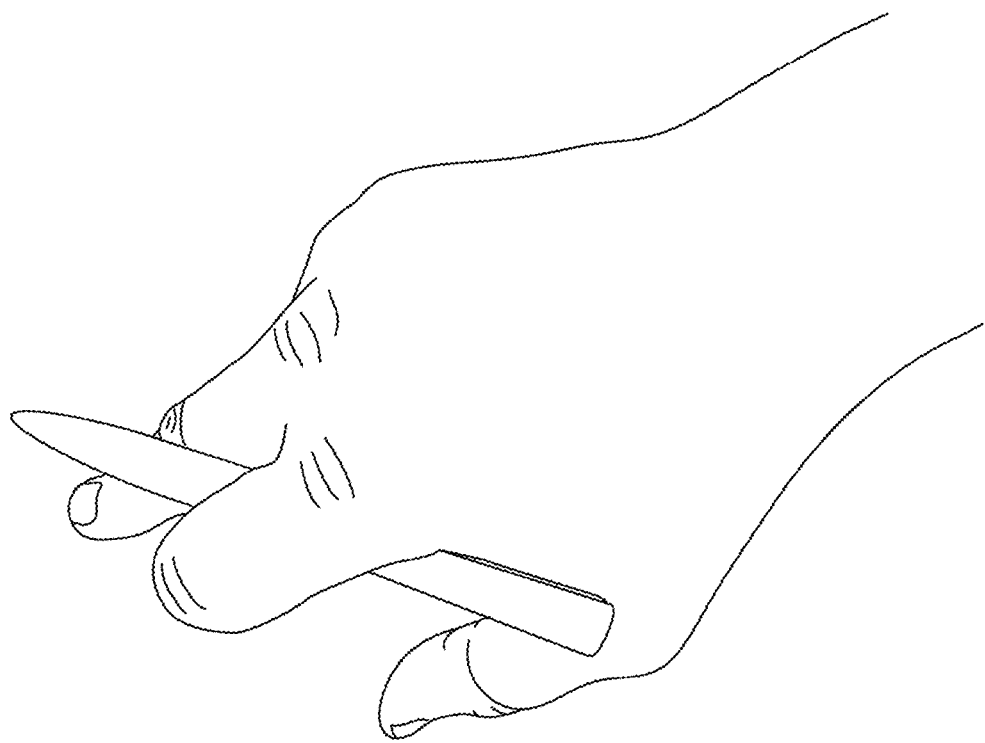
FIGS. 9A-B illustrate other example user inputs in accordance with aspects of the technology.
Figure 9B:
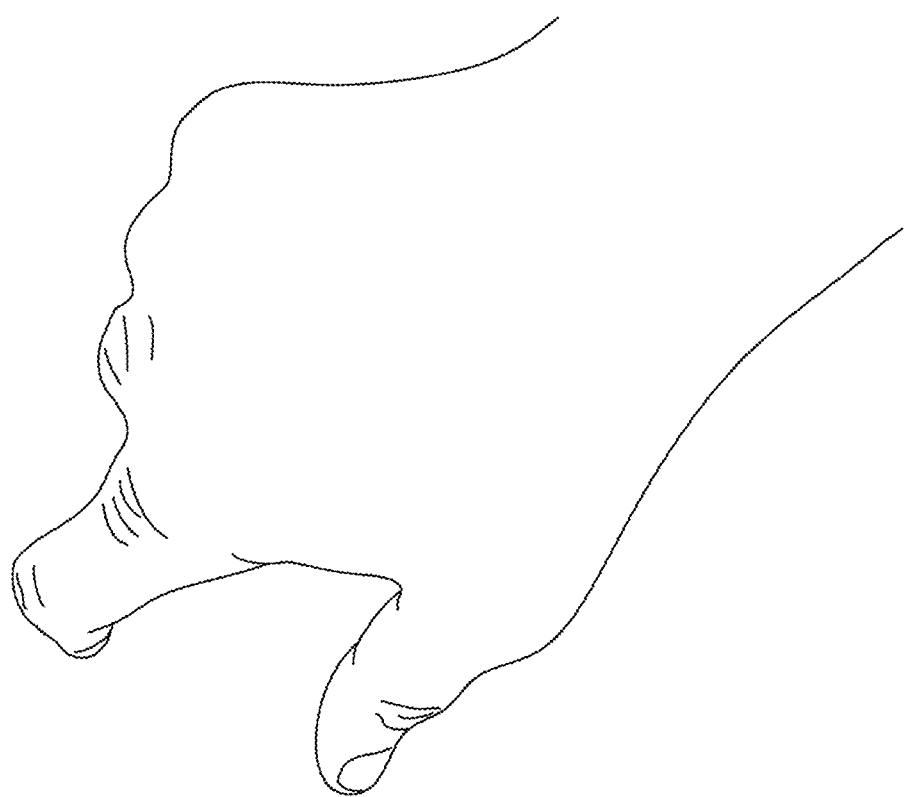

The user may interact via the trackpad of the computing device in different ways. For instance, as shown in example 800 of FIG. 8A, the person may use a single finger, such as the pointer finger, to move a mouse around on the display, select an icon or take some other action. FIG. 8A illustrates the input on the trackpad area of a laptop, while FIG. 8B illustrates another example of input on a trackpad area of a tablet device. FIG. 9A illustrates a user's hand as they may perform a pinch or reverse-pinch motion on the input surface using their fingers (here, with a stylus secured in their hand while making the motion. And FIG. 9B illustrates a user's hand as they perform a pinch or reverse-pinch motion on the input surface of the trackpad using their fingers. In other examples, the user may sweep different numbers of fingers across the trackpad to signify different gestures or other actions.

In these types of situations, where haptic feedback is provided, the reason for which the feedback is being provided may be clear to the user. For instance, it may match a visual and/or audible change in the user interface or be responsive to a particular user action. By way of example, the selected haptic feedback may be provided concurrently with a click or a buzz sound that is played while the user is interacting with an app. The device may be configured such that the haptic feedback does not come as a surprise to the user. In addition, haptic feedback may be used relatively sparingly in order to avoid confusion and the feedback's relevance being diminished.

Example Scenarios

Figure 10A:
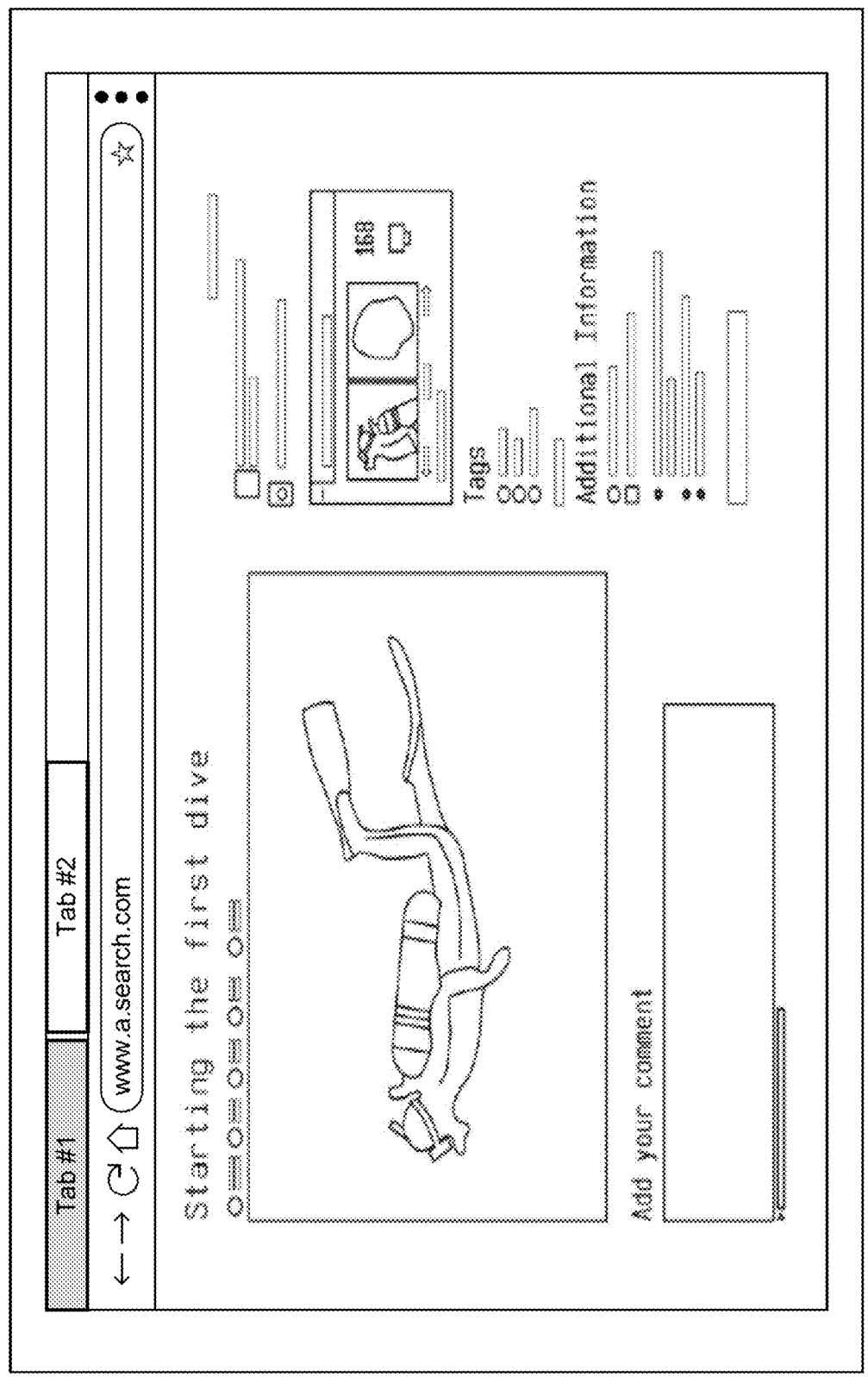
FIGS. 10A-C illustrate an example of snap feedback with a split screen in accordance with aspects of the technology.
Figure 10B:
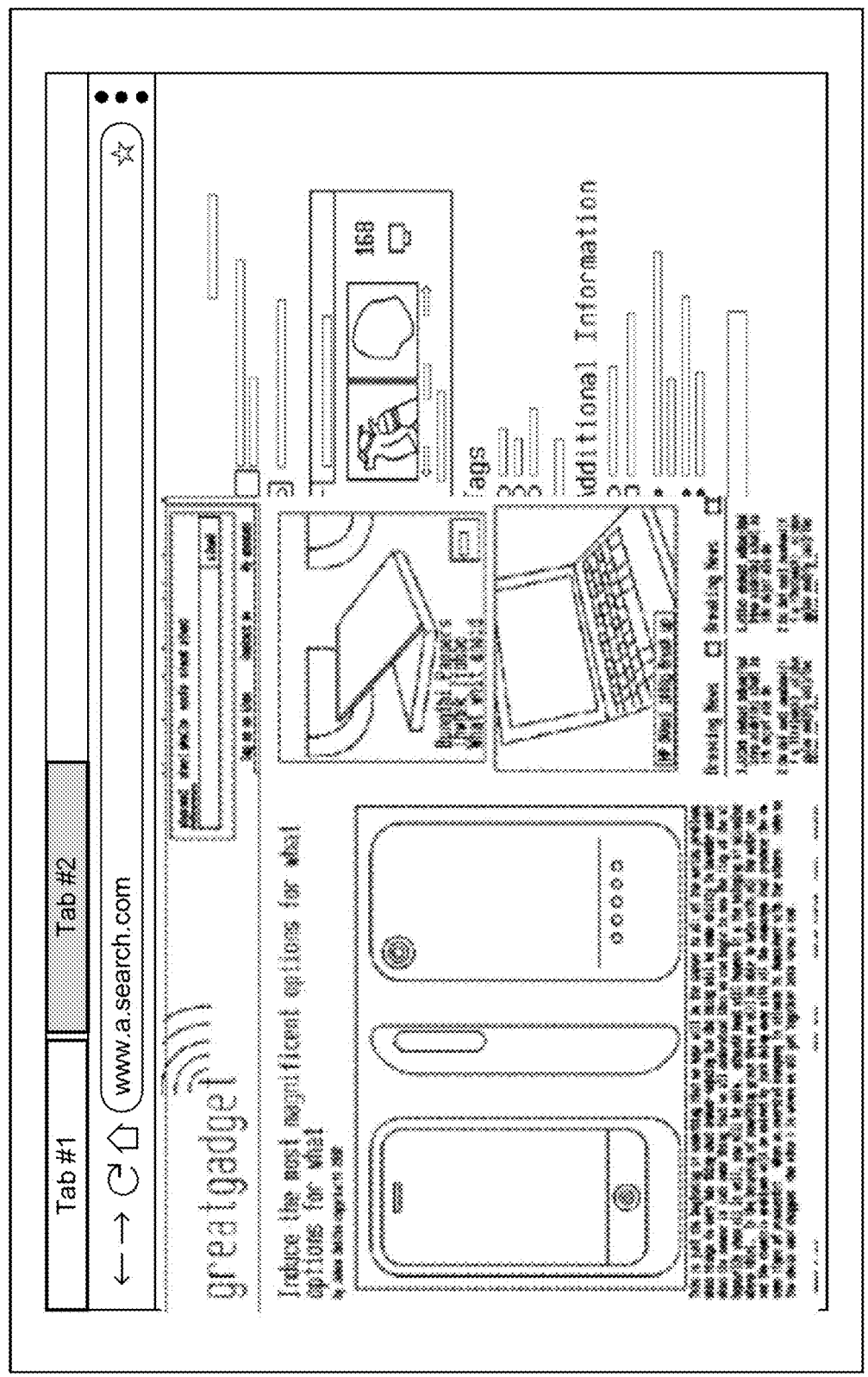
Figure 10C:
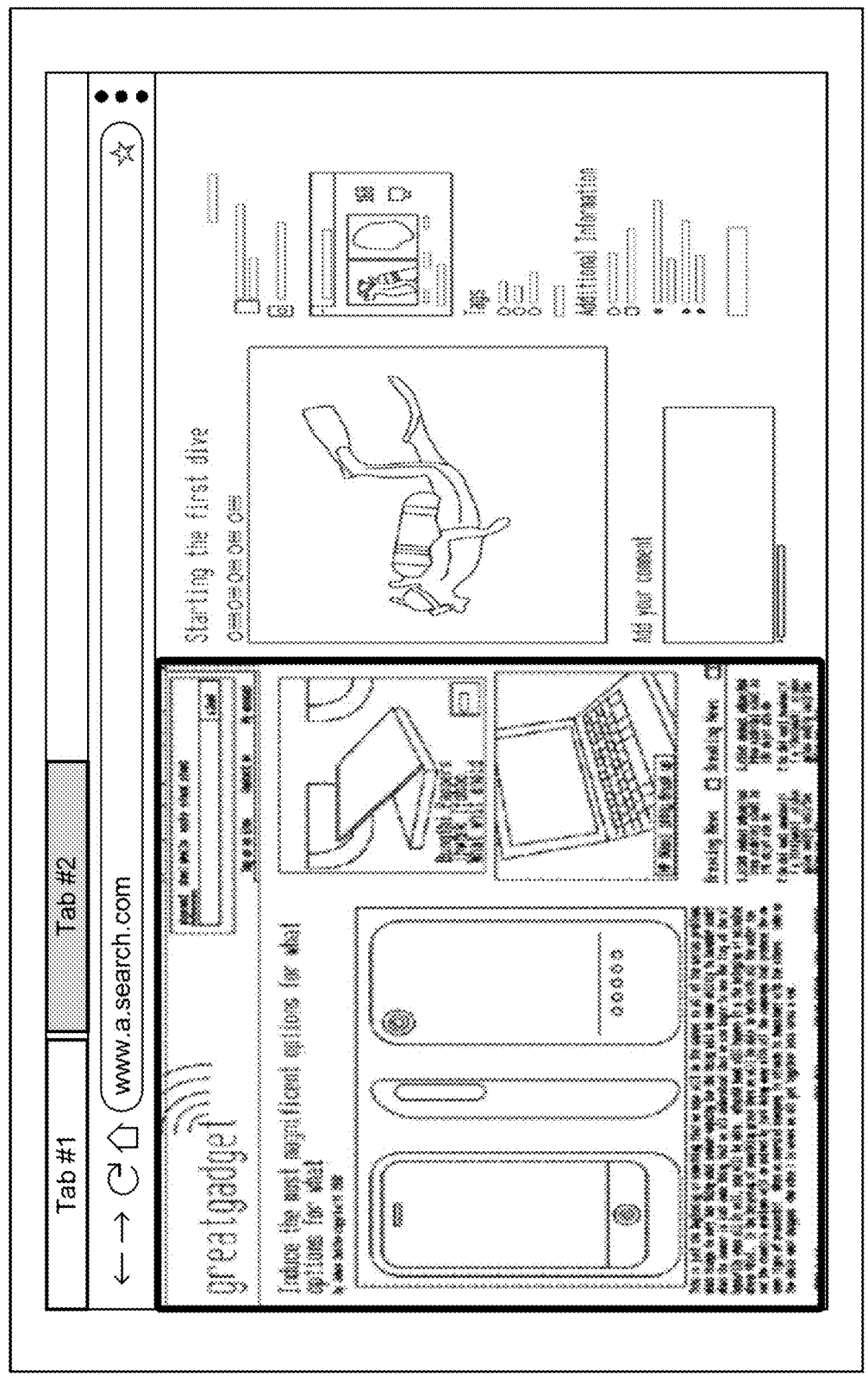

FIGS. 10A-C illustrate a scenario involving snap feedback with a split screen. A browser or other app may have multiple windows open concurrently. As shown in FIG. 10A, there are two tabs in a browser, with the window for Tab #1 being presented. In FIG. 10B, the user has clicked on Tab #2 and has started a process to split the screen to see both tabs (windows) at the same time. As indicated in FIG. 10C by the thick black border of the displayed content, once the window for the second browser tab has been brought to the edge of the display area, a snap-type feedback sensation is provided to the user via the trackpad to indicate the event has occurred.

Figure 11A:
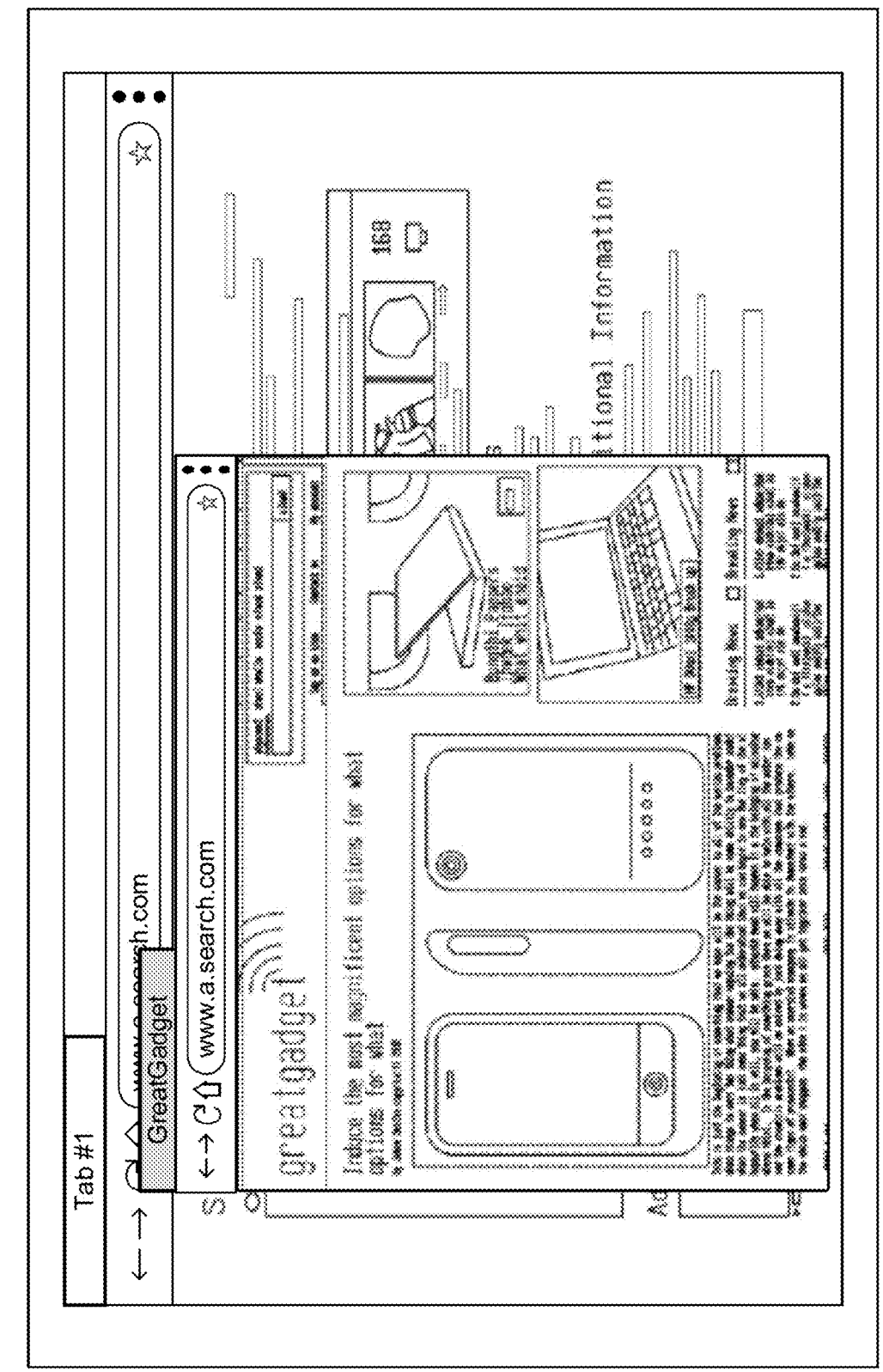
FIGS. 11A-C illustrate an example of snap feedback when maximizing a screen in accordance with aspects of the technology.
Figure 11B:
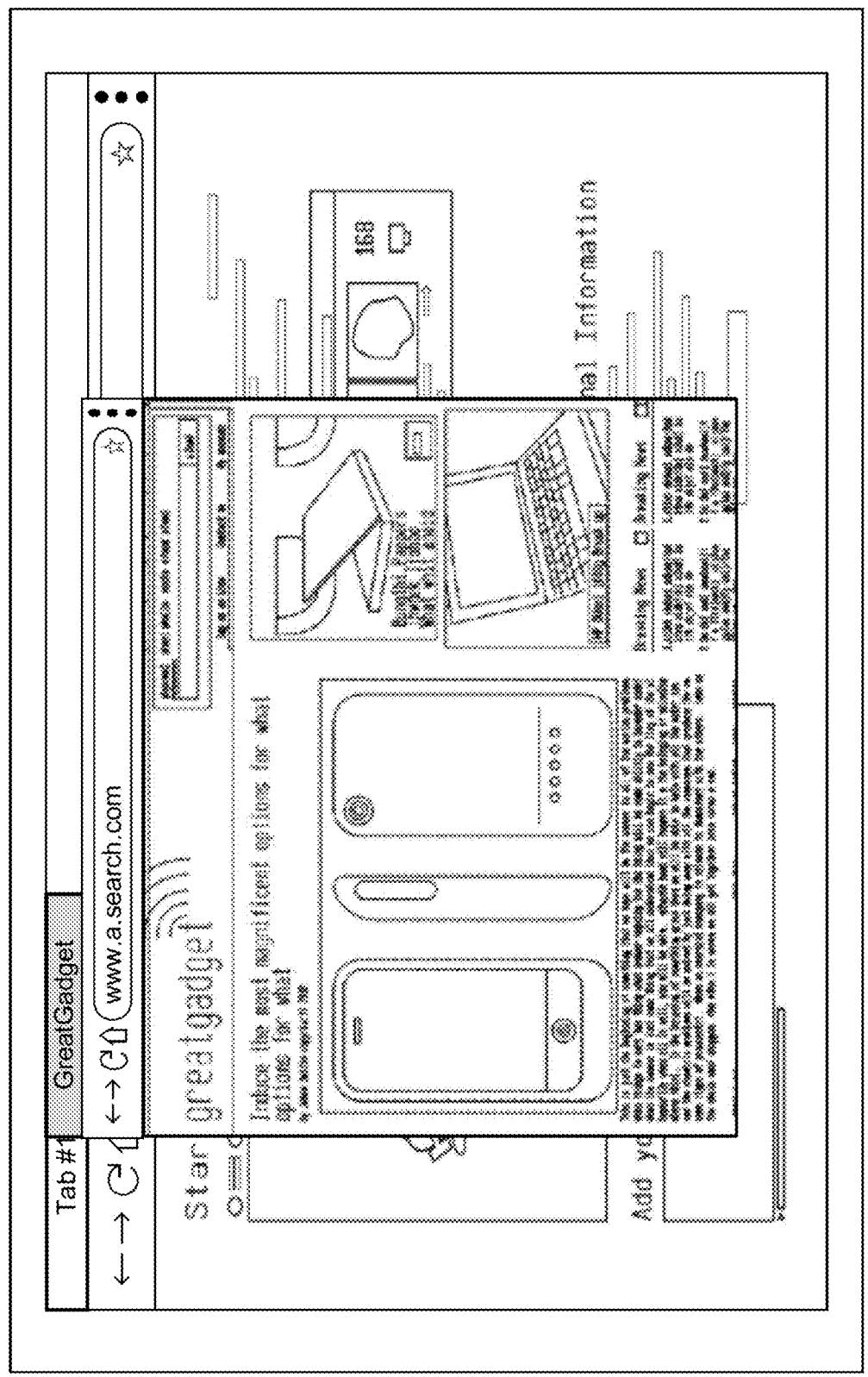
Figure 11C:
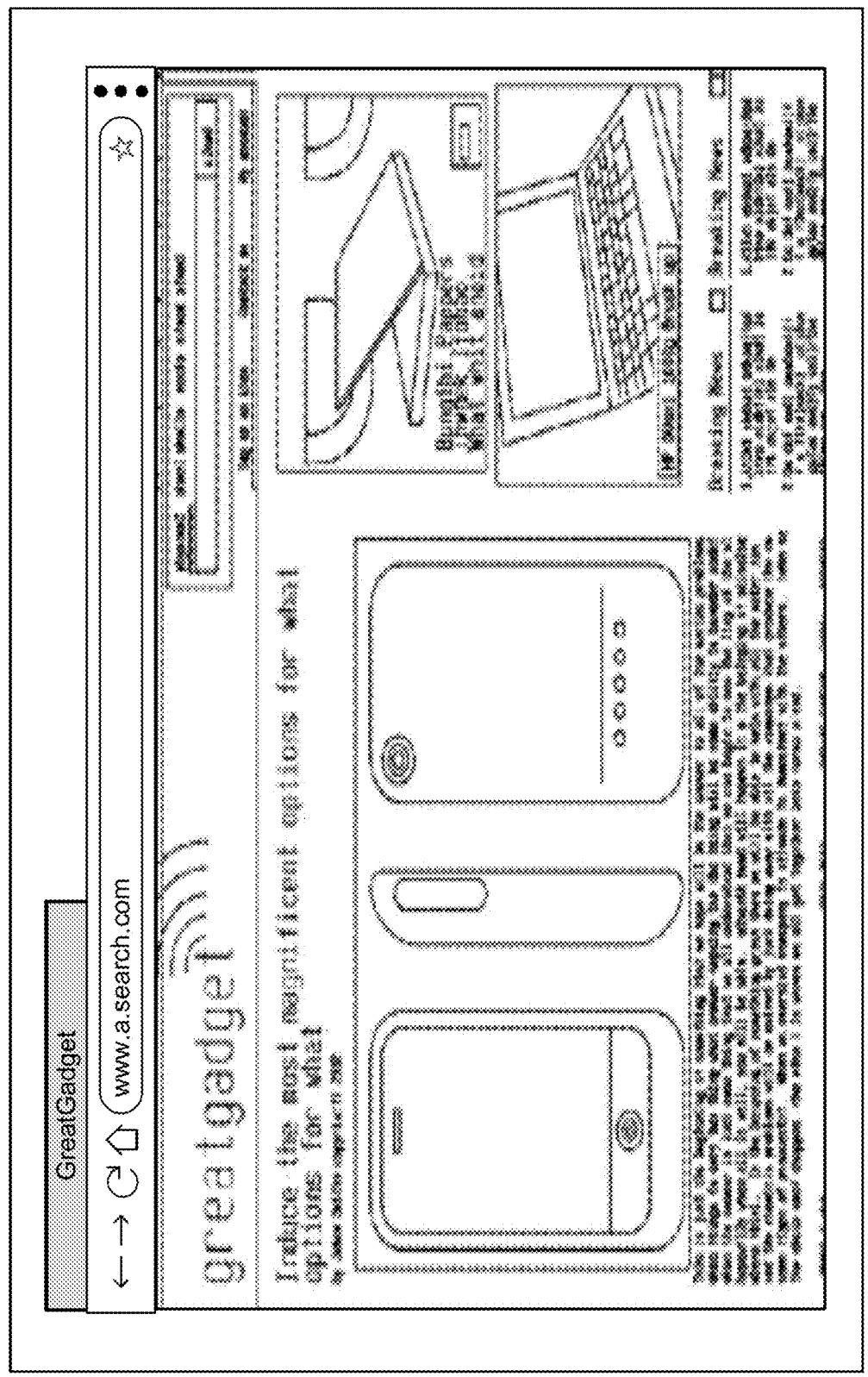

FIGS. 11A-C illustrate a scenario involving snap feedback when maximizing a window. Here, assume the user wants to focus on a task by maximizing the window in which they are working. In this case, as shown in FIGS. 11A-B, that tab is detached (e.g., from the tab bar) and is moved towards an edge (e.g., the top) of the displayable area of the screen in order to work more comfortably. When an edge (e.g., the top) of that window reaches the edge (e.g., the top) of the displayable area as shown in FIG. 11C, a snap-type feedback sensation is provided to the user via the trackpad to indicate the action has occurred. Thus, in this scenario the feedback is provided when reaching the zone (e.g., top or other edge area), not when releasing the window.

Figure 12A:
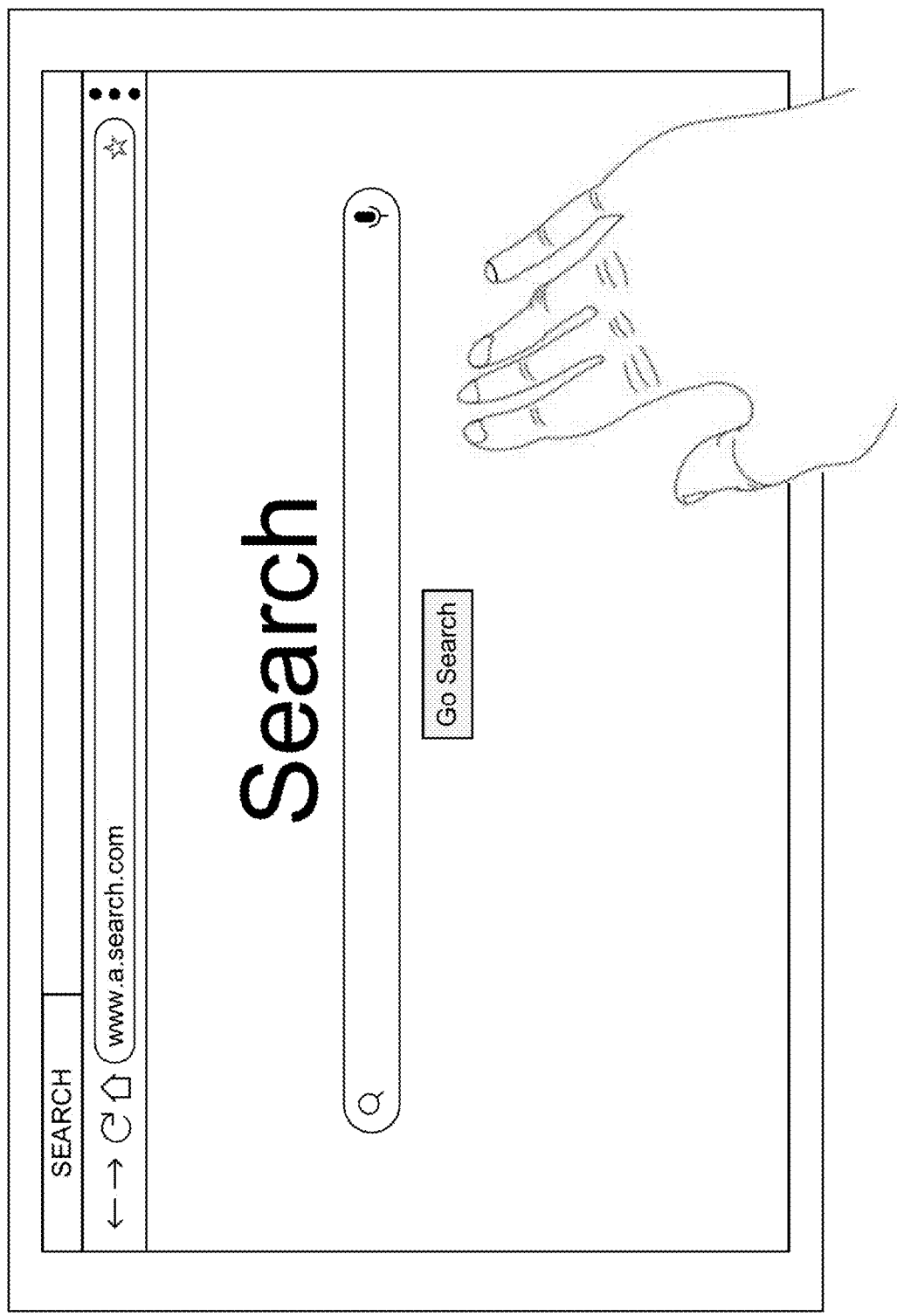
FIGS. 12A-C illustrate an example of tick feedback when switching among virtual desks in accordance with aspects of the technology.
Figure 12B:
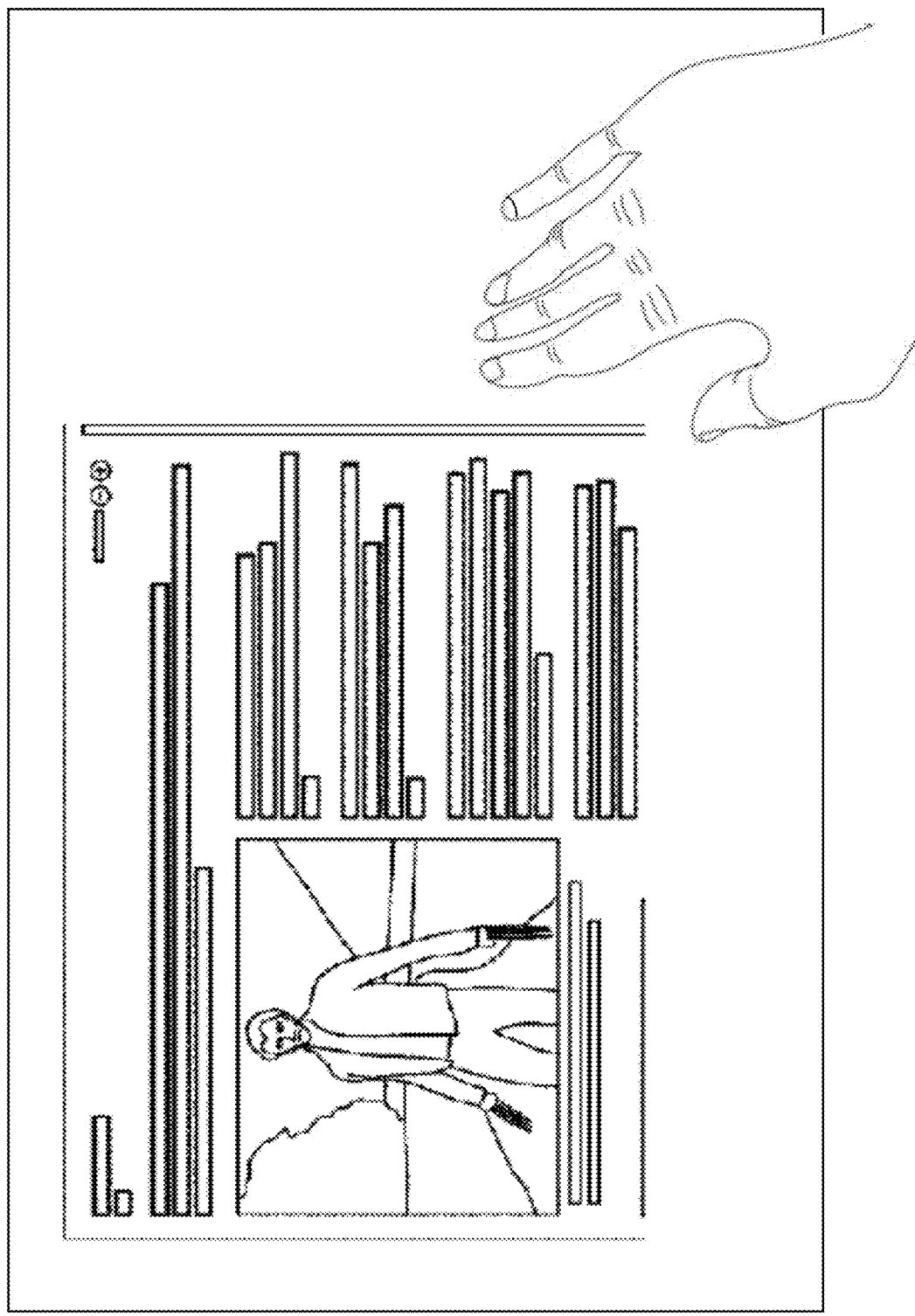
Figure 12C:
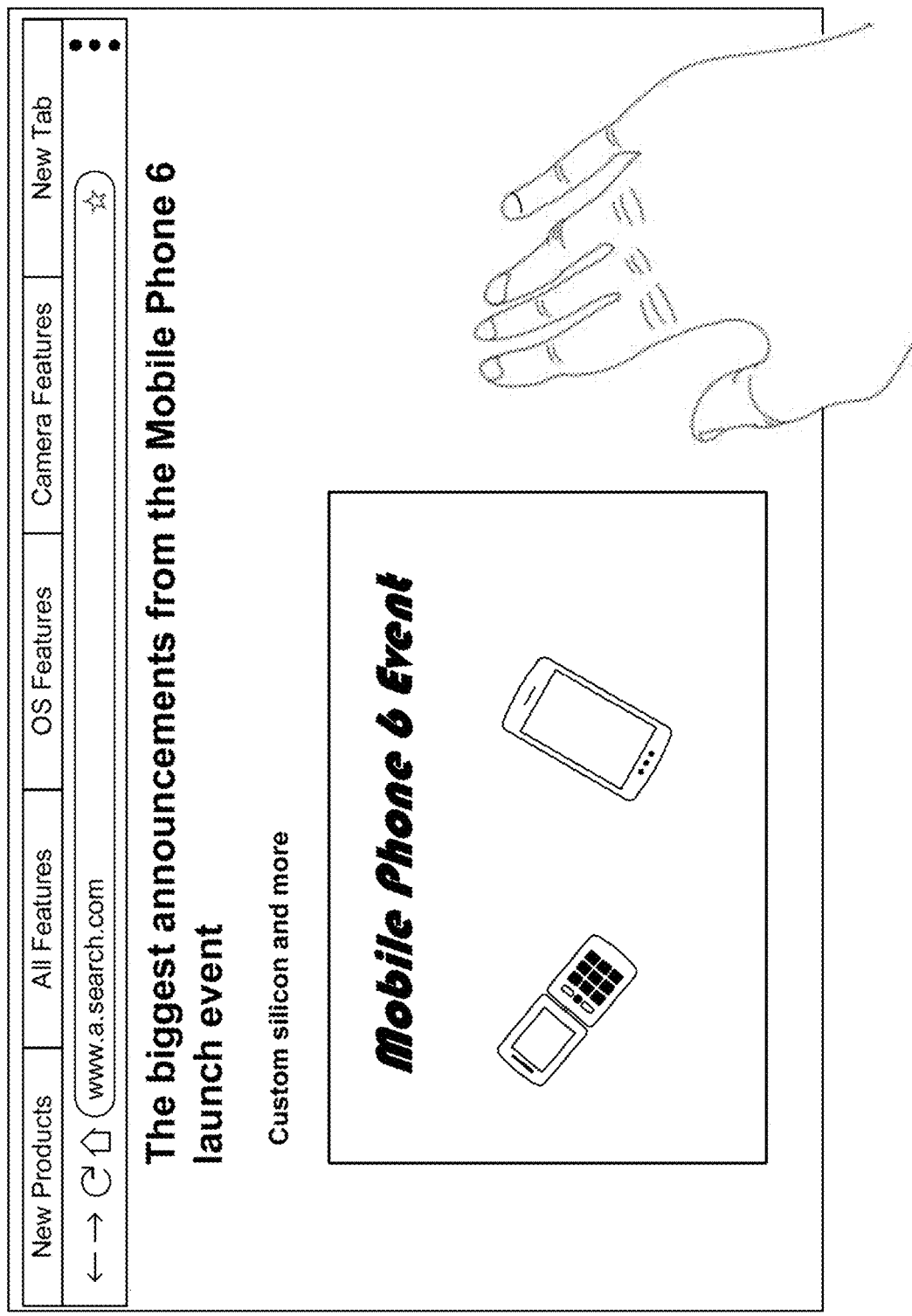

As noted above, the UI may support a set of virtual desks, where each desk may be associated with a different suite of apps or support particular features. For instance, the Chrome OS supports multiple desktops, in which different windows or tabs may be associated with selected desks. Such virtual desks allow a user to organize their work into different virtual spaces. The user can easily move between the different desks, which can help to keep themselves focused and productive. FIGS. 12A-C show an example of a user using their hand (e.g., 4 fingers) to navigate between virtual desks. Here, a tick-type haptic sensation is received by the user each time the user reaches a new desk (performing a desk switching action) via a gesture along the trackpad (or touchscreen). This provides tactile confirmation to the switching action.

Figure 13A:
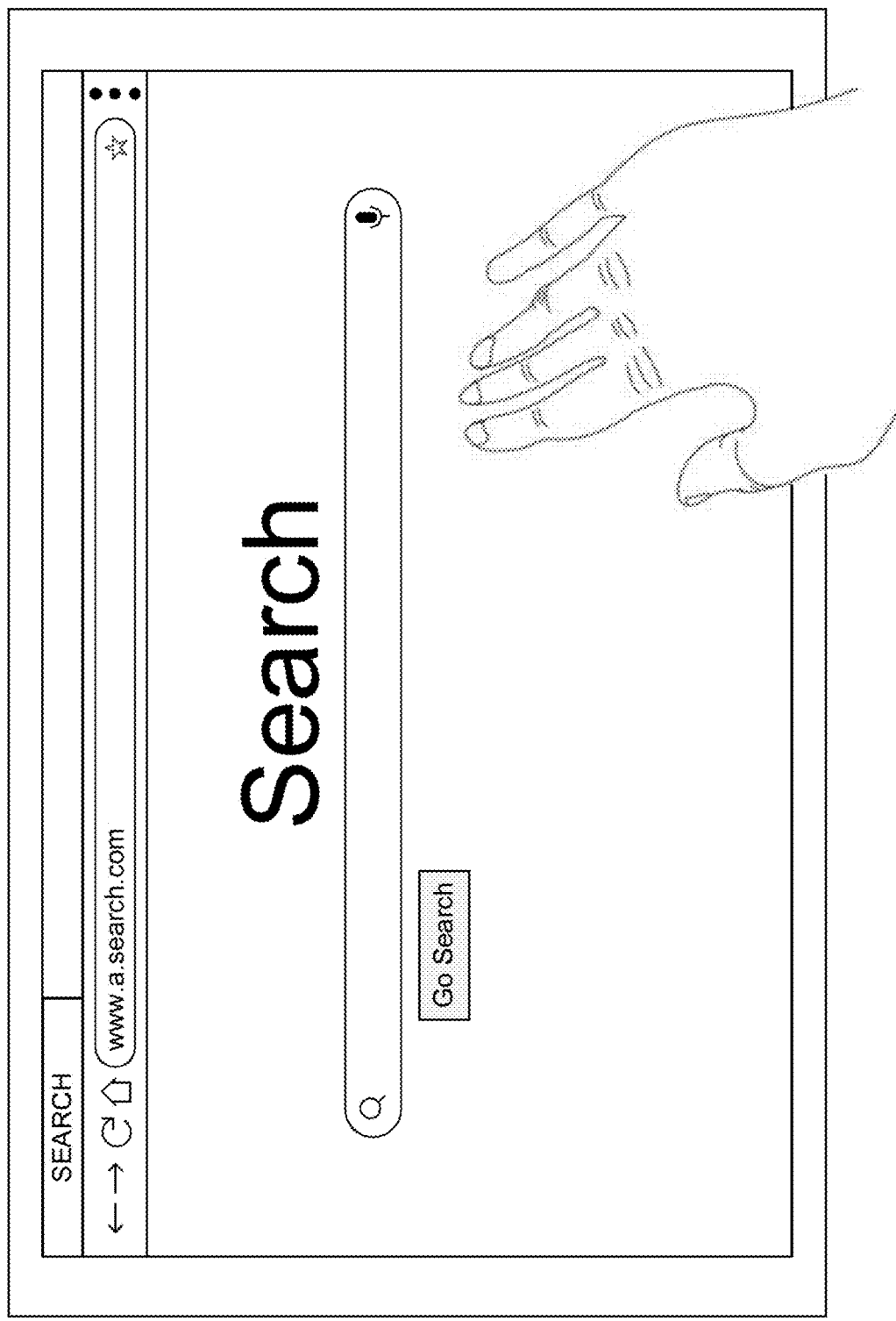
FIGS. 13A-C illustrate an example of knock feedback when a virtual desk is unavailable in accordance with aspects of the technology.
Figure 13B:
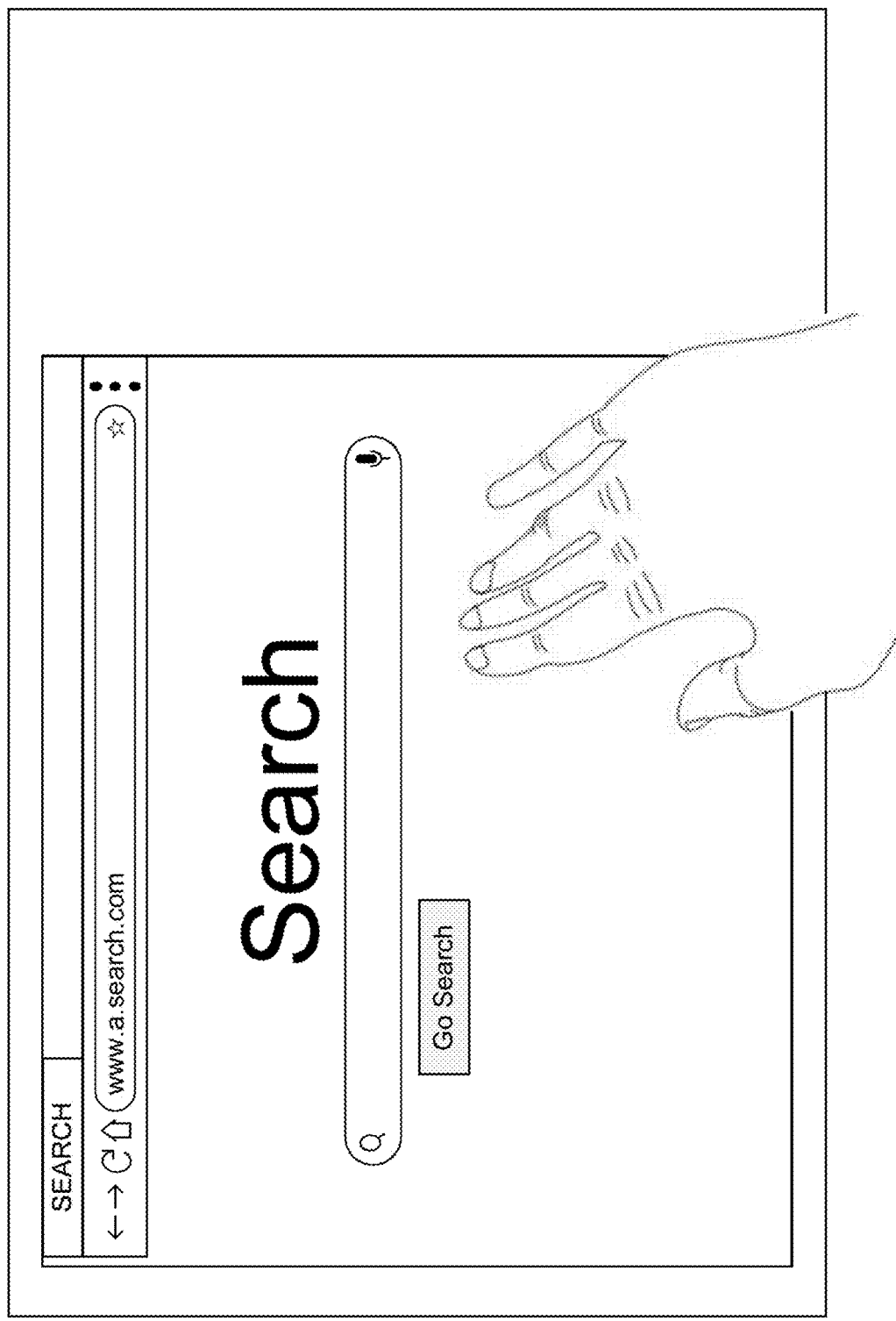
Figure 13C:
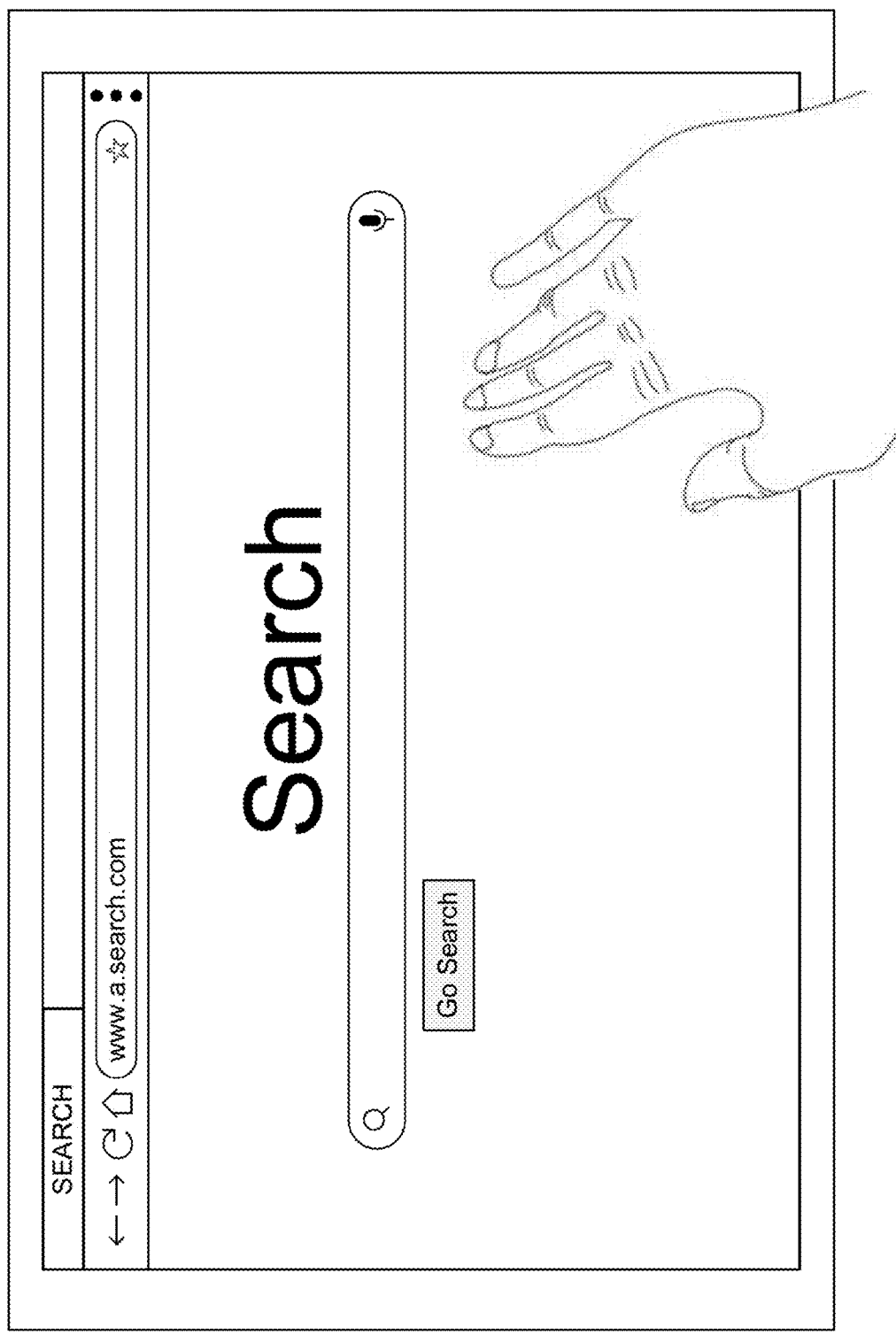

In some situations, the user may try to swipe to a desk that is not there. For instance, the interface may limit the number of desks to between 5-10, but the user may continue to gesture once the last desk is reached. Here, as shown in FIGS. 13A-C, the user is trying to move from a last desk with a browser window being displayed. The visual transition shown from FIG. 13A to FIG. 13B to FIG. 13C shows that the window "knocks" up against the side of the display area. Thus, in order to indicate to the user that they are trying to navigate to a desk that does not exist or is unavailable, the user will receive a knock-type haptic sensation.

Figure 14A:
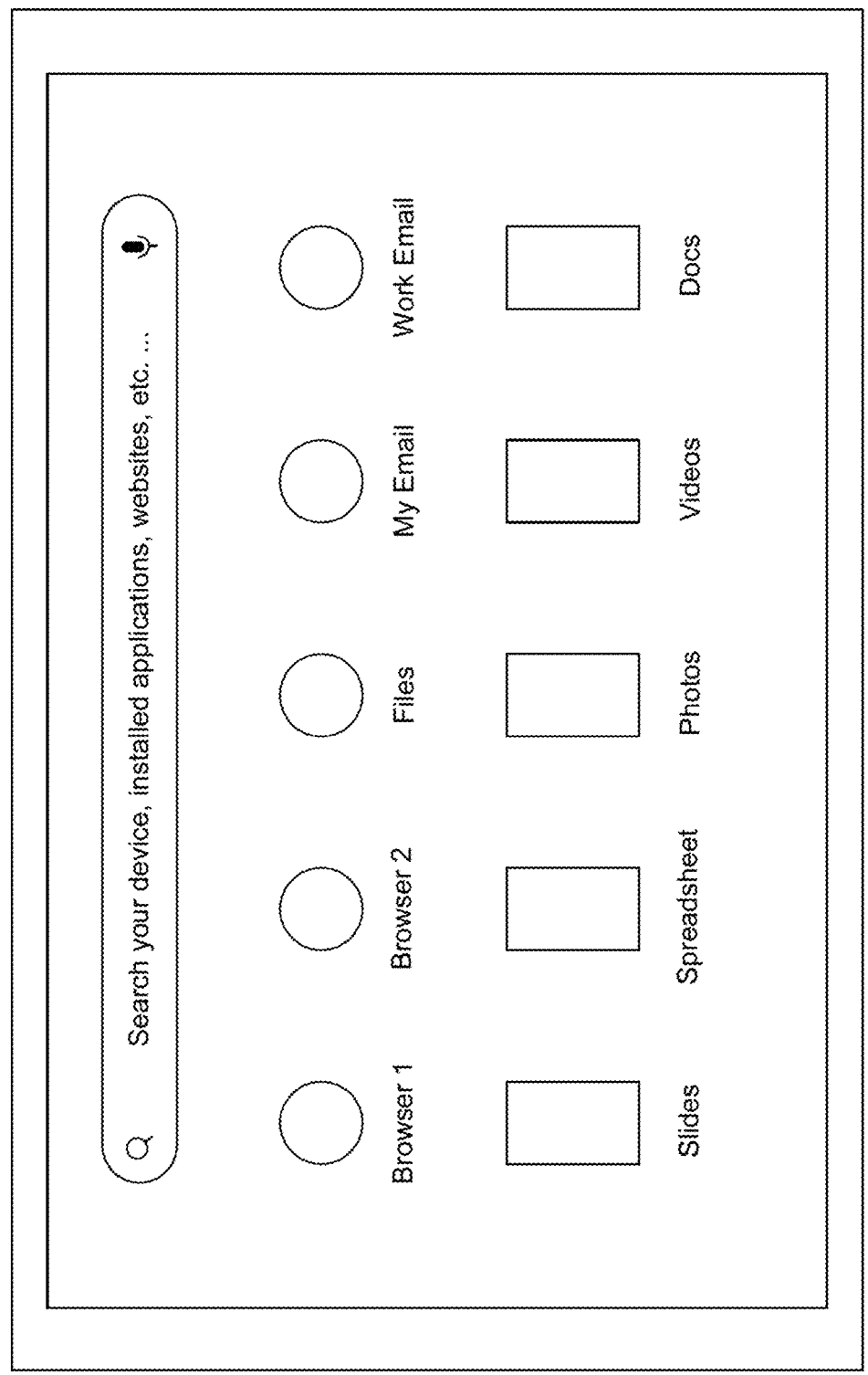
FIGS. 14A-C illustrate an example of tick feedback upon initiation of a drag event in accordance with aspects of the technology.
Figure 14B:
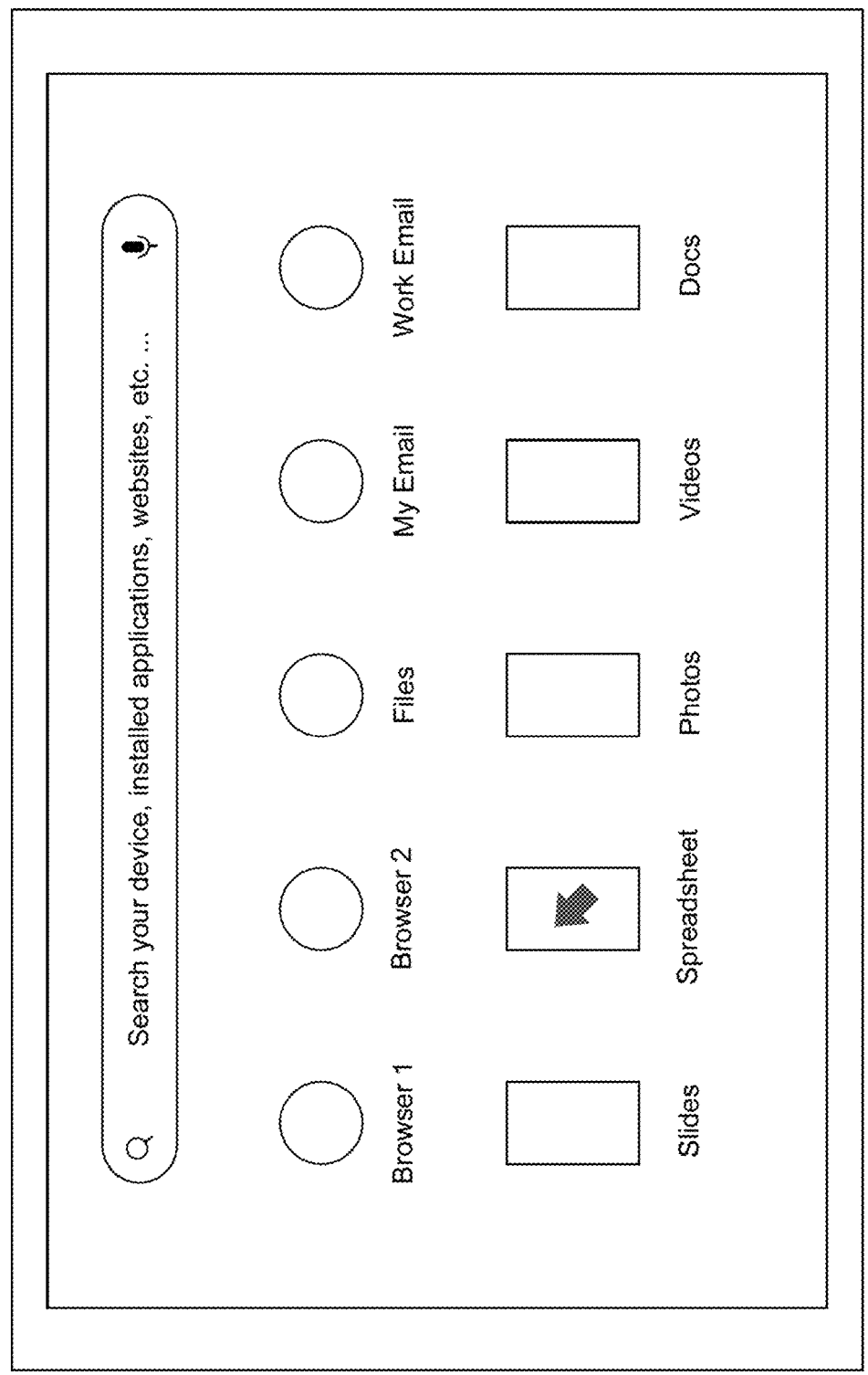
Figure 14C:
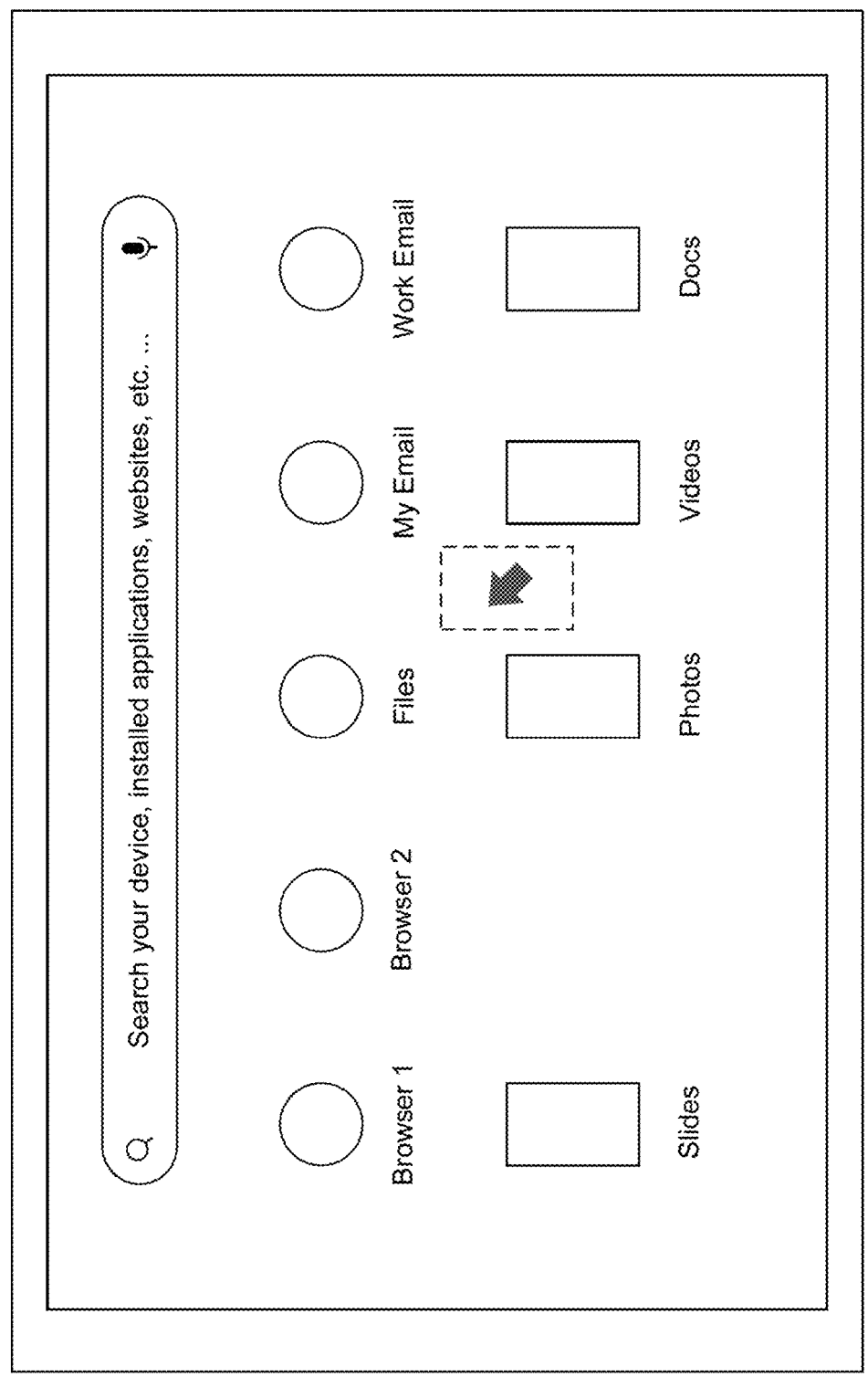
Figure 15A:
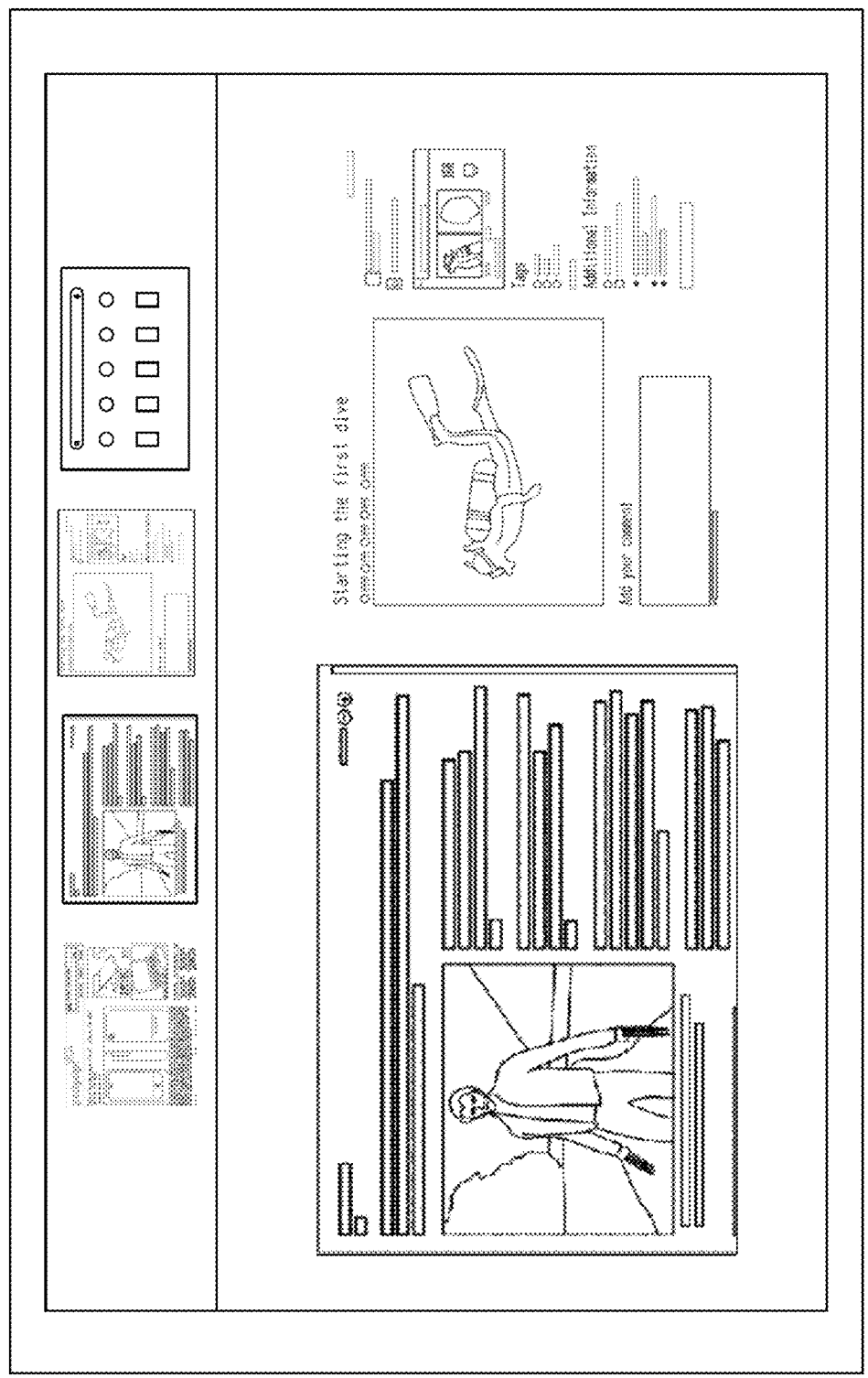
FIGS. 15A-D illustrate an example of tick feedback upon initiation of a drag event for a virtual desk scenario in accordance with aspects of the technology.
Figure 15B:
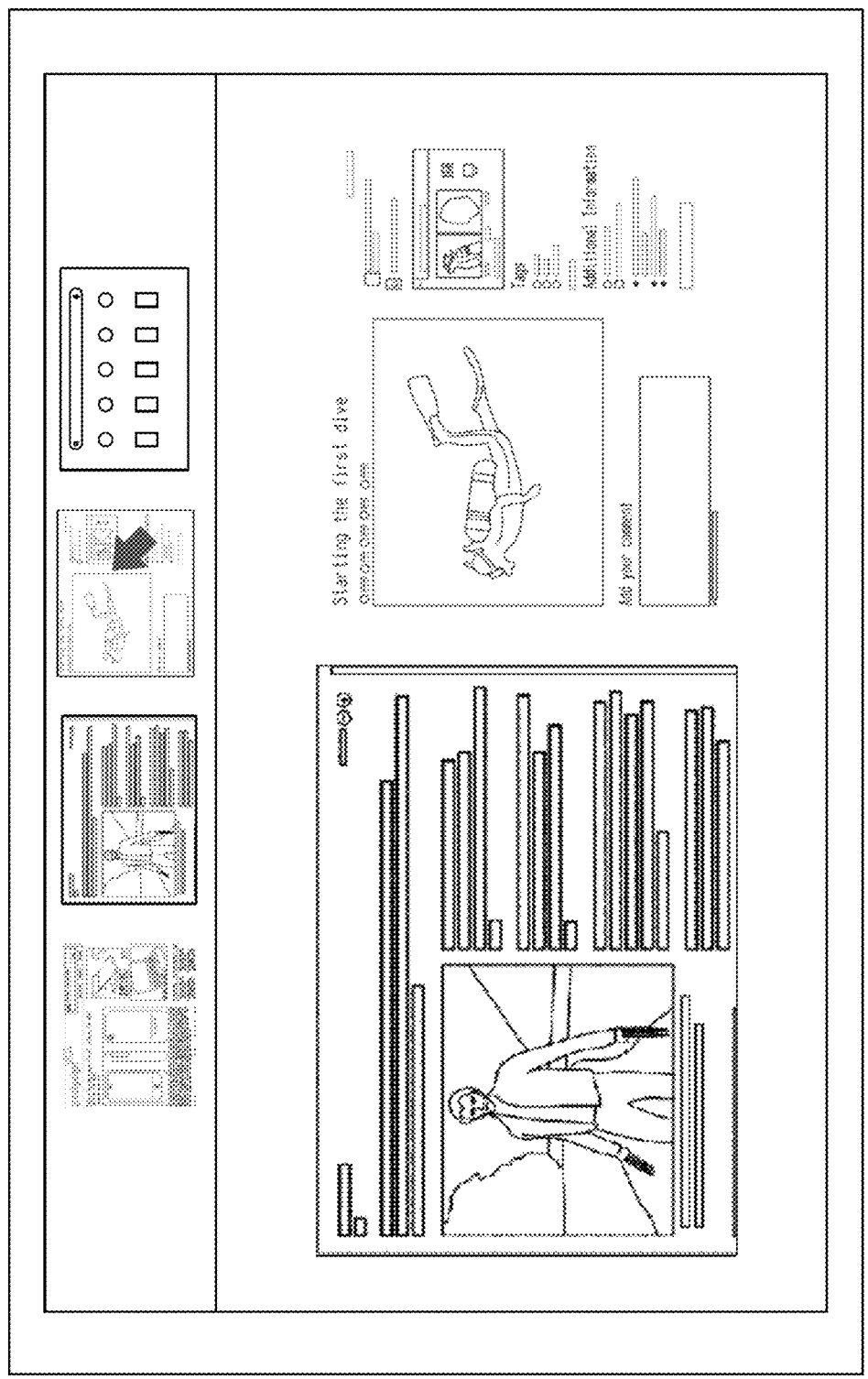
Figure 15C:
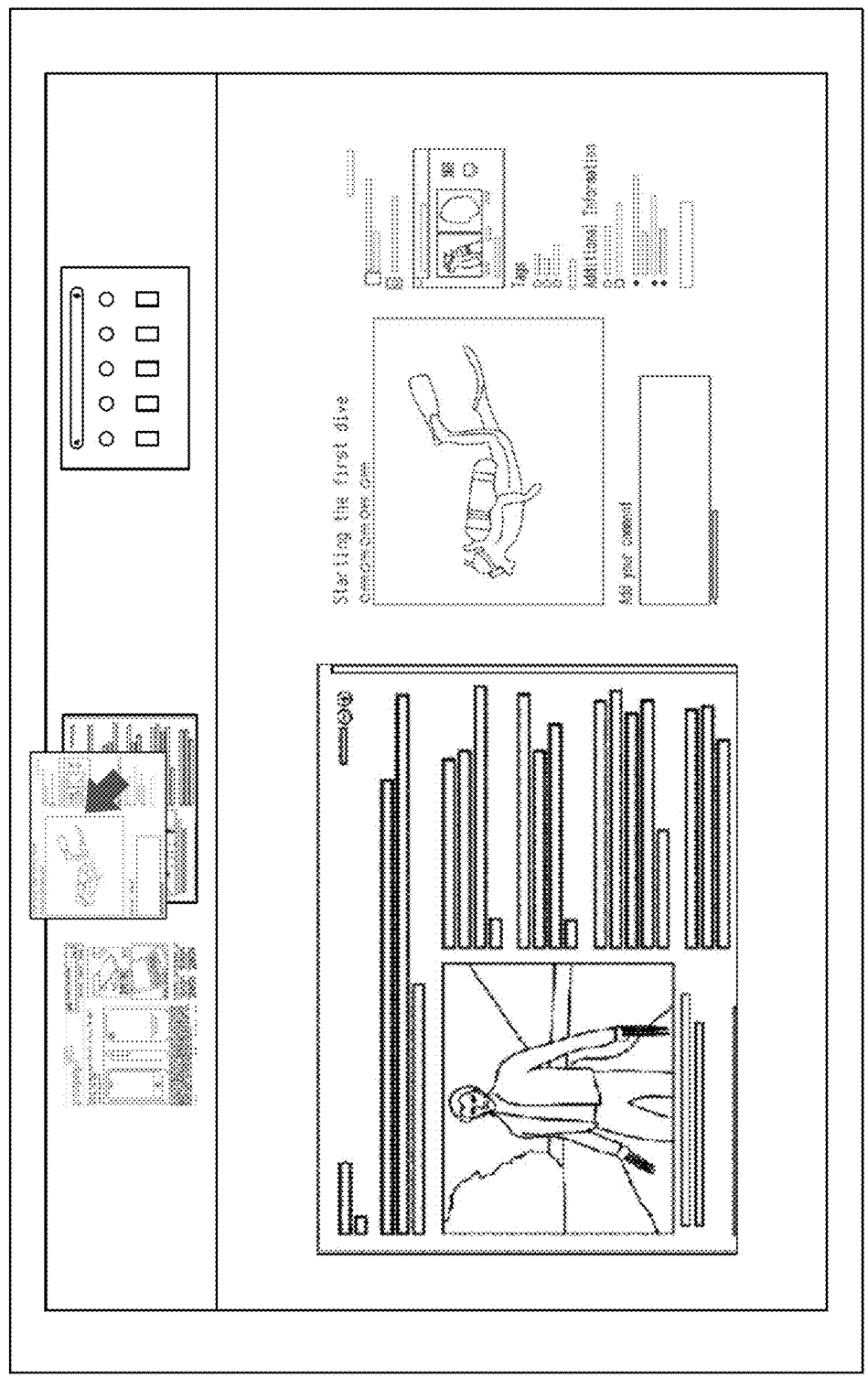
Figure 15D:
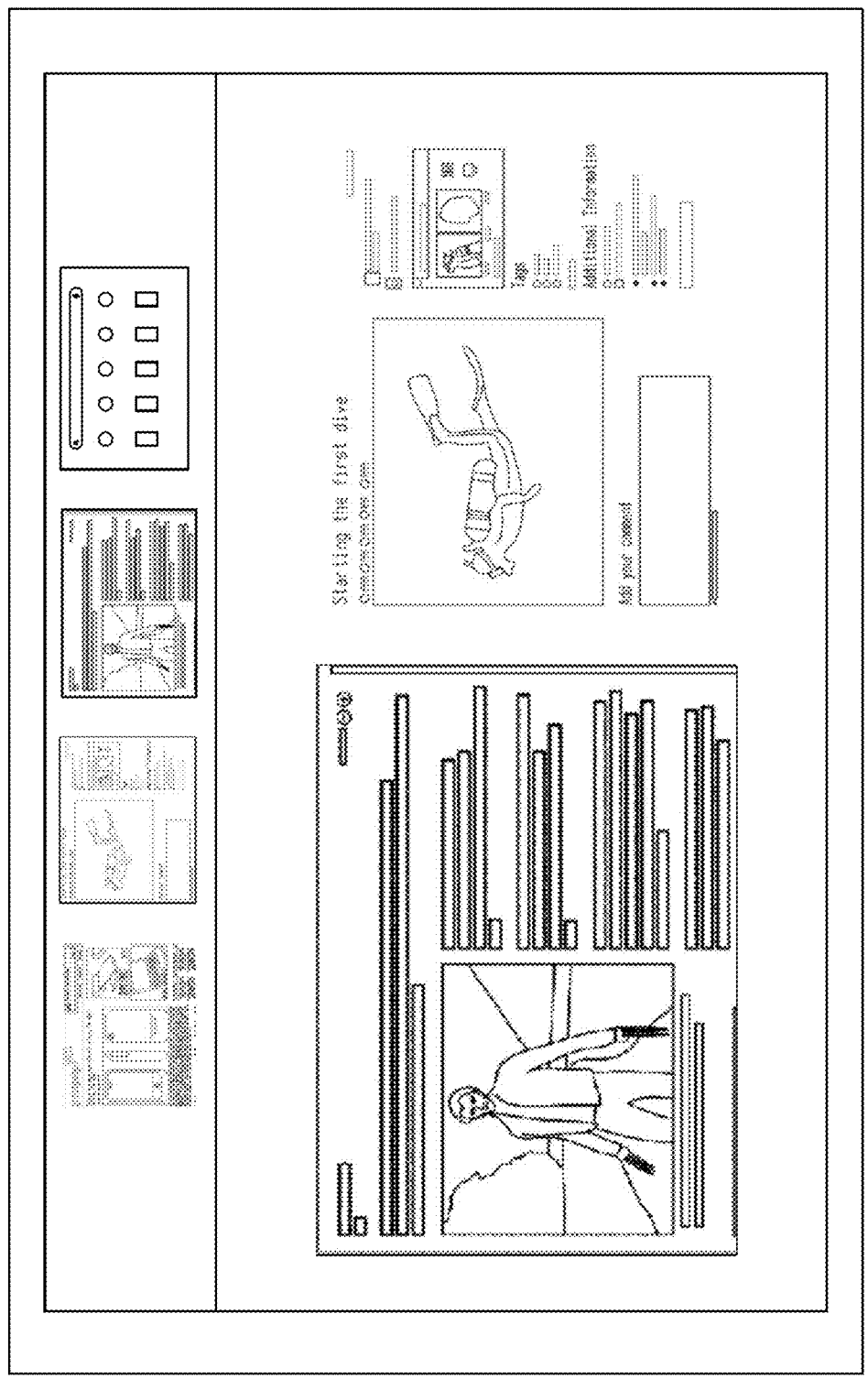

FIGS. 14A-C illustrate an example of when the system may produce a tick-type haptic sensation upon occurrence of a drag event. As shown in FIG. 14A, the UI is displaying an app launcher window with a variety of apps available to the user. In FIG. 14B, as indicated by the arrow, the user is selecting a spreadsheet app. And in FIG. 14C, the user is dragging that app to reorganize the launcher window. Here, state change feedback via a tick sensation is received by the user, for instance when the user long clicked or pressed on the app icon to lift it and start dragging it. In other words, upon applying the long click (or press), the app icon would become moveable. Similar feedback can be applied for other system interface elements besides a launcher window, such as a shelf or tray that includes one or more app launch icons.

FIGS. 15A-D illustrate another example of when the system may produce a tick-type haptic sensation based on a drag event, in particular a virtual desk drag event. As shown in these figures, the user may reorder their virtual desks to better organize their work, such as by moving an icon in a tray located along an upper region of the display. For example, the user may open an "overview" option for the virtual desks, which presents the tray. Then, state change (e.g., tick-type) haptic feedback is generated when the user long clicks or presses on a virtual desk to lift it and start dragging it.

Figure 16A:
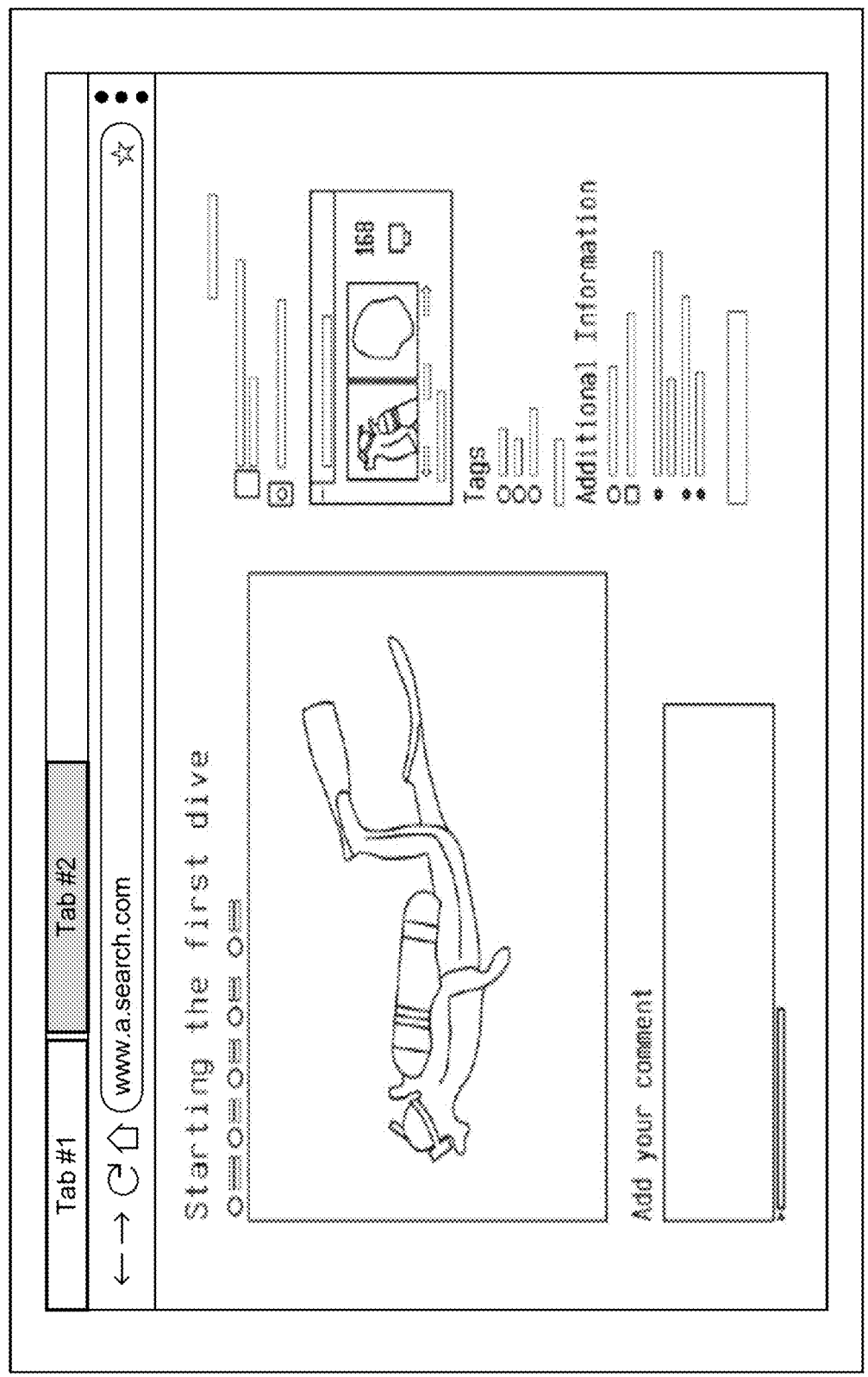
FIGS. 16A-B illustrate an example of knock-type feedback when scrolling ends in accordance with aspects of the technology.
Figure 16B:
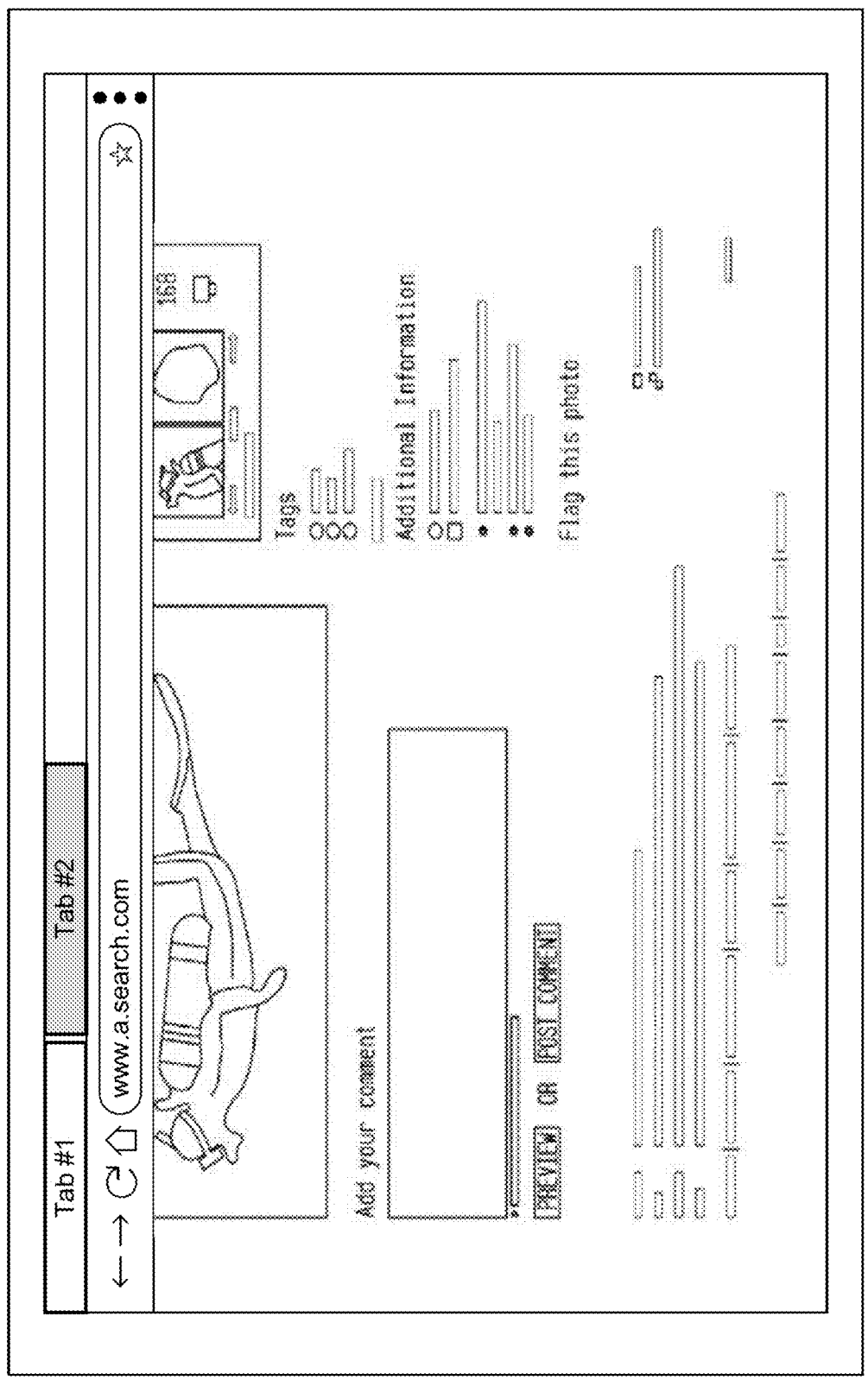

FIGS. 16A-B illustrate an example for providing knock-type feedback when scrolling ends. In this scenario, the user may read content from a website and continue scrolling to read more. However, once the end of the page has been reached, a knock haptic sensation is selected as the feedback to indicate there is no more scrolling in the current direction.

Figure 17A:
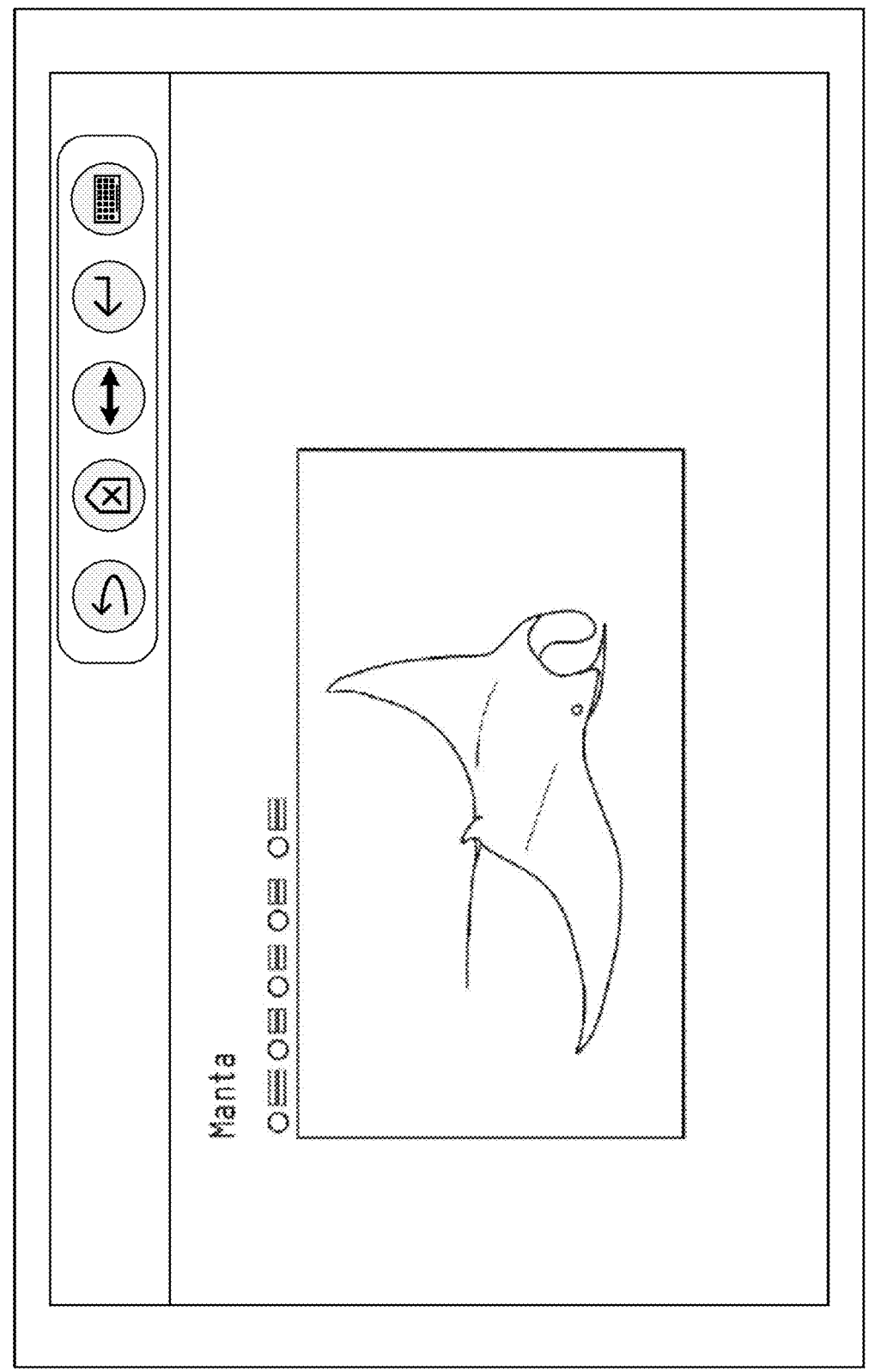
FIGS. 17A-B illustrate an example of knock-type feedback when a zoom limit has been reached in accordance with aspects of the technology.
Figure 17B:
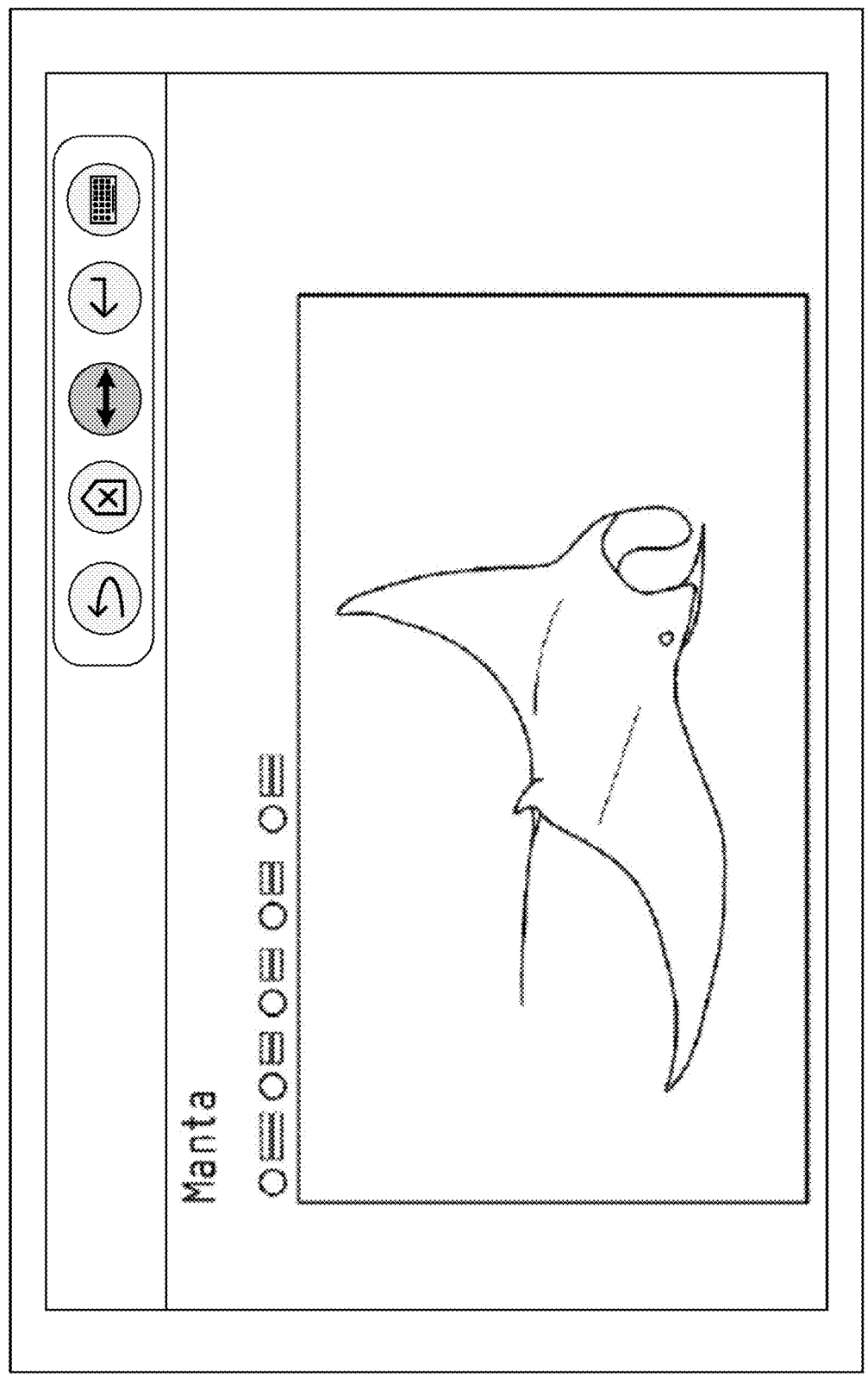

FIGS. 17A-B illustrate another example for providing knock-type feedback when zooming in or out on the UI. Here, an image (or web page, slide or other content) can be enlarged or reduced in size in the displayable area, such as by using a multi-finger gesture. When continuing the gesture while the zoom limit has been reached, feedback indicating that limit, such as a knock sensation, is communicated to the user.

Figure 18A:
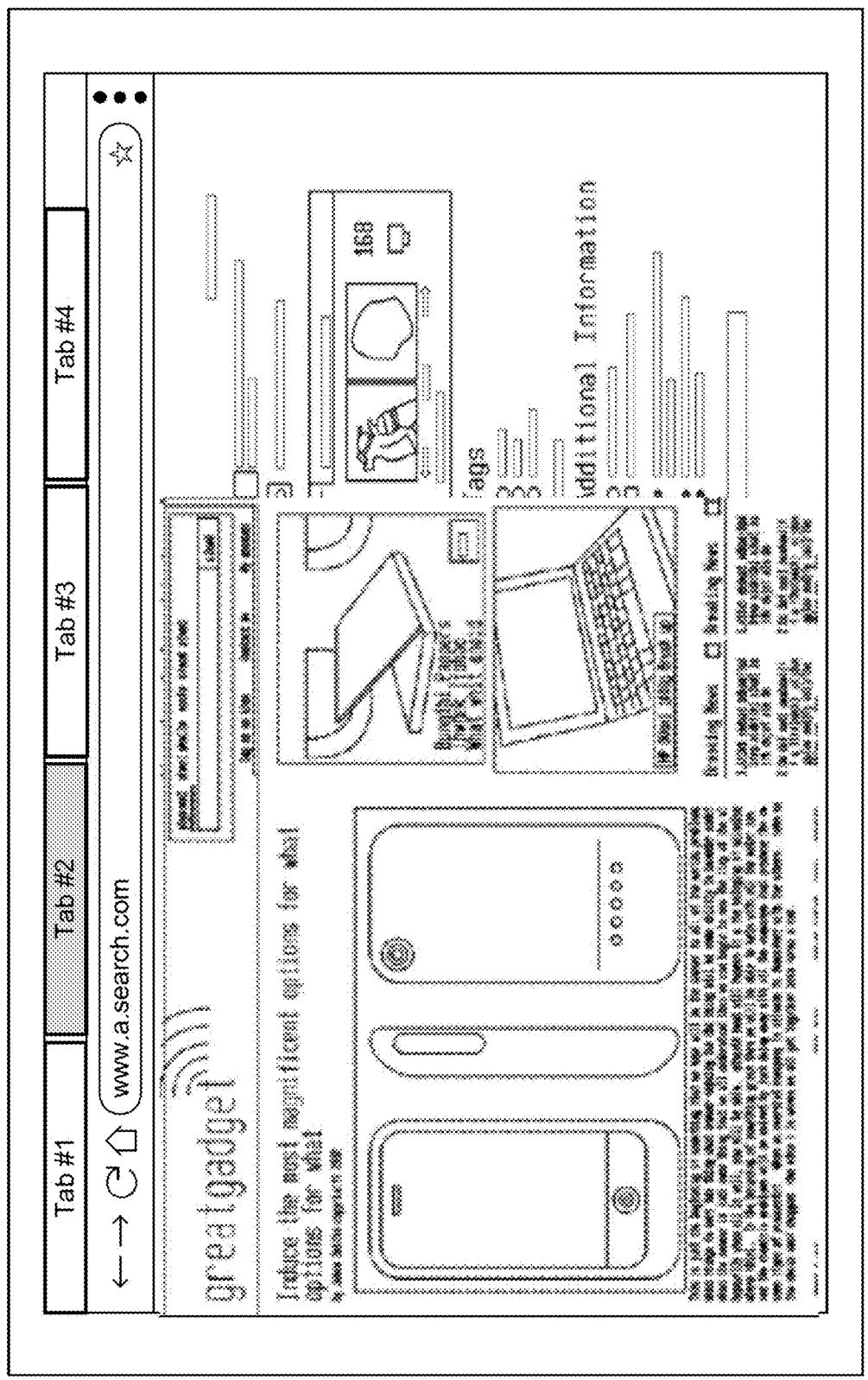
FIGS. 18A-C illustrate an example of tick feedback upon tearing off a tab in accordance with aspects of the technology.
Figure 18B:
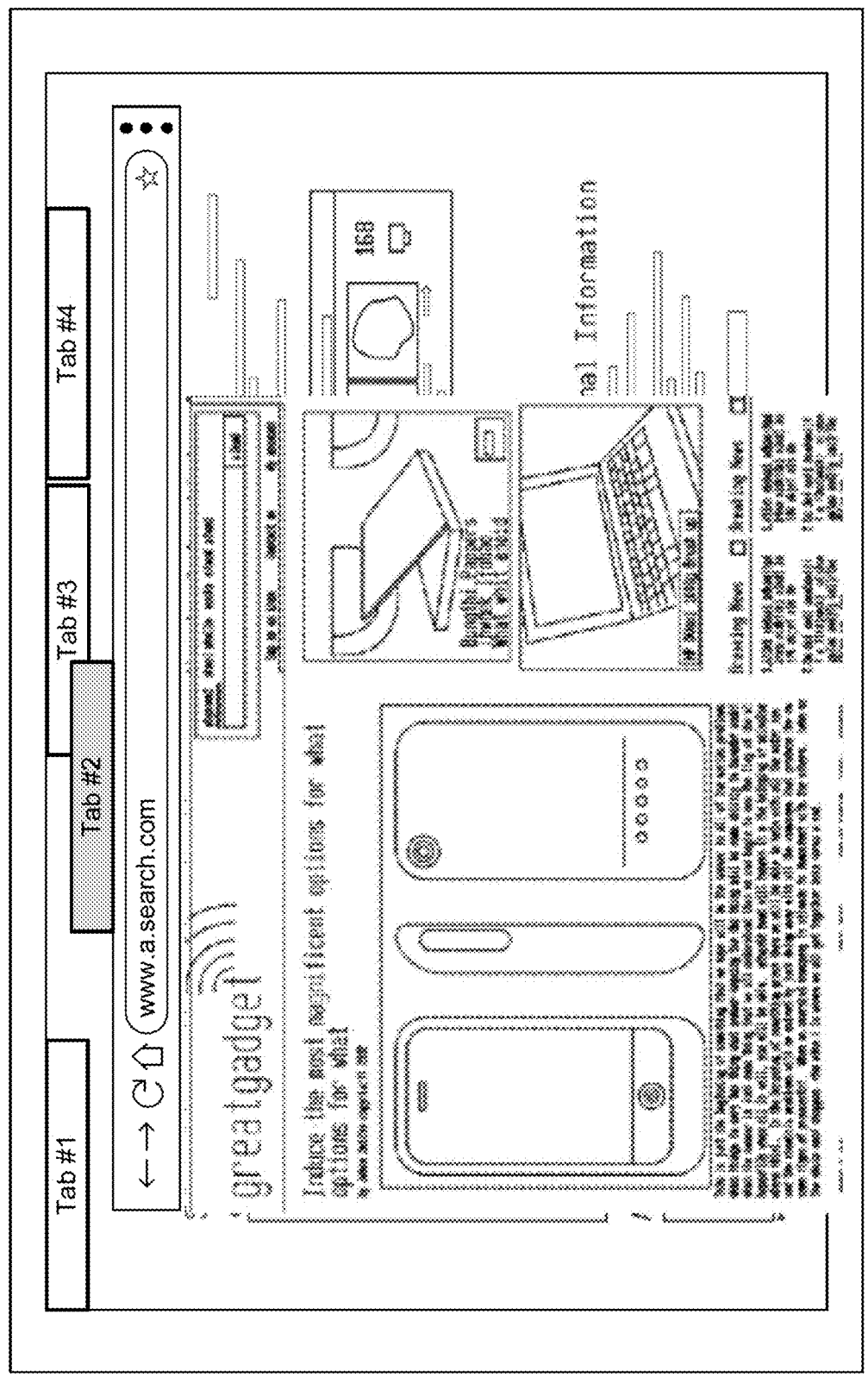
Figure 18C:
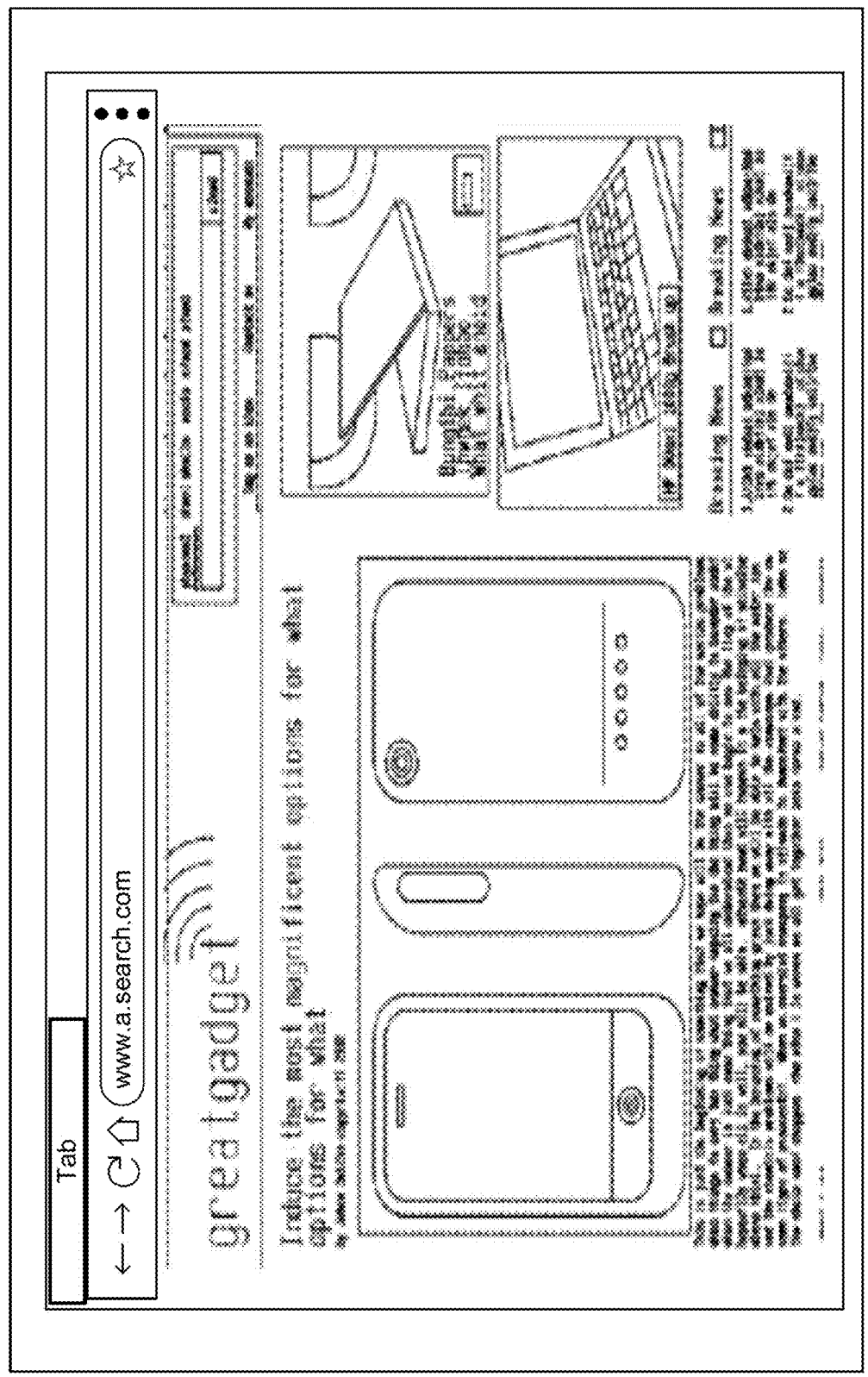

FIGS. 18A-C illustrate an example that incorporates tick-type feedback when "tearing off" a tab, such as in a browser UI. In this example, the user may have many tabs open in the browser but wants to focus on one in order to accomplish some task. By tearing off the tab (Tab #2) as shown in FIG. 18B, the user can create a separate browser window with only that tab as shown in FIG. 18C. By way of example, state change (tick-type) feedback may be generated when the user long clicks/presses on a browser tab to lift it and start dragging it, thus indicating to the user that the browser tab can now be moved.

Figure 19A:
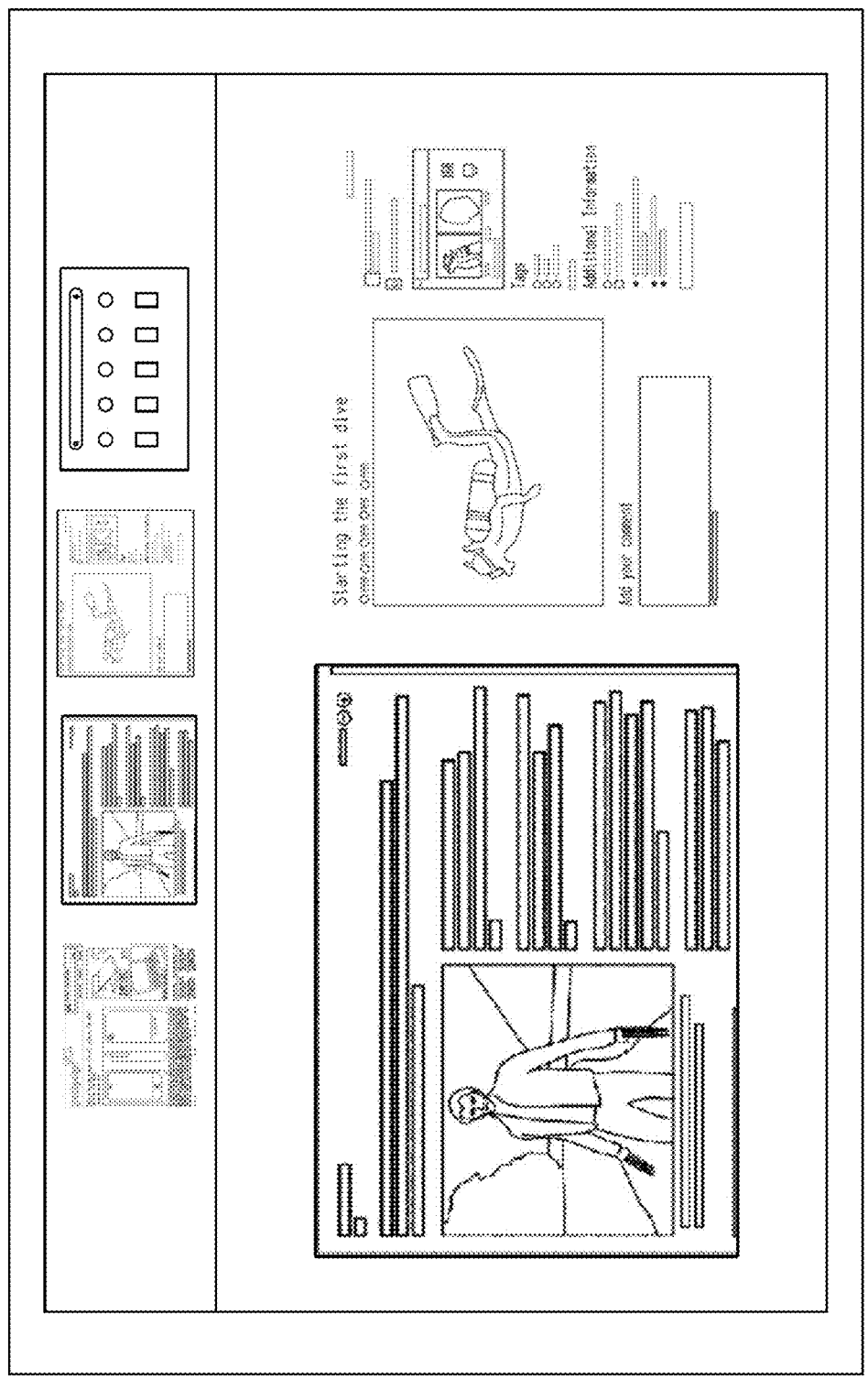
FIGS. 19A-C illustrate an example of tick feedback upon initiation of a window drag event scenario in accordance with aspects of the technology.
Figure 19B:
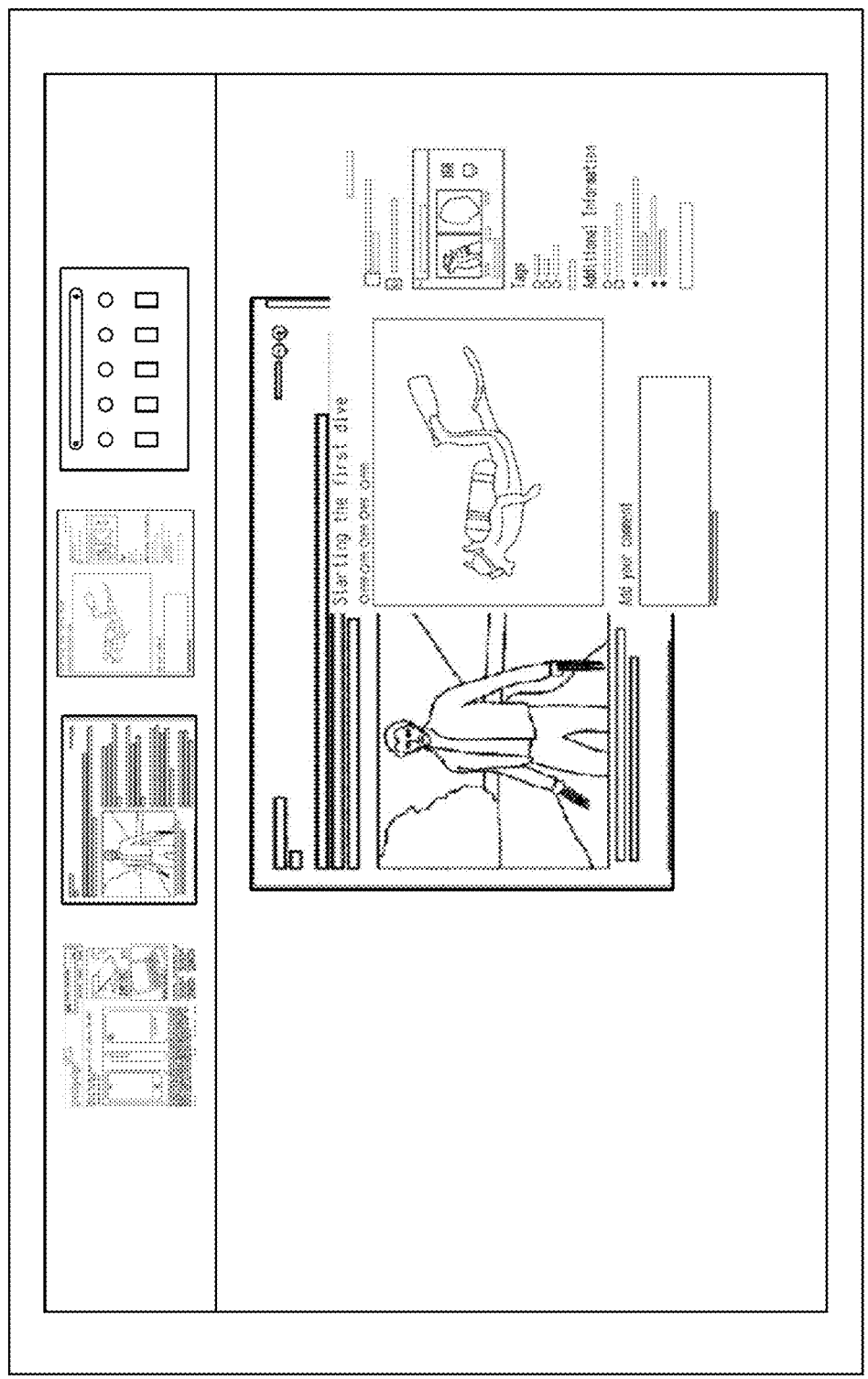
Figure 19C:
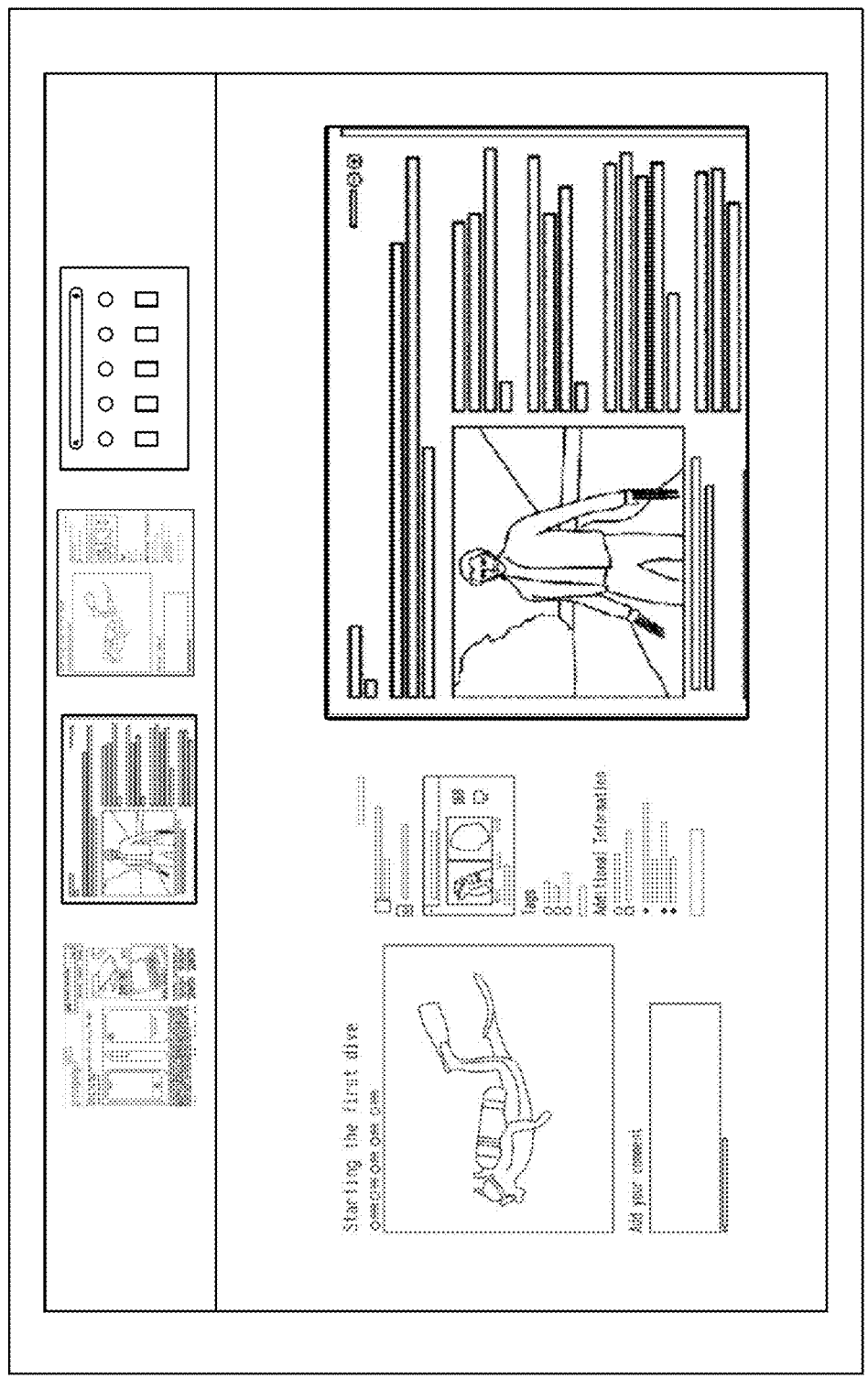

FIGS. 19A-C illustrate an example in which the system produces a tick-type haptic sensation based on a drag event, in particular a window drag event. As shown in these figures, the user may reorder their virtual desks to better organize their work, such as by moving a window from one desk to another to better organize their work. State change (e.g., tick-type) haptic feedback is generated when the user long clicks or presses on a window to lift it and start dragging it, thus indicating to the user that the browser tab can now be moved.

Figure 20A:
FIGS. 20A-C illustrate an example of tick feedback with segmented controls in accordance with aspects of the technology.
Figure 20B:
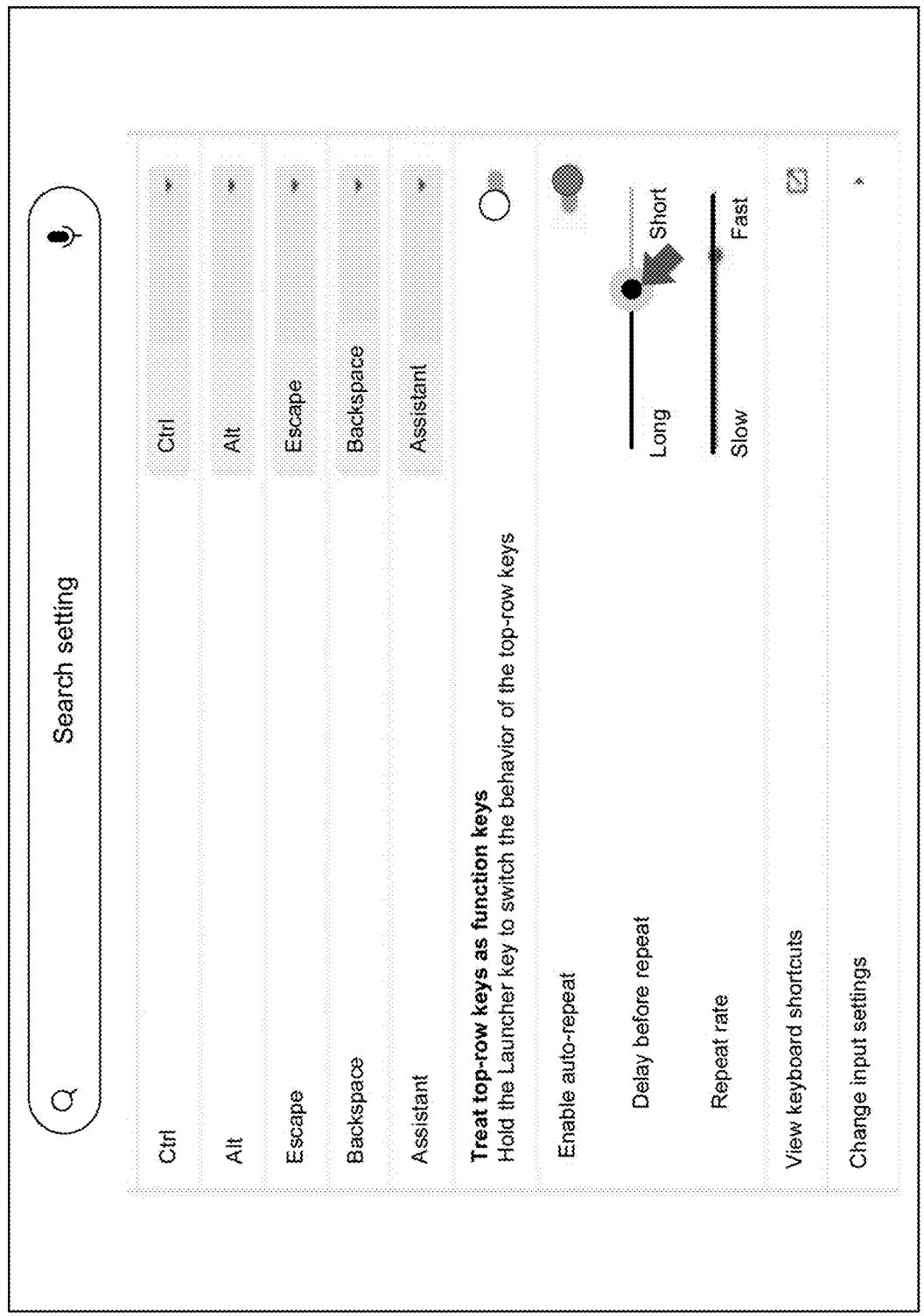
Figure 20C:

FIGS. 20A-C illustrate an example of providing tick-type feedback when using segmented controls. Here, tick feedback is generated when the user moves the cursor to a new position in a segment control element (here, "Delay before repeat", where the segmented control element ranges between "Long" and "Short").

Figure 21A:
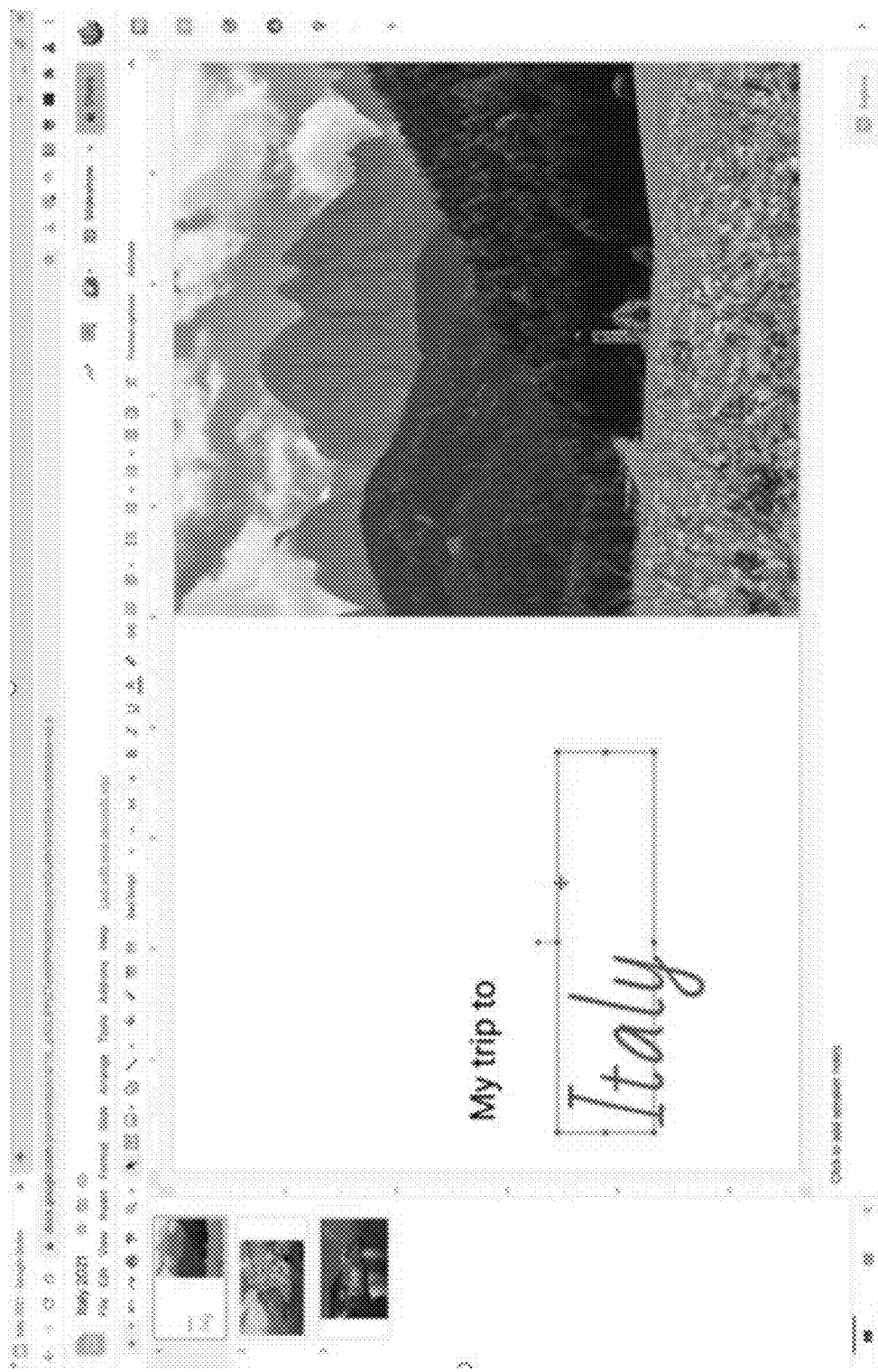
FIGS. 21A-C illustrate an example of tick feedback when aligning content in accordance with aspects of the technology.
Figure 21B:
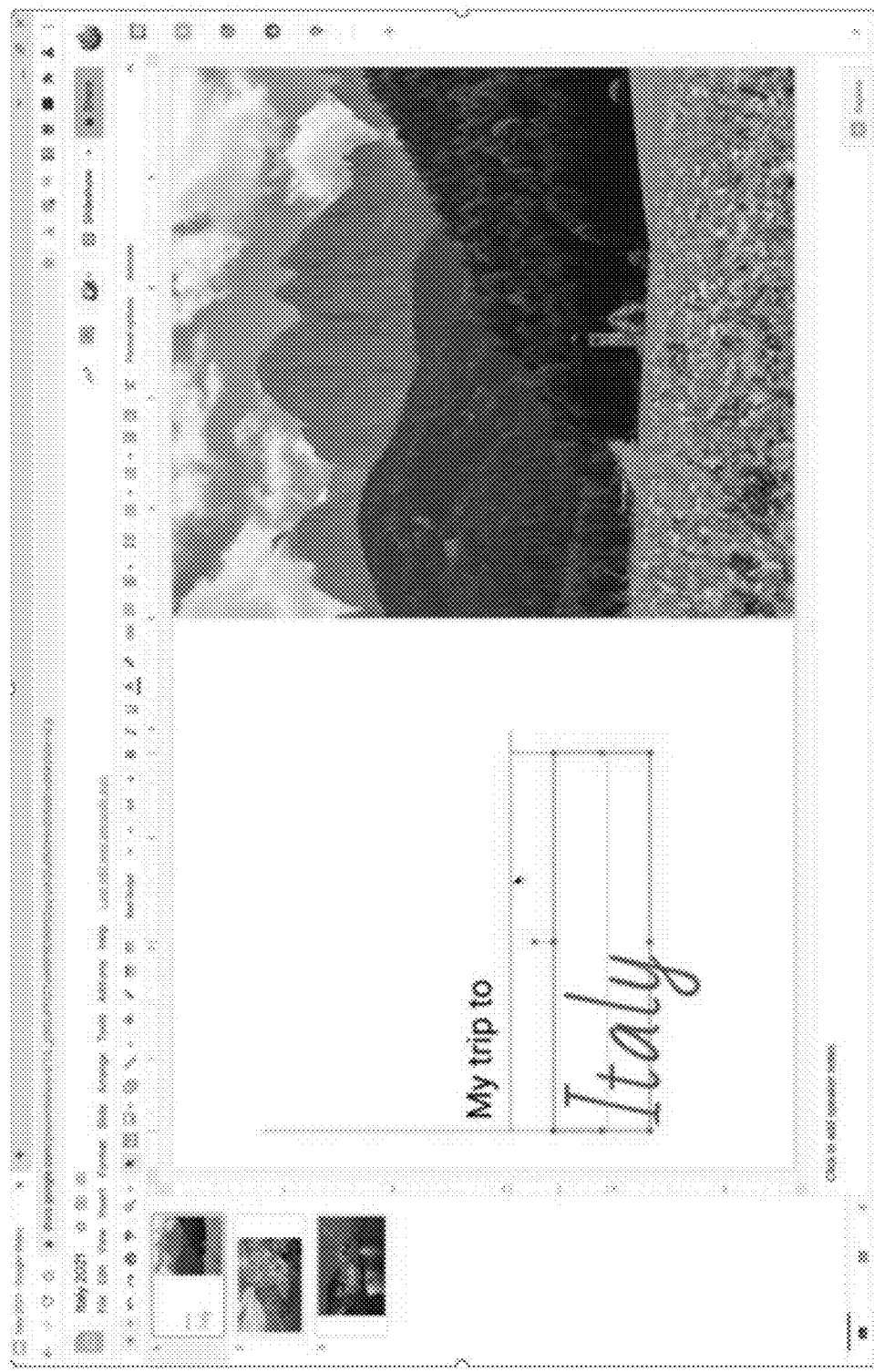
Figure 21C:
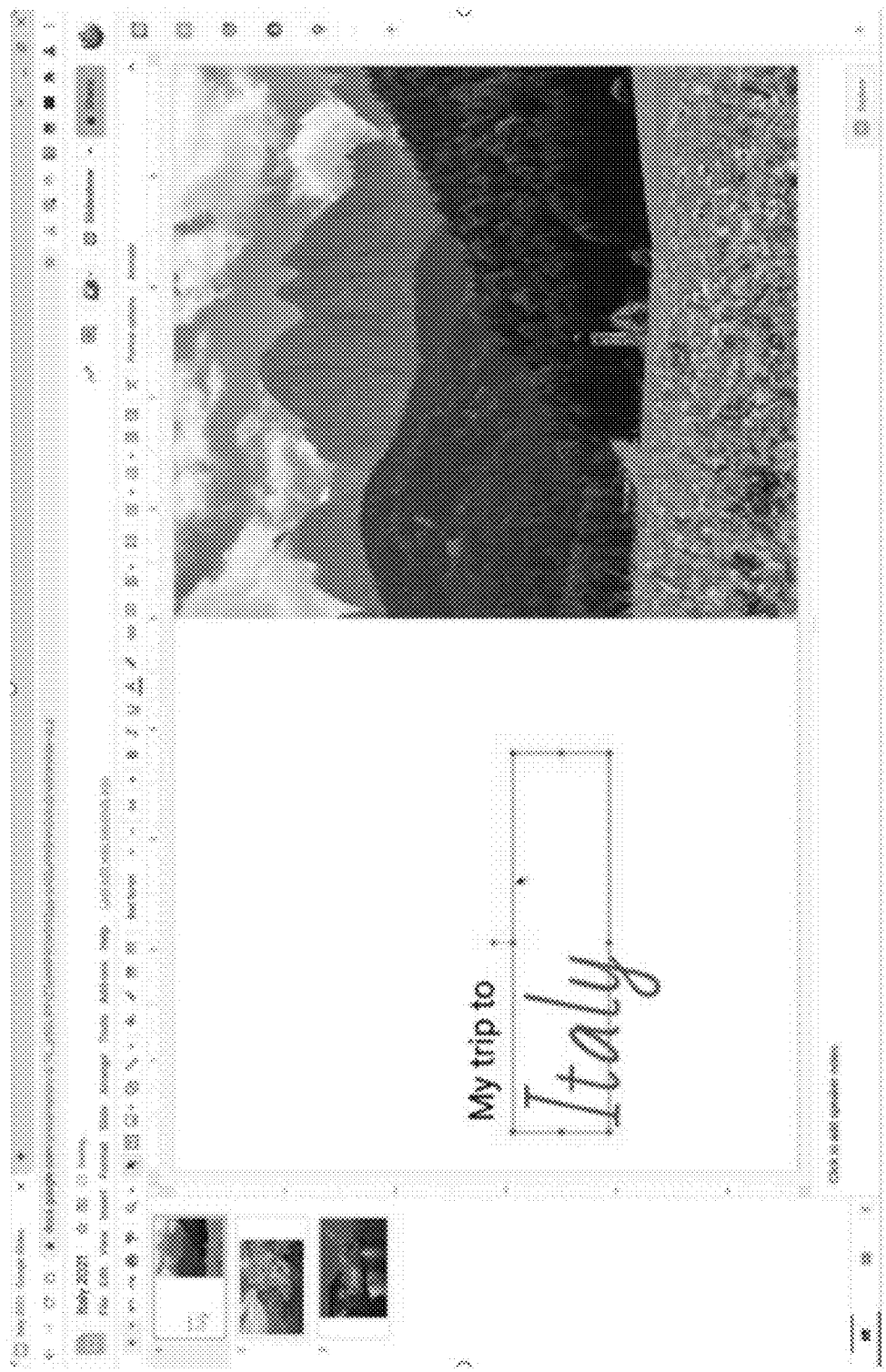

FIGS. 21A-C illustrate an example of providing tick-type feedback when updating content, such as modifying a slide in a presentation app, moving an item in a drawing program, etc. As shown in FIG. 21A, the text "Italy" is in a text box.

The user can update this content by moving elements around and aligning them together. Thus, in FIG. 21B, a horizontal bar is shown above the text box to indicate where the user is moving the cursor for the updated placement, and FIG. 21C shows the moved text box. In this type of scenario, state change (e.g., tick) feedback is generated by the system when a user input is received that moves, resizes, rotates or otherwise adjusts an element that reaches some alignment with another feature of the app (e.g., aligning or snapping to a grid).

Figure 22A:
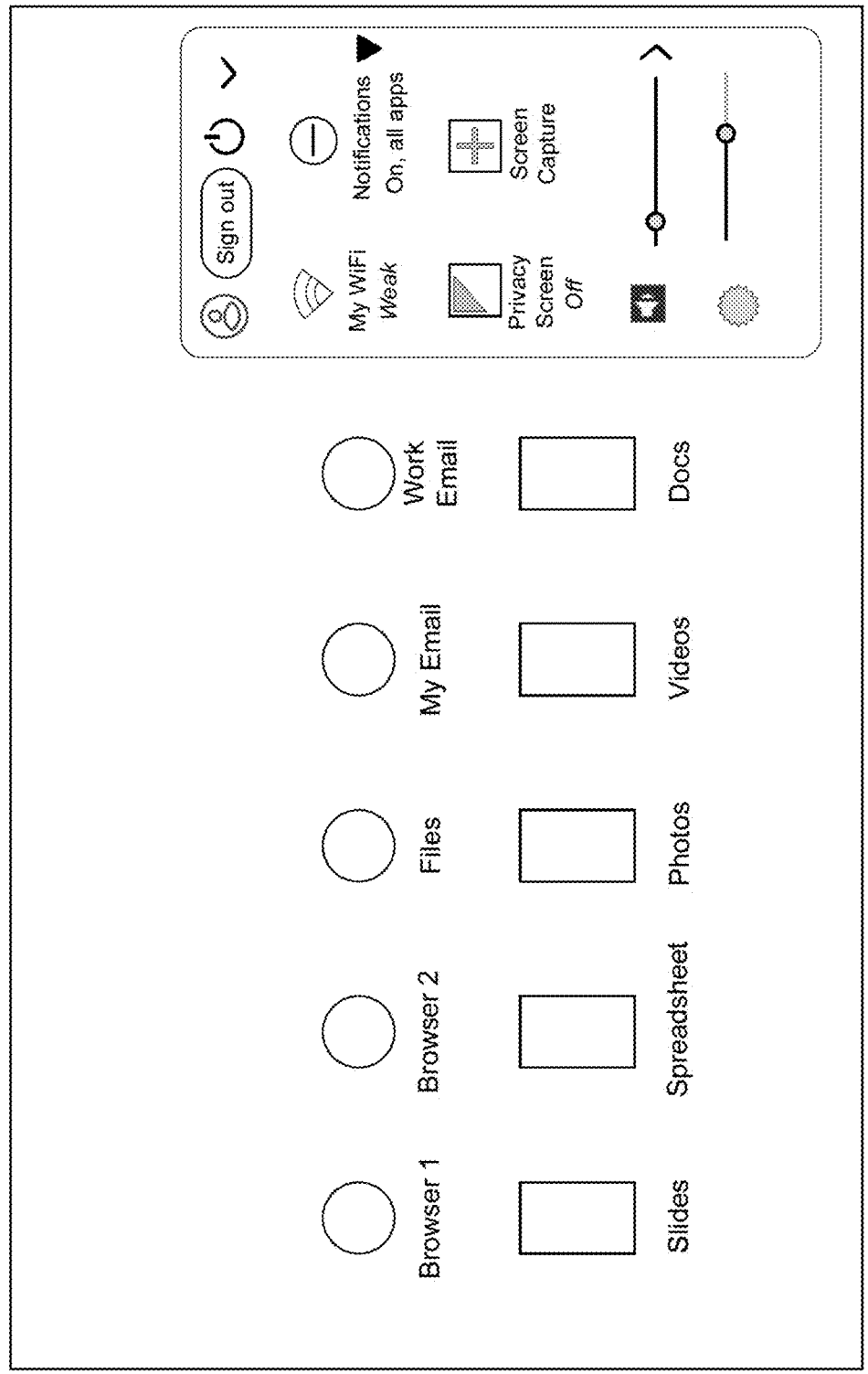
FIGS. 22A-B illustrate an example of toggle feedback when changing the status of a setting in accordance with aspects of the technology.
Figure 22B:
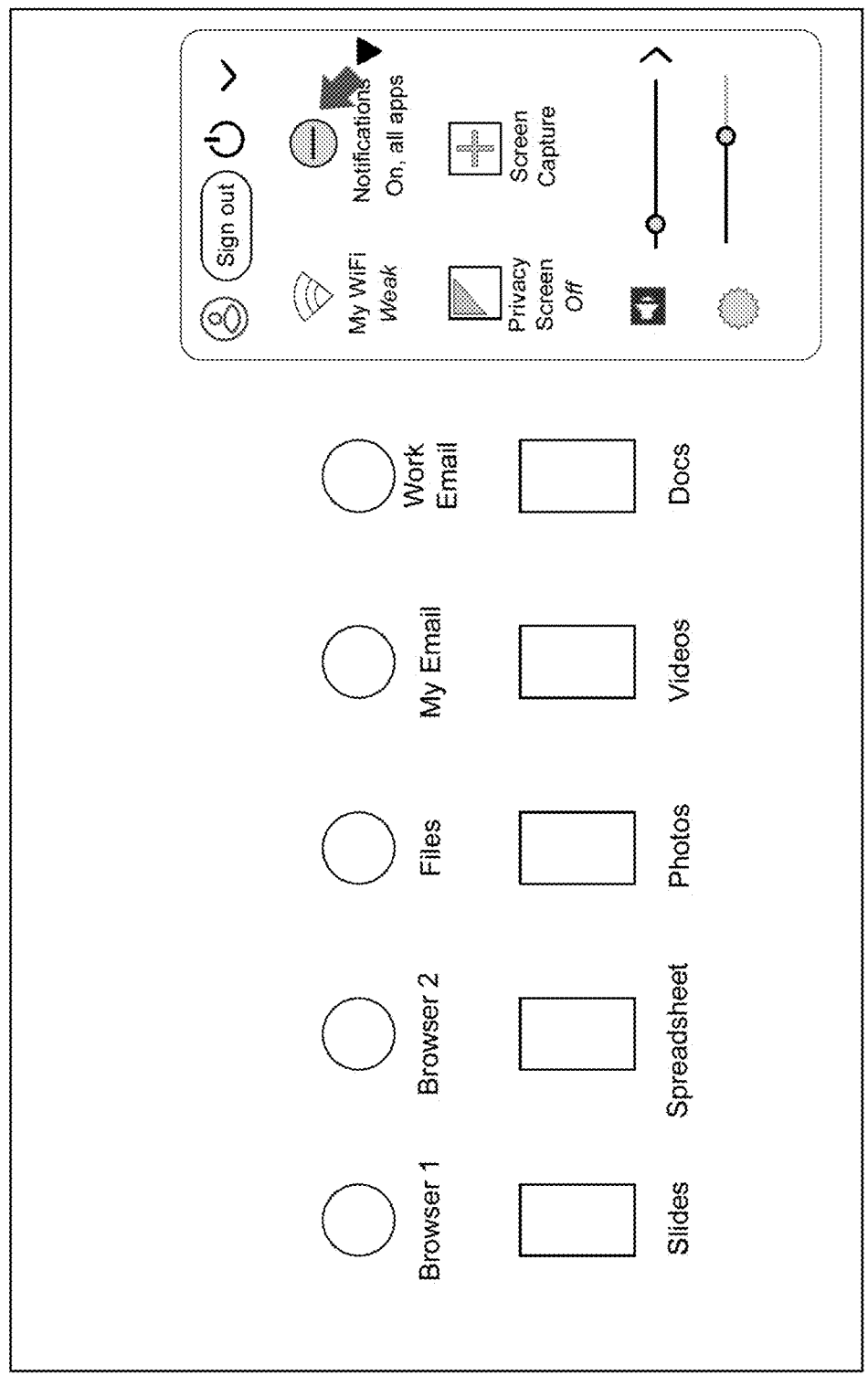
Figure 23A:
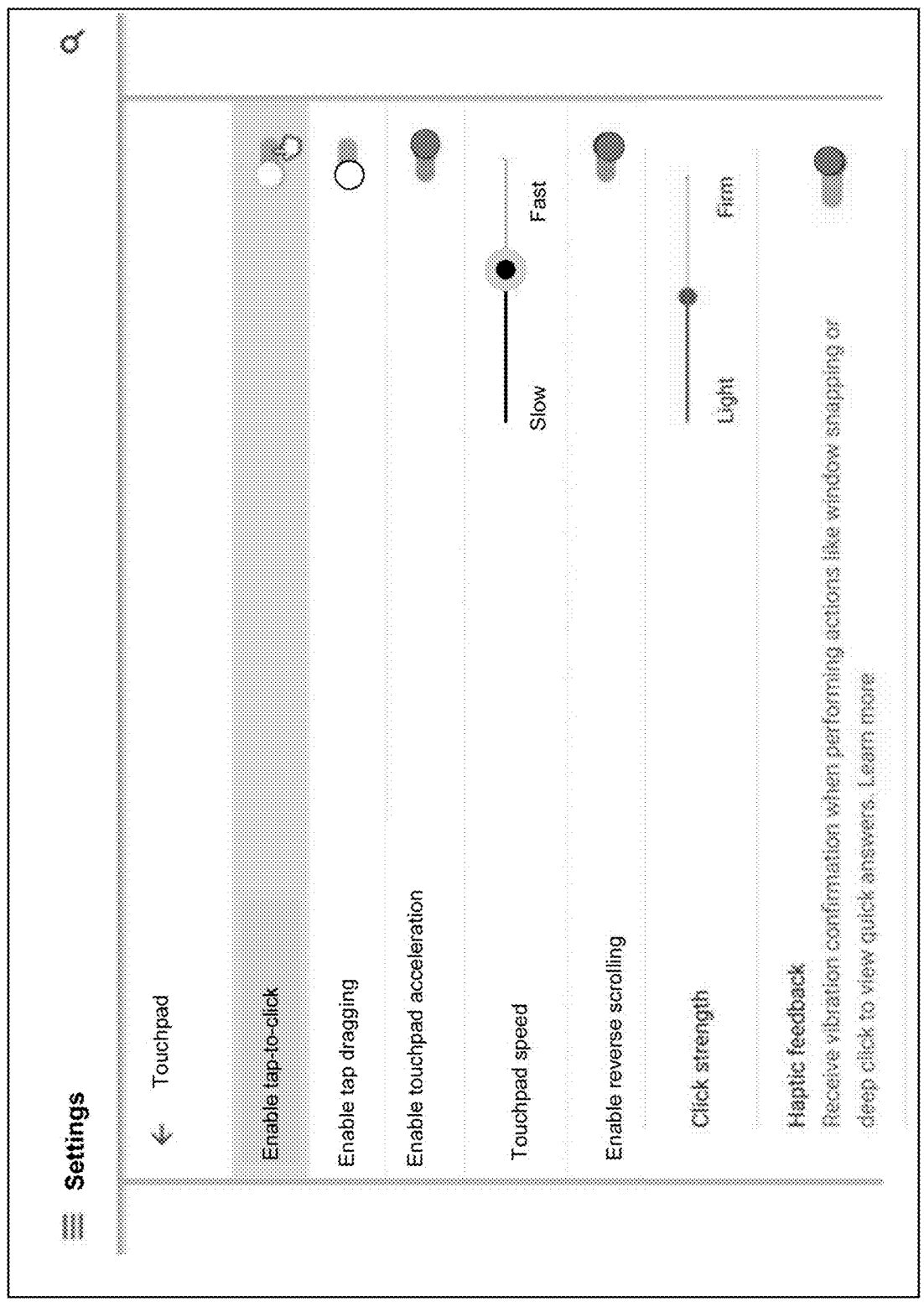
FIGS. 23A-B illustrate an example of toggle feedback when changing an on/off type setting in accordance with aspects of the technology.
Figure 23B:
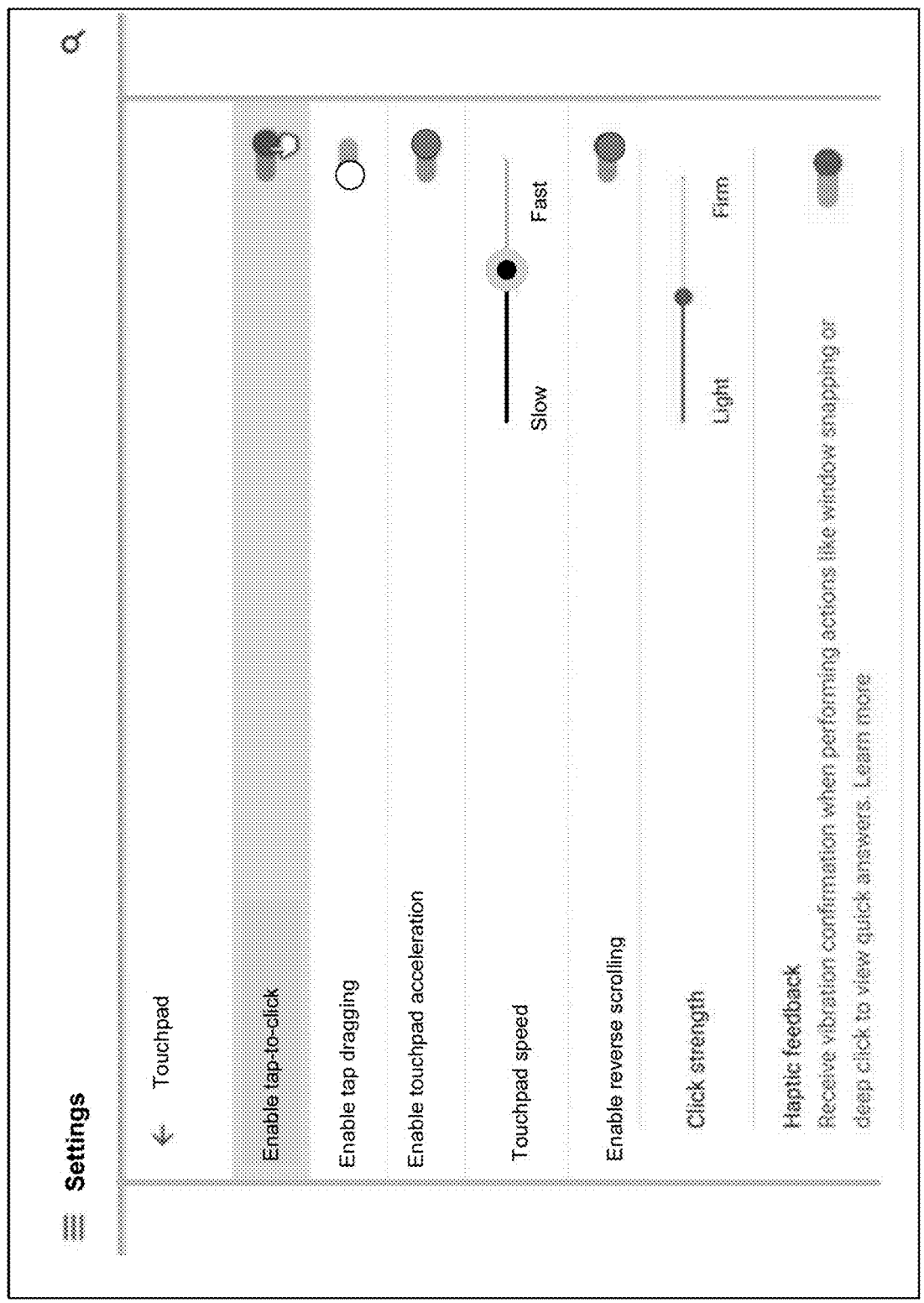

FIGS. 2A-B illustrate an example of providing toggle-type feedback when the user clicks on an adjustable icon. For instance, as shown in FIG. 22A, there may be a number of settings presented in a quick settings box on the side of the UI. As shown in FIG. 22B, when the user selects the Notifications icon, e.g., to modify it from "On, all apps" to "Off" or "On, selected apps", toggle haptic feedback is provided. This may also be done when a feature only has two states, such as on/off. An example of this is shown in FIGS. 23A-B, where the user may toggle the "Enable tap-to-click" setting between off (FIG. 23A) and on (FIG. 233). In such examples, the toggle "on" feedback is distinct from the toggle "off" feedback, so the user can readily identify whether the feature of interest has been enabled (toggled on) or disabled (toggled off). For instance, one or more checkboxes can be used in a notifications detailed view to allow or disable notifications from specific apps. Disabling would toggle off such notifications that include a haptic component.

Figure 24A:
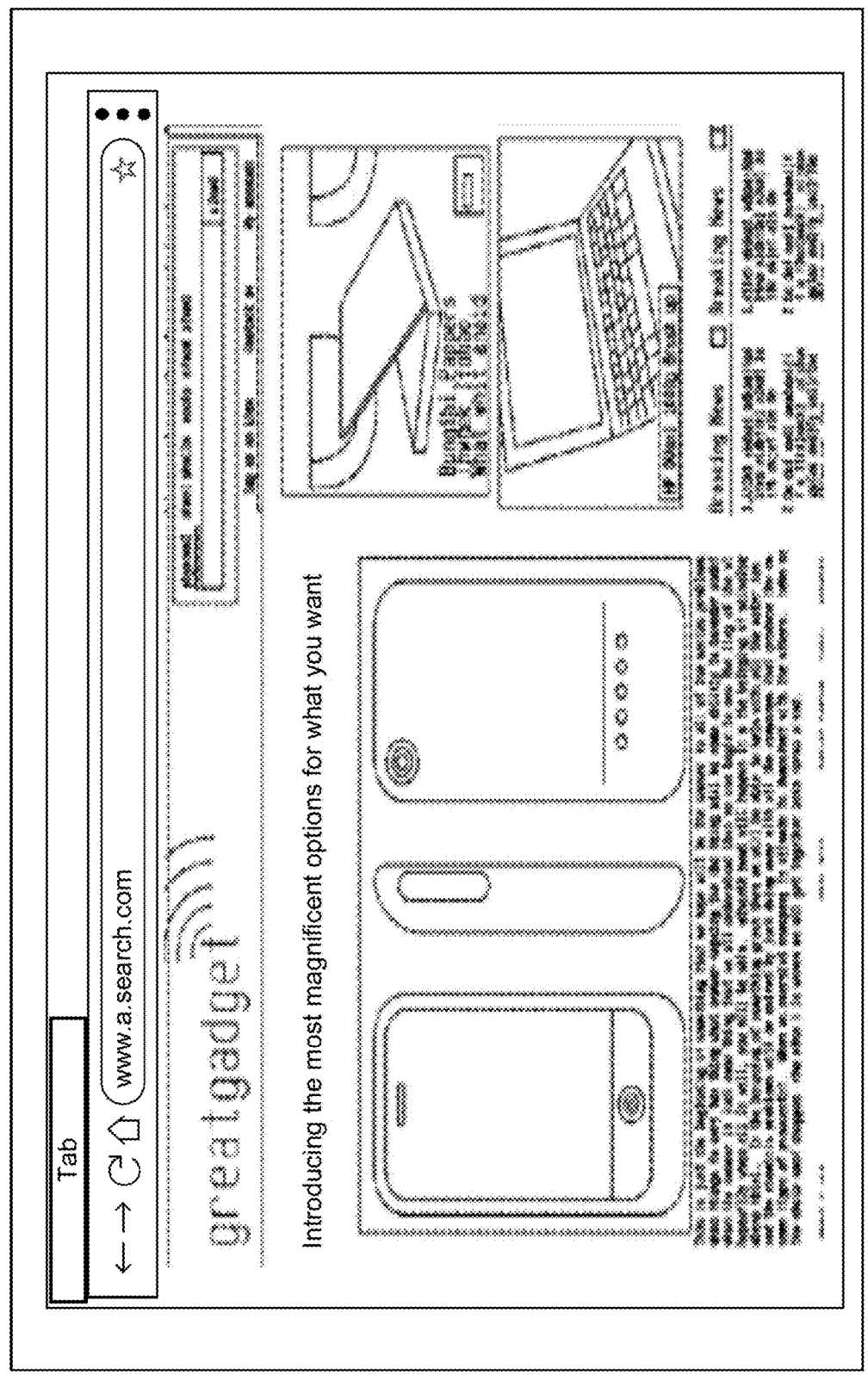
FIGS. 24A-B illustrate an example of deep click feedback in accordance with aspects of the technology.
Figure 24B:
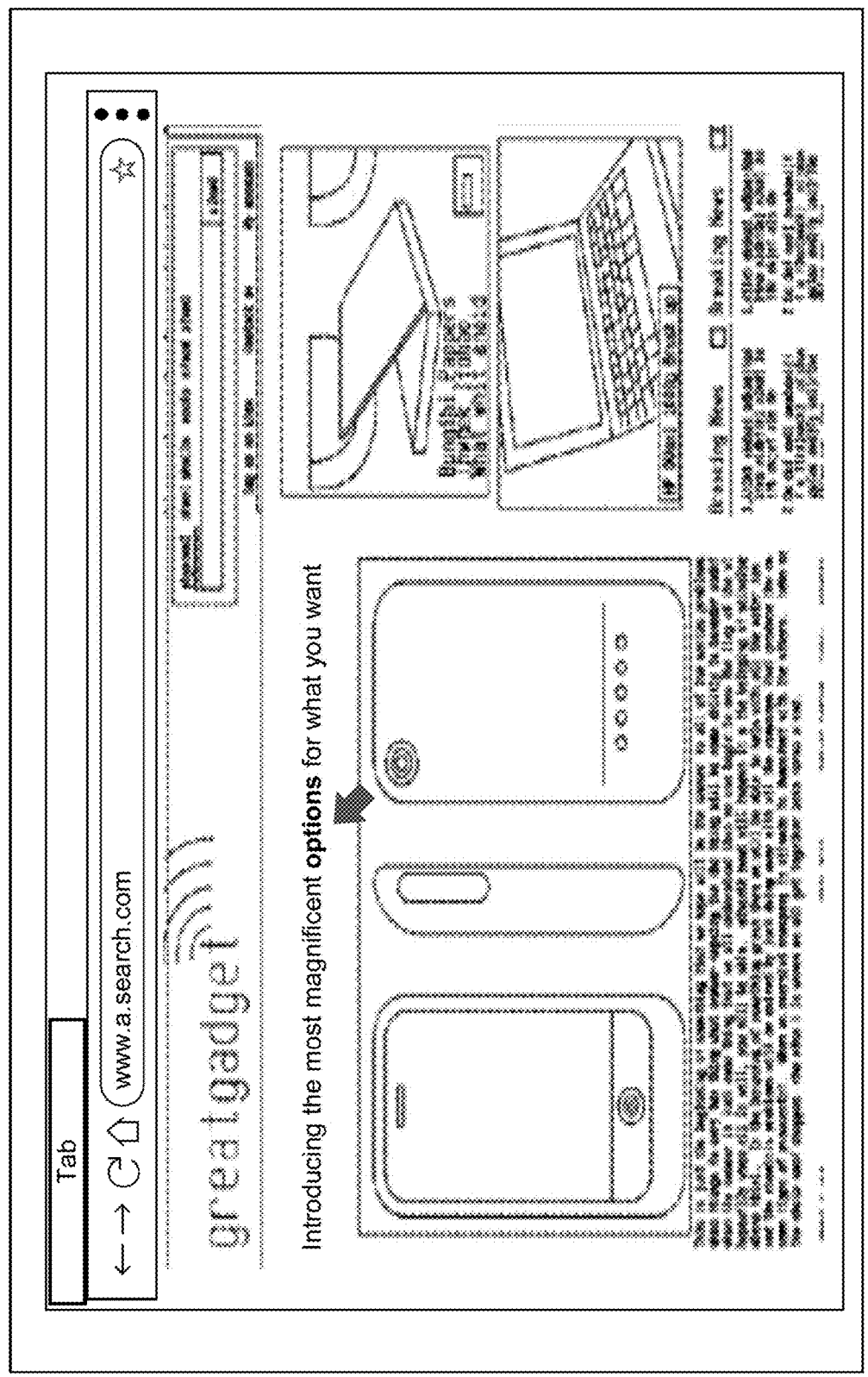

FIGS. 24A-B illustrate an example of providing deep click feedback in response to a user providing a touch input with a force that is in excess of a threshold or with a duration in excess of a temporal threshold (e.g., for more than 0.25 seconds, or more or less). For instance, FIG. 24A shows a website in a browser. As shown in FIG. 2413, the user placed the cursor near a word of interest (e.g., "options"), because the user may want to quickly learn more about it without having to leave the context. By pressing firmly enough, long enough or otherwise indicating interest in the word, image or other content item (e.g. my moving the cursor around the item to encircle or highlight it), a deep click haptic sensation is generated, preferably concurrently with the system providing supplemental information about that content item. Thus, in this example, the system may pop up a list of relevant options, link to a different web page about those items, or perform some other action associated with the options.

Another example includes providing haptic feedback when dragging and dropping between apps, such as when dragging into a droppable area. A further example includes providing haptic feedback when entering an overview mode. This can include updating a current threshold gesture (e.g., a 3 finger swipe up) with a continuous gesture that follows the user's movement and/or feedback when the threshold for launching the overview is met.

As shown in FIGS. 23A-B, the UI may introduce certain settings regarding haptic touchpad capabilities. For instance, click strength may let users select how firmly they press the trackpad. And haptic feedback can be enabled, and may be turned on (or off) by default. Turning it off may disable all advanced haptic feedbacks. The user may be able to tweak the haptic sensation parameters, e.g., the amplitude and/or duration of the wavelengths for different haptic feedback. Alternatively or additionally, in some scenarios the user may be able to select which haptic feedback is associated with certain user-device interactions. Thus, while the system can provide a curated suite of haptic feedback effects associated with different types of user interactions, types of programs or other factors, adjustments may be permissible by the user for some or all of the effects. For instance, the suite of haptic effects may be curated according to the type or category of user interaction, the type of application(s) to be run on the computing device, or both. This can include multi-level curation, in which once a particular application is being run, the system may select a subset of haptic effects that correspond to that application. In one scenario, all apps for a particular client device may have the same primary set of haptic effects. In another scenario, each app may be individually curated according to the type of UI and/or how the user can interact with the app. If there are any user preferences, those can be applied to further curate the haptic effects. And depending on what is occurring via the user's interaction with the program, one or more specific haptic effects from the curated set can be selected for use. Therefore, while the various examples and scenarios described above and shown in the drawings are illustrative of selected situations, there may be variations to the haptic interface.

According to one aspect of the technology, when a user interacts with the computing device, the system is able to use information about the kind of interaction, the type of app or other program being used, etc., to identify and select a haptic feedback effect from a curated suite of haptic effects (e.g., from a list stored in memory). Upon a given condition being met by the interaction and/or the state of the app or other program, the system causes the trackpad (or other component) to generate the selected haptic feedback effect for sensation by the user. In some instances, the user may be able to modify one or more setting associated with the curated suite of haptic effects, which may affect identification or selection of a given effect in a particular user interaction scenario. In other instances, the user may only be able to modify the intensity of the click feedback.

Figure 25:
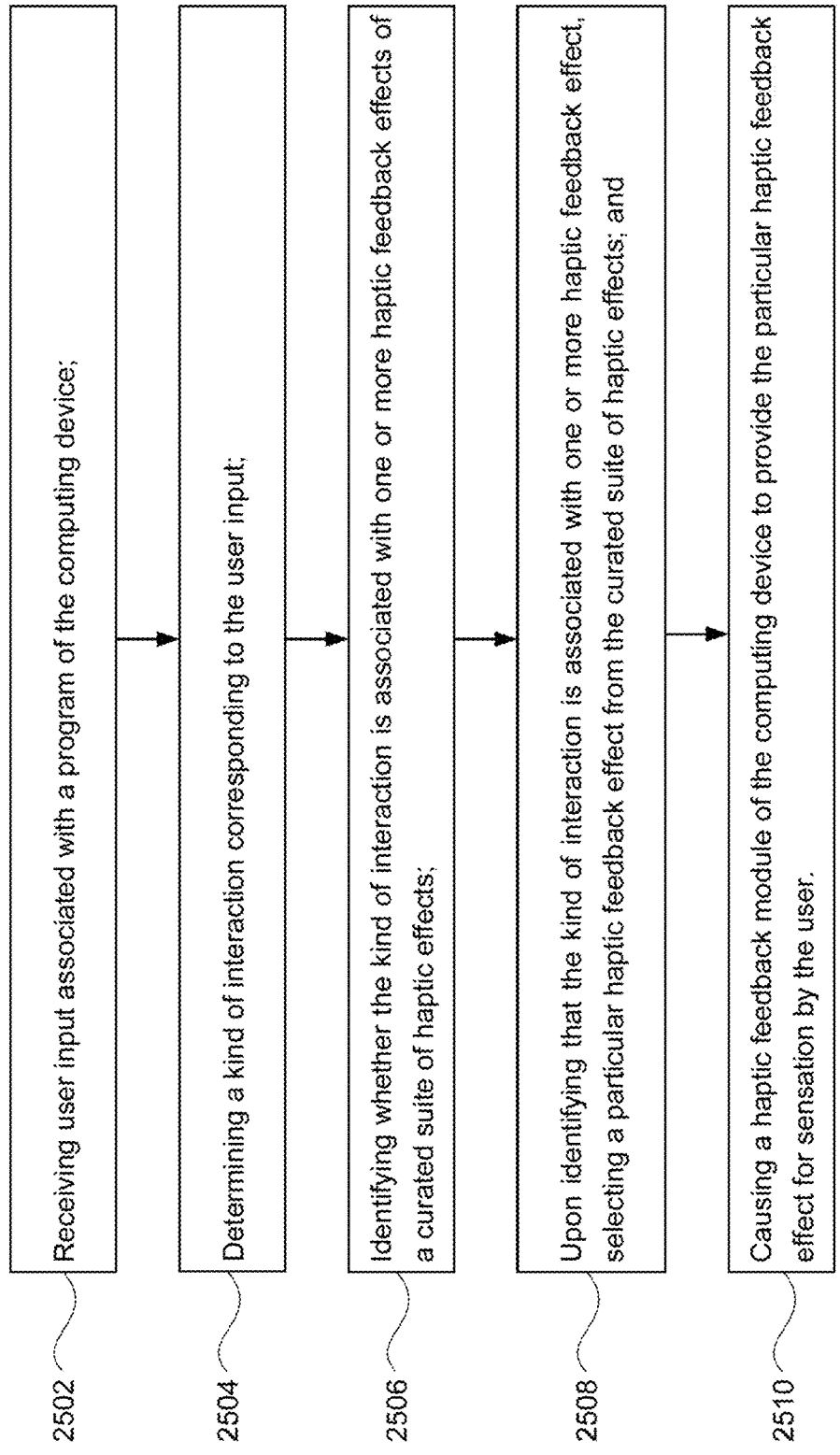
FIG. 25 is a flow diagram in accordance with aspects of the disclosure.

FIG. 25 illustrates a method 2500 for providing haptic feedback to a user of a computing device in accordance with the above. In block 2502, the method includes receiving, by a user interface module of the computing device, user input associated with a program of the computing device. At block 2504, the method includes determining, by one or more processors of the computing device, a kind of interaction corresponding to the user input. At block 2506, the method includes identifying, by the one or more processors, whether the kind of interaction is associated with one or more haptic feedback effects of a curated suite of haptic effects. At block 2508, the method includes, upon identifying that the kind of interaction is associated with one or more haptic feedback effect, selecting, by the one or more processors, a particular haptic feedback effect from the curated suite of haptic effects. And at block 2510, the method includes causing, by the one or more processors, a haptic feedback module of the computing device to provide the particular haptic feedback effect for sensation by the user.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method of providing haptic feedback to a user of a computing device, the method comprising:
   receiving, by a user interface module of the computing device, user input at the computing device, the user input being a type of action performed on a user interface of the computing device;
   determining, by one or more processors of the computing device, a type or category of interaction corresponding to the user input and a type of application that the user input is being performed on;
   identifying, by the one or more processors, whether the type or category of interaction and the type of application are associated with one or more haptic feedback effects of a suite of haptic effects;
   upon identifying that the type or category of interaction and the type of application are associated with one or more haptic feedback effects, selecting, by the one or more processors, a particular haptic feedback effect from the suite of haptic effects; and
   causing, by the one or more processors, a haptic feedback module of the computing device to provide the particular haptic feedback effect for sensation by the user.

2. The method of claim 1, wherein the suite of haptic effects includes a snap sensation, a limit sensation, a tick sensation and a click sensation.

3. The method of claim 2, wherein the suite of haptic effects further includes a deep click sensation, the deep click sensation being configured to provide a tactile confirmation that the user pressed firmly enough to reveal certain information about a selection.

4. The method of claim 1, wherein when the type or category of interaction involves splitting a screen in the user interface, the particular haptic feedback effect is a snap sensation.

5. The method of claim 1, wherein when the type or category of interaction involves maximizing a window in the user interface, the particular haptic feedback effect is a snap sensation.

6. The method of claim 1, wherein when the type or category of interaction involves moving between two or more virtual objects, the particular haptic feedback effect is a tick sensation.

7. The method of claim 1, wherein when the type or category of interaction involves moving between two or more virtual objects, the particular haptic feedback effect is a knock sensation.

8. The method of claim 1, wherein when the type or category of interaction is associated with moving a virtual object, the particular haptic feedback effect is a tick sensation indicating that the virtual object is now moveable.

9. The method of claim 1, wherein when the type or category of interaction involves scrolling through a set of displayed content, the particular haptic feedback effect is a knock sensation to indicate no more scrolling is possible in a given direction.

10. The method of claim 1, wherein when the type or category of interaction involves tearing off a tab from a virtual window, the particular haptic feedback effect is a tick sensation.

11. The method of claim 1, wherein when the type or category of interaction involves adjusting a control feature, the particular haptic feedback effect is a tick sensation.

12. The method of claim 1, wherein when the type or category of interaction involves turning a selectable option on or off, the particular haptic feedback effect includes a set of toggle sensations including at least one toggle on sensation and one toggle off sensation distinct from the toggle on sensation.

13. The method of claim 1, wherein when the type or category of interaction involves the user input either exceeding a force threshold or a temporal threshold, the particular haptic feedback effect is a deep click sensation.

14. The method of claim 1, wherein one or more settings associated with the suite of haptic effects are adjustable by the user.

15. The method of claim 1, wherein the suite of haptic effects is curated according to the type or category of user interaction.

16. The method of claim 1, wherein the suite of haptic effects is curated according to a type of application to be run on the computing device.

17. A computing device, comprising:
   memory configured to store a suite of haptic effects;
   a display module configured to display a user interface to a user;
   a user interface module configured to receive user input from a user of the computing device, the user input being associated with a program of the computing device;
   a haptic feedback module configured to provide haptic effects to the user; and
   one or more processors operatively coupled to the memory, the display module, the user interface module and the haptic feedback module, the one or more processors being configured to:
      determine a type or category of interaction corresponding to the user input, the user input being a type of action performed on the user interface of the computing device and a type of application that the user input is being performed on;
      identify whether the type or category of interaction and the type of application are associated with one or more haptic feedback effects of the suite of haptic effects;
      upon identifying that the type or category of interaction and the type of application are associated with one or more haptic feedback effects, select a particular haptic feedback effect from the suite of haptic effects; and
      cause the haptic feedback module to provide the particular haptic feedback effect for sensation by the user.

18. The computing device of claim 17, wherein the computing device includes a trackpad, and the haptic feedback module is part of the trackpad.

19. The computing device of claim 17, wherein the suite of haptic effects includes a snap sensation, a limit sensation, a tick sensation and a click sensation.

20. The computing device of claim 19, wherein the suite of haptic effects further includes a set of toggle effects including a toggle on effect and a toggle off effect distinct from the toggle on effect.

21. The computing device of claim 19, wherein the suite of haptic effects further includes a deep click sensation, the deep click sensation being configured to provide a tactile confirmation that the user pressed firmly enough to reveal certain information about a selection.

22. The computing device of claim 17, wherein one or more settings associated with the suite of haptic effects are adjustable by the user.

23. The computing device of claim 17, wherein each haptic effect of the suite of haptic effects is configured to provide supplemental feedback to a visual cue presented to the user during interaction with the program.

24. The computing device of claim 17, wherein each haptic effect of the suite of haptic effects is configured to provide supplemental feedback to an audible cue presented to the user during interaction with the program.

* * * * *